US012241458B2

(12) United States Patent
Rowe et al.

(10) Patent No.: US 12,241,458 B2
(45) Date of Patent: *Mar. 4, 2025

(54) ACTUATOR WITH CONTRACTING MEMBER

(71) Applicant: Toyota Motor Engineering & Manufacturing North America, Inc., Plano, TX (US)

(72) Inventors: Michael Paul Rowe, Pinckney, MI (US); Brian J. Pinkelman, Ann Arbor, MI (US); Yufei Zhu, Ypsilanti, MI (US); Frederick William Mau, II, McKinney, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,026

(22) Filed: Dec. 28, 2023

(65) Prior Publication Data

US 2024/0280090 A1     Aug. 22, 2024

Related U.S. Application Data

(63) Continuation-in-part of application No. 18/329,217, filed on Jun. 5, 2023.

(60) Provisional application No. 63/485,398, filed on Feb. 16, 2023.

(51) Int. Cl.
*F03G 7/06*     (2006.01)

(52) U.S. Cl.
CPC ............................. *F03G 7/06143* (2021.08)

(58) Field of Classification Search
CPC .................................................. F03G 7/06143
USPC ................................................... 60/527–529
See application file for complete search history.

(56) References Cited

U.S. PATENT DOCUMENTS

| | | | |
|---|---|---|---|
| 1,658,669 | A | 2/1928 | Cohn et al. |
| 2,322,755 | A | 6/1943 | Voorhies |
| 2,588,706 | A | 3/1952 | Davis |
| 3,394,631 | A | 7/1968 | Thompson |

(Continued)

FOREIGN PATENT DOCUMENTS

| | | |
|---|---|---|
| CN | 201037277 | 3/2008 |
| CN | 101367433 A | 2/2009 |

(Continued)

OTHER PUBLICATIONS

Barbarino et al., "A review on shape memory alloys with applications to morphing aircraft", Smart Materials and Structures, Apr. 2014 (19 pages).

(Continued)

*Primary Examiner* — Hoang M Nguyen
(74) *Attorney, Agent, or Firm* — Christopher G. Darrow; Darrow Mustafa PC

(57) ABSTRACT

An actuator can include an outer body. At least a portion of the outer body can be configured to pivot. The actuator can include a contracting member, such as a shape memory material member. When an activation input is provided to the contracting member, the contracting member can contract. As a result, the actuator can be caused to morph into an activated configuration in which a dimension, such as the height, of the actuator increases.

59 Claims, 30 Drawing Sheets

(56) References Cited

U.S. PATENT DOCUMENTS

| | | | |
|---|---|---|---|
| 3,706,102 A | 12/1972 | Grenier | |
| 4,063,826 A | 12/1977 | Riepe | |
| 4,244,140 A | 1/1981 | Kim | |
| 4,396,220 A | 8/1983 | Dieckmann et al. | |
| 4,498,851 A | 2/1985 | Kolm et al. | |
| 4,522,447 A | 6/1985 | Snyder et al. | |
| 4,541,885 A | 9/1985 | Caudill, Jr. | |
| 4,544,988 A | 10/1985 | Hochstein | |
| 4,553,393 A | 11/1985 | Ruoff | |
| 4,595,338 A | 6/1986 | Kolm et al. | |
| 4,779,852 A | 10/1988 | Wassell | |
| 4,780,062 A | 10/1988 | Yamada et al. | |
| 4,806,815 A | 2/1989 | Homma | |
| 4,811,564 A * | 3/1989 | Palmer | F03G 7/065 |
| | | | 60/527 |
| 4,834,619 A | 5/1989 | Walton | |
| 4,898,426 A | 2/1990 | Schulz et al. | |
| 4,923,000 A | 5/1990 | Nelson | |
| 4,944,755 A | 7/1990 | Hennequin et al. | |
| 4,955,196 A | 9/1990 | Lin et al. | |
| 4,964,402 A | 10/1990 | Grim et al. | |
| 5,069,219 A | 12/1991 | Knoblich | |
| 5,088,115 A | 2/1992 | Napolitano | |
| 5,129,753 A | 7/1992 | Wesley et al. | |
| 5,250,167 A | 10/1993 | Adolf et al. | |
| 5,255,390 A | 10/1993 | Gross et al. | |
| 5,279,123 A | 1/1994 | Wechsler et al. | |
| 5,482,351 A | 1/1996 | Young et al. | |
| 5,488,255 A | 1/1996 | Sato et al. | |
| 5,522,712 A | 6/1996 | Winn | |
| 5,583,844 A | 12/1996 | Wolf et al. | |
| 5,619,177 A | 4/1997 | Johnson et al. | |
| 5,622,482 A | 4/1997 | Lee | |
| 5,662,376 A | 9/1997 | Breuer et al. | |
| 5,678,247 A | 10/1997 | Vickers | |
| 5,686,003 A | 11/1997 | Ingram et al. | |
| 5,747,140 A | 5/1998 | Heerklotz | |
| 5,771,742 A | 6/1998 | Bokaie et al. | |
| 5,846,629 A | 12/1998 | Gwinn | |
| 5,853,005 A | 12/1998 | Scanlon | |
| 5,861,703 A | 1/1999 | Losinski | |
| 6,043,978 A | 3/2000 | Mody et al. | |
| 6,053,553 A | 4/2000 | Hespelt | |
| 6,093,910 A | 7/2000 | McClintock et al. | |
| 6,116,257 A | 9/2000 | Yokota et al. | |
| 6,142,563 A | 11/2000 | Townsend et al. | |
| 6,155,716 A | 12/2000 | Okamura | |
| 6,186,047 B1 | 2/2001 | Baruffaldi | |
| 6,227,515 B1 | 5/2001 | Broyles | |
| 6,379,393 B1 | 4/2002 | Mavroidis et al. | |
| 6,394,001 B1 | 5/2002 | Giesey et al. | |
| 6,404,098 B1 | 6/2002 | Kayama et al. | |
| 6,422,010 B1 | 7/2002 | Julien | |
| 6,443,524 B1 | 9/2002 | Yu | |
| 6,481,799 B1 | 11/2002 | Whalen | |
| 6,508,437 B1 | 1/2003 | Davis et al. | |
| 6,530,217 B1 | 3/2003 | Yokota et al. | |
| 6,546,806 B1 | 4/2003 | Varma | |
| 6,591,188 B1 | 7/2003 | Ohler | |
| 6,628,522 B2 | 9/2003 | Trautman et al. | |
| 6,664,718 B2 | 12/2003 | Perline et al. | |
| 6,719,694 B2 | 4/2004 | Weng et al. | |
| 6,740,994 B2 | 5/2004 | Lee et al. | |
| 6,773,535 B1 | 8/2004 | Wetzel | |
| 6,809,462 B2 | 10/2004 | Pelrine et al. | |
| 6,896,324 B1 | 5/2005 | Kull et al. | |
| 6,910,714 B2 | 6/2005 | Browne et al. | |
| 6,912,748 B2 | 7/2005 | VanSickle | |
| 6,943,653 B2 | 9/2005 | Hanke et al. | |
| 6,972,659 B2 | 12/2005 | von Behrens et al. | |
| 6,998,546 B1 | 2/2006 | Schmidt et al. | |
| 7,017,345 B2 | 3/2006 | Von Behrens et al. | |
| 7,086,322 B2 | 8/2006 | Schulz | |
| 7,093,903 B2 | 8/2006 | O'Connor et al. | |
| 7,100,990 B2 | 9/2006 | Kimura et al. | |
| 7,108,316 B2 | 9/2006 | Barvosa-Carter et al. | |
| 7,117,673 B2 | 10/2006 | Szilagyi | |
| 7,125,077 B2 | 10/2006 | Frank | |
| 7,204,472 B2 | 4/2007 | Jones et al. | |
| 7,237,847 B2 | 7/2007 | Hancock et al. | |
| 7,256,518 B2 | 8/2007 | Gummin | |
| 7,293,836 B2 | 11/2007 | Browne et al. | |
| 7,306,187 B2 | 12/2007 | Lavan | |
| 7,309,104 B2 | 12/2007 | Browne et al. | |
| 7,331,616 B2 * | 2/2008 | Brei | E05B 47/0009 |
| | | | 292/201 |
| 7,336,486 B2 | 2/2008 | Mongia | |
| 7,350,851 B2 | 4/2008 | Barvosa-Carter et al. | |
| 7,364,211 B2 | 4/2008 | Niskanen et al. | |
| 7,371,052 B2 | 5/2008 | Koeneman | |
| 7,446,450 B2 | 11/2008 | Boland et al. | |
| 7,448,678 B2 | 11/2008 | Browne et al. | |
| 7,476,224 B2 | 1/2009 | Petrakis | |
| 7,478,845 B2 | 1/2009 | Mankame et al. | |
| 7,484,735 B2 | 2/2009 | Verbrugge et al. | |
| 7,501,607 B2 | 3/2009 | Camm et al. | |
| 7,506,937 B2 | 3/2009 | Bequet | |
| 7,511,402 B2 | 3/2009 | Ito et al. | |
| 7,527,312 B1 | 5/2009 | Cucknell et al. | |
| 7,556,313 B2 | 7/2009 | Browne et al. | |
| 7,578,661 B2 | 8/2009 | Koeneman | |
| 7,594,697 B2 | 9/2009 | Browne et al. | |
| 7,619,894 B2 | 11/2009 | Wang et al. | |
| 7,661,764 B2 | 2/2010 | Ali et al. | |
| 7,709,995 B2 | 5/2010 | Hanlon et al. | |
| 7,717,520 B2 | 5/2010 | Boren et al. | |
| 7,729,828 B2 | 6/2010 | Gandhi | |
| 7,731,279 B2 | 6/2010 | Asada et al. | |
| 7,735,940 B2 | 6/2010 | Chiu | |
| 7,756,246 B2 | 7/2010 | Mikami et al. | |
| 7,758,121 B2 | 7/2010 | Browne et al. | |
| 7,766,423 B2 | 8/2010 | Alexander et al. | |
| 7,770,391 B2 * | 8/2010 | Melz | F03G 7/065 |
| | | | 60/527 |
| 7,814,810 B2 | 10/2010 | Mitteer | |
| 7,823,382 B2 | 11/2010 | Ukpai et al. | |
| 7,823,972 B2 | 11/2010 | Browne et al. | |
| 7,834,527 B2 | 11/2010 | Rivera et al. | |
| 7,878,459 B2 | 2/2011 | Mabe et al. | |
| 7,883,148 B2 | 2/2011 | Alexander et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 7,905,547 B2 | 3/2011 | Lawall et al. | |
| 7,909,403 B2 | 3/2011 | Lawall et al. | |
| 7,964,290 B2 | 6/2011 | Mullner et al. | |
| 7,965,509 B2 | 6/2011 | Campbell et al. | |
| 7,971,296 B2 | 7/2011 | Jansen | |
| 7,971,939 B2 | 7/2011 | Fujita et al. | |
| 8,016,952 B2 | 9/2011 | Ishida et al. | |
| 8,038,215 B2 | 10/2011 | Gusto et al. | |
| 8,052,112 B2 | 11/2011 | Lawall et al. | |
| 8,056,335 B1 | 11/2011 | Brown | |
| 8,100,471 B2 | 1/2012 | Lawall et al. | |
| 8,109,567 B2 | 2/2012 | Alexander et al. | |
| 8,126,615 B2 | 2/2012 | McMillen et al. | |
| 8,172,458 B2 | 5/2012 | Petrakis | |
| 8,240,677 B2 | 8/2012 | Browne et al. | |
| 8,313,108 B2 | 11/2012 | Ac et al. | |
| 8,362,882 B2 | 1/2013 | Heubel et al. | |
| 8,366,057 B2 | 2/2013 | Vos et al. | |
| 8,414,366 B2 | 4/2013 | Browne et al. | |
| 8,446,475 B2 | 5/2013 | Topliss et al. | |
| 8,448,435 B2 | 5/2013 | Gregory et al. | |
| 8,510,924 B2 | 8/2013 | Mankame et al. | |
| 8,584,456 B1 | 11/2013 | McKnight | |
| 8,585,456 B2 * | 11/2013 | Canon | A63H 3/50 |
| | | | 446/73 |
| 8,593,568 B2 | 11/2013 | Topliss et al. | |
| 8,649,242 B2 | 2/2014 | Martin et al. | |
| 8,681,496 B2 | 3/2014 | Dede | |
| 8,695,334 B2 | 4/2014 | Lewis et al. | |
| 8,702,120 B2 | 4/2014 | Kalisz et al. | |
| 8,721,557 B2 | 5/2014 | Chen et al. | |

(56) References Cited

U.S. PATENT DOCUMENTS

| | | |
|---|---|---|
| 8,741,076 B2 | 6/2014 | Gao et al. |
| 8,756,933 B2 | 6/2014 | Topliss et al. |
| 8,793,821 B2 | 8/2014 | Fowkes et al. |
| 8,827,709 B1 | 9/2014 | Gurule et al. |
| 8,830,335 B2 | 9/2014 | Topliss et al. |
| 8,853,916 B2 | 10/2014 | Browne et al. |
| 8,880,141 B2 | 11/2014 | Chen |
| 8,881,347 B2 | 11/2014 | Feinstein |
| 8,894,142 B2 | 11/2014 | Alexander et al. |
| 8,912,709 B2 | 12/2014 | Pollock et al. |
| 8,991,769 B2 | 3/2015 | Gandhi |
| 8,998,320 B2 | 4/2015 | Mankame et al. |
| 9,068,561 B2 | 6/2015 | Gondo |
| 9,086,069 B2 | 7/2015 | Dede |
| 9,140,243 B2 | 9/2015 | Gandhi et al. |
| 9,168,814 B2 | 10/2015 | Gandhi |
| 9,171,686 B2 | 10/2015 | Alacqua et al. |
| 9,180,525 B2 | 11/2015 | Park et al. |
| 9,267,495 B2 | 2/2016 | Kopfer et al. |
| 9,298,207 B2 | 3/2016 | Li |
| 9,347,609 B2 | 5/2016 | Pinto, IV et al. |
| 9,428,088 B1 | 8/2016 | Rajasingham |
| 9,457,813 B2 | 10/2016 | Hoerwick et al. |
| 9,457,887 B2 | 10/2016 | Roe et al. |
| 9,495,875 B2 | 11/2016 | Dowdall et al. |
| 9,512,829 B2 | 12/2016 | Alacqua et al. |
| 9,550,466 B2 | 1/2017 | Gandhi |
| 9,588,020 B2 | 3/2017 | Browne et al. |
| 9,662,197 B2 | 5/2017 | Yun et al. |
| 9,664,182 B2 | 5/2017 | Nicolini et al. |
| 9,664,210 B2 | 5/2017 | Ou et al. |
| 9,684,183 B2 | 6/2017 | Brown et al. |
| 9,696,175 B2 | 7/2017 | Hansen et al. |
| 9,697,708 B2 | 7/2017 | Adrezin et al. |
| 9,714,460 B2 | 7/2017 | Merideth |
| 9,719,534 B2 | 8/2017 | Shevchenko et al. |
| 9,731,828 B2 | 8/2017 | Lichota |
| 9,764,220 B2 | 9/2017 | Keating et al. |
| 9,784,249 B2 | 10/2017 | Li et al. |
| 9,784,590 B2 | 10/2017 | Englehardt et al. |
| 9,827,888 B2 | 11/2017 | Patrick et al. |
| 9,848,814 B2 | 12/2017 | Benson et al. |
| 9,943,437 B2 | 4/2018 | Lowe et al. |
| 9,945,490 B2 | 4/2018 | Dankbaar et al. |
| 9,981,421 B2 | 5/2018 | Macroe et al. |
| 9,994,136 B2 | 6/2018 | Nakada |
| 10,007,263 B1 | 6/2018 | Fields et al. |
| 10,029,618 B2 | 7/2018 | Perez Astudillo et al. |
| 10,059,334 B1 | 8/2018 | Zhu et al. |
| 10,061,350 B2 | 8/2018 | Magi |
| 10,066,829 B2 | 9/2018 | Wong et al. |
| 10,168,782 B1 | 1/2019 | Tchon et al. |
| 10,191,550 B1 | 1/2019 | Nussbaum et al. |
| 10,208,823 B2 | 2/2019 | Kashani |
| 10,299,520 B1 | 5/2019 | Shaffer et al. |
| 10,302,586 B2 | 5/2019 | Sun et al. |
| 10,315,771 B1 | 6/2019 | Rao et al. |
| 10,330,144 B1 | 6/2019 | Alqasimi et al. |
| 10,330,400 B2 | 6/2019 | Dede |
| 10,335,044 B2 | 7/2019 | Banet et al. |
| 10,349,543 B2 | 7/2019 | Sreetharan et al. |
| 10,355,624 B2 | 7/2019 | Majdi et al. |
| 10,371,229 B2 | 8/2019 | Gandhi et al. |
| 10,371,299 B2 | 8/2019 | Leffler |
| 10,377,278 B2 | 8/2019 | Ketels et al. |
| 10,427,634 B2 | 10/2019 | Gandhi et al. |
| 10,434,973 B2 | 10/2019 | Gandhi et al. |
| 10,441,491 B2 | 10/2019 | Wyatt et al. |
| 10,459,475 B2 | 10/2019 | Gandhi et al. |
| 10,479,246 B2 | 11/2019 | Meingast et al. |
| 10,532,672 B1 | 1/2020 | Pinkelman et al. |
| 10,583,757 B2 | 3/2020 | Ketels et al. |
| 10,591,078 B2 | 3/2020 | Oehler et al. |
| 10,647,237 B2 | 5/2020 | Song |
| 10,677,310 B2 | 6/2020 | Gandhi et al. |
| 10,682,931 B2 | 6/2020 | Rowe et al. |
| 10,759,320 B2 | 9/2020 | Mochizuki |
| 10,773,487 B2 | 9/2020 | Frigerio et al. |
| 10,781,800 B2 | 9/2020 | Brown et al. |
| 10,814,514 B2 | 10/2020 | Aihara |
| 10,843,611 B2 | 11/2020 | Caruss et al. |
| 10,933,974 B2 | 3/2021 | Tsuruta et al. |
| 10,960,793 B2 | 3/2021 | Gandhi et al. |
| 10,965,172 B2 | 3/2021 | Dede et al. |
| 10,993,526 B2 | 5/2021 | Vandewall et al. |
| 10,995,779 B2 | 5/2021 | Keplinger et al. |
| 11,048,329 B1 | 6/2021 | Lee et al. |
| 11,091,060 B2 | 8/2021 | Pinkelman et al. |
| 11,125,248 B2 | 9/2021 | Joshi et al. |
| 11,137,045 B2 | 10/2021 | Gandhi et al. |
| 11,180,052 B2 | 11/2021 | Severgnini et al. |
| 11,241,842 B2 | 2/2022 | Gandhi et al. |
| 11,247,584 B2 | 2/2022 | Breitweg et al. |
| 11,248,592 B1 | 2/2022 | Tsuruta et al. |
| 11,269,891 B2 | 3/2022 | Frank et al. |
| 11,285,844 B2 | 3/2022 | Gandhi et al. |
| 11,353,009 B1 | 6/2022 | Rowe et al. |
| 11,356,255 B1 | 6/2022 | Emelyanov et al. |
| 11,370,330 B2 | 6/2022 | Gandhi et al. |
| 11,372,481 B2 | 6/2022 | Leroy et al. |
| 11,377,007 B2 | 7/2022 | Samain et al. |
| 11,458,874 B2 | 10/2022 | Nagai et al. |
| 11,460,009 B1 | 10/2022 | Tsuruta et al. |
| 11,460,010 B1 | 10/2022 | Tsuruta et al. |
| 11,467,669 B2 | 10/2022 | Liu et al. |
| 11,472,325 B1 | 10/2022 | Tsuruta et al. |
| 11,486,421 B2 | 11/2022 | Keplinger et al. |
| 11,536,255 B1 | 12/2022 | Rowe |
| 11,542,925 B1 | 1/2023 | Rowe et al. |
| 11,577,471 B2 | 2/2023 | Gandhi et al. |
| 11,591,076 B2 | 2/2023 | Song et al. |
| 11,592,010 B1 | 2/2023 | Panwar et al. |
| 11,592,037 B1 | 2/2023 | Rowe et al. |
| 11,603,153 B1 | 3/2023 | Trager et al. |
| 11,603,828 B2 | 3/2023 | Gummin et al. |
| 11,624,376 B2 | 4/2023 | Rowe et al. |
| 11,628,898 B1 | 4/2023 | Trager et al. |
| 11,642,083 B2 | 5/2023 | Severgnini et al. |
| 11,649,808 B2 | 5/2023 | Tsuruta et al. |
| 11,668,287 B2 | 6/2023 | Naly et al. |
| 11,702,015 B2 | 7/2023 | Pinkelman et al. |
| 11,732,735 B2 | 8/2023 | Song et al. |
| 11,750,115 B2 | 9/2023 | Saneyoshi et al. |
| 11,752,901 B2 | 9/2023 | Gandhi et al. |
| 11,795,924 B2 | 10/2023 | Rowe |
| 11,840,161 B2 | 12/2023 | Schmalenberg et al. |
| 11,841,008 B1 | 12/2023 | Panwar et al. |
| 11,885,428 B2 | 1/2024 | Panwar et al. |
| 11,897,379 B2 | 2/2024 | Tsuruta et al. |
| 11,913,436 B2 | 2/2024 | Easton et al. |
| 11,927,206 B2 | 3/2024 | Rowe et al. |
| 2002/0130754 A1 | 9/2002 | Alacqua et al. |
| 2002/0179663 A1 | 12/2002 | Moore et al. |
| 2003/0000605 A1 | 1/2003 | Homma |
| 2003/0182041 A1 | 9/2003 | Watson |
| 2004/0035108 A1 | 2/2004 | Szilagyi |
| 2004/0041998 A1 | 3/2004 | Haddad |
| 2004/0104580 A1 | 6/2004 | Spiessl et al. |
| 2004/0118854 A1 | 6/2004 | Kutun |
| 2004/0145230 A1 | 7/2004 | Fujita et al. |
| 2004/0195888 A1 | 10/2004 | Frye |
| 2004/0256920 A1 | 12/2004 | Gummin et al. |
| 2004/0261411 A1 | 12/2004 | MacGregor |
| 2005/0023086 A1 | 2/2005 | Szilagyi |
| 2005/0082897 A1 | 4/2005 | Ropp et al. |
| 2005/0066810 A1 | 5/2005 | Schulz |
| 2005/0111177 A1 | 5/2005 | Kwitek |
| 2005/0146147 A1 | 7/2005 | Niskanen et al. |
| 2005/0198904 A1 | 9/2005 | Browne et al. |
| 2005/0199455 A1 | 9/2005 | Browne |
| 2005/0199845 A1 | 9/2005 | Jones et al. |
| 2005/0206096 A1 | 9/2005 | Browne et al. |
| 2005/0210874 A1 | 9/2005 | Browne et al. |
| 2005/0211198 A1 | 9/2005 | Froeschle et al. |

(56) References Cited

U.S. PATENT DOCUMENTS

| | | |
|---|---|---|
| 2005/0227607 A1 | 10/2005 | Stevenson et al. |
| 2005/0253425 A1 | 11/2005 | Asada et al. |
| 2006/0033312 A1 | 2/2006 | Barvosa-Carter et al. |
| 2006/0038643 A1 | 2/2006 | Xu et al. |
| 2006/0038745 A1 | 2/2006 | Naksen et al. |
| 2006/0074325 A1 | 4/2006 | Karo et al. |
| 2006/0201149 A1 | 9/2006 | Biggs et al. |
| 2006/0223637 A1 | 10/2006 | Rosenberg |
| 2006/0226013 A1 | 10/2006 | Decre et al. |
| 2006/0244293 A1 | 11/2006 | Buffa |
| 2006/0265965 A1 | 11/2006 | Butera et al. |
| 2007/0025575 A1 | 2/2007 | Oser et al. |
| 2007/0046074 A1 | 3/2007 | Satta et al. |
| 2007/0063566 A1 | 3/2007 | Browne et al. |
| 2007/0084220 A1 | 4/2007 | Asada et al. |
| 2007/0188004 A1 | 8/2007 | Browne et al. |
| 2007/0205853 A1 | 9/2007 | Taya et al. |
| 2007/0236071 A1 | 10/2007 | Fujita et al. |
| 2007/0246285 A1 | 10/2007 | Browne et al. |
| 2007/0246898 A1 | 10/2007 | Keefe et al. |
| 2007/0246979 A1 | 10/2007 | Browne et al. |
| 2007/0271939 A1 | 11/2007 | Ichigaya |
| 2007/0277877 A1 | 12/2007 | Ghorbal et al. |
| 2008/0006353 A1 | 1/2008 | Elzey et al. |
| 2008/0018198 A1 | 1/2008 | Sohn et al. |
| 2008/0085436 A1 | 4/2008 | Langan et al. |
| 2008/0100118 A1 | 5/2008 | Young et al. |
| 2008/0114218 A1 | 5/2008 | Suyama et al. |
| 2008/0219501 A1 | 9/2008 | Matsumoto |
| 2008/0267770 A1 | 10/2008 | Webster et al. |
| 2008/0271559 A1 | 11/2008 | Garscha et al. |
| 2008/0272259 A1 | 11/2008 | Zavattieri et al. |
| 2008/0307786 A1 | 12/2008 | Hafez et al. |
| 2009/0008973 A1 | 1/2009 | Browne |
| 2009/0009656 A1 | 1/2009 | Honda et al. |
| 2009/0030576 A1 | 1/2009 | Periot et al. |
| 2009/0041085 A1 | 2/2009 | Petrakis |
| 2009/0108607 A1 | 4/2009 | Browne et al. |
| 2009/0115284 A1 | 5/2009 | Liang et al. |
| 2009/0131752 A1 | 5/2009 | Park |
| 2009/0143730 A1 | 6/2009 | De Polo et al. |
| 2009/0173305 A1 | 7/2009 | Alexander et al. |
| 2009/0212158 A1 | 8/2009 | Mabe et al. |
| 2009/0218858 A1 | 9/2009 | Lawall et al. |
| 2009/0224584 A1 | 9/2009 | Lawall et al. |
| 2009/0224587 A1 | 9/2009 | Lawall et al. |
| 2009/0241537 A1 | 10/2009 | Browne et al. |
| 2009/0242285 A1 | 10/2009 | Whetstone, Jr. |
| 2009/0283643 A1 | 11/2009 | Sar et al. |
| 2009/0284059 A1 | 11/2009 | Gupta et al. |
| 2010/0001568 A1 | 1/2010 | Trybus et al. |
| 2010/0027119 A1 | 2/2010 | Kollar et al. |
| 2010/0031525 A1 | 2/2010 | Allezy et al. |
| 2010/0036567 A1 | 2/2010 | Gandhi |
| 2010/0066142 A1 | 3/2010 | Gross et al. |
| 2010/0117663 A1 | 5/2010 | Herrera et al. |
| 2010/0192567 A1 | 8/2010 | Butera |
| 2010/0212312 A1* | 8/2010 | Rudduck ............... F03G 7/065 60/527 |
| 2010/0221124 A1 | 9/2010 | Ikushima et al. |
| 2010/0244505 A1 | 9/2010 | Demick et al. |
| 2010/0275592 A1 | 11/2010 | Topliss et al. |
| 2010/0282902 A1 | 11/2010 | Rajasingham |
| 2010/0287965 A1 | 11/2010 | Bryant |
| 2010/0294476 A1 | 11/2010 | Gomi et al. |
| 2010/0308689 A1 | 12/2010 | Rahman et al. |
| 2010/0326070 A1 | 12/2010 | Hao et al. |
| 2011/0021932 A1 | 1/2011 | Kim et al. |
| 2011/0030380 A1 | 2/2011 | Widdle, Jr. et al. |
| 2011/0038727 A1 | 2/2011 | Vos et al. |
| 2011/0111839 A1 | 5/2011 | Lesley et al. |
| 2011/0120119 A1 | 5/2011 | Alexander et al. |
| 2011/0150669 A1 | 6/2011 | Frayne et al. |
| 2011/0179790 A1 | 7/2011 | Pretorius |
| 2011/0217031 A1 | 9/2011 | Eromaki |
| 2011/0300358 A1 | 12/2011 | Blohowiak et al. |
| 2012/0019216 A1 | 1/2012 | Lewis et al. |
| 2012/0049095 A1 | 3/2012 | Yamasaki |
| 2012/0056459 A1 | 3/2012 | Harden |
| 2012/0081337 A1 | 4/2012 | Camp, Jr. et al. |
| 2012/0109025 A1 | 5/2012 | Weinberg et al. |
| 2012/0136126 A1 | 5/2012 | Rousseau |
| 2012/0181896 A1 | 7/2012 | Kornbluh et al. |
| 2012/0232783 A1 | 9/2012 | Calkins et al. |
| 2012/0237309 A1 | 9/2012 | Park et al. |
| 2012/0239183 A1 | 9/2012 | Mankame et al. |
| 2012/0267928 A1 | 10/2012 | Mankame et al. |
| 2012/0276807 A1 | 11/2012 | Cabrera |
| 2012/0292155 A1 | 11/2012 | Gunter |
| 2012/0297763 A1* | 11/2012 | Mankame ............... F03G 7/065 60/527 |
| 2012/0319445 A1 | 12/2012 | Zolno et al. |
| 2013/0005442 A1 | 1/2013 | Erickson et al. |
| 2013/0011806 A1 | 1/2013 | Gao et al. |
| 2013/0043354 A1 | 2/2013 | Shome et al. |
| 2013/0075210 A1 | 3/2013 | Langbein et al. |
| 2013/0098029 A1 | 4/2013 | Pinto, IV et al. |
| 2013/0188313 A1 | 7/2013 | Dede |
| 2013/0205770 A1 | 8/2013 | Browne et al. |
| 2013/0227943 A1 | 9/2013 | Mance et al. |
| 2014/0130491 A1 | 5/2014 | Gandhi et al. |
| 2014/0168894 A1 | 6/2014 | Dede |
| 2014/0196633 A1 | 7/2014 | Shaw |
| 2014/0207333 A1 | 7/2014 | Vandivier et al. |
| 2014/0217792 A1 | 8/2014 | Meyer |
| 2014/0239677 A1 | 8/2014 | Laib et al. |
| 2014/0250881 A1 | 9/2014 | Yamamoto |
| 2014/0265468 A1 | 9/2014 | Greenhill et al. |
| 2014/0265479 A1 | 9/2014 | Bennett |
| 2014/0277739 A1 | 9/2014 | Kornbluh et al. |
| 2014/0298794 A1 | 10/2014 | Flaschentrager et al. |
| 2014/0314976 A1 | 10/2014 | Niiyama et al. |
| 2014/0316269 A1 | 10/2014 | Zhang et al. |
| 2014/0333088 A1 | 11/2014 | Lang et al. |
| 2014/0338324 A1 | 11/2014 | Jasklowski |
| 2015/0016968 A1 | 1/2015 | Grabowska et al. |
| 2015/0130220 A1 | 5/2015 | Preisler et al. |
| 2015/0185764 A1 | 7/2015 | Magi |
| 2015/0197173 A1 | 7/2015 | Hulway |
| 2015/0202993 A1 | 7/2015 | Mankame et al. |
| 2015/0274078 A1* | 10/2015 | Alacqua ............... F03G 7/065 60/528 |
| 2015/0289994 A1 | 10/2015 | Engeberg et al. |
| 2015/0290015 A1 | 10/2015 | Elahinia et al. |
| 2015/0331488 A1 | 11/2015 | Grant et al. |
| 2015/0366350 A1 | 12/2015 | DiCenso et al. |
| 2016/0004298 A1 | 1/2016 | Mazed et al. |
| 2016/0032997 A1 | 2/2016 | Seepersad et al. |
| 2016/0061345 A1 | 3/2016 | Jackson, Jr. |
| 2016/0082984 A1 | 3/2016 | Schmidt |
| 2016/0084665 A1 | 3/2016 | Englehardt et al. |
| 2016/0123793 A1 | 5/2016 | Kollich et al. |
| 2016/0221475 A1 | 8/2016 | Sugiyama |
| 2016/0246374 A1 | 8/2016 | Carter et al. |
| 2016/0278459 A1 | 9/2016 | Hilty |
| 2016/0325837 A1 | 11/2016 | Erhel et al. |
| 2016/0345088 A1 | 11/2016 | Vilermo et al. |
| 2016/0375835 A1 | 12/2016 | Murray et al. |
| 2017/0116792 A1 | 4/2017 | Jelinek et al. |
| 2017/0121068 A1 | 5/2017 | Foshansky et al. |
| 2017/0123499 A1 | 5/2017 | Eid |
| 2017/0148102 A1 | 5/2017 | Franke et al. |
| 2017/0153707 A1 | 6/2017 | Subramanian et al. |
| 2017/0158104 A1 | 6/2017 | Le et al. |
| 2017/0166222 A1 | 6/2017 | James |
| 2017/0174236 A1 | 6/2017 | Worden et al. |
| 2017/0203432 A1 | 7/2017 | Andrianesis |
| 2017/0240075 A1 | 8/2017 | McCoy et al. |
| 2017/0252260 A1 | 9/2017 | Gummin et al. |
| 2017/0328384 A1 | 11/2017 | Goto et al. |
| 2017/0355288 A1 | 12/2017 | Barbat et al. |
| 2018/0001113 A1 | 1/2018 | Streeter |
| 2018/0012433 A1 | 1/2018 | Ricci |
| 2018/0036198 A1 | 2/2018 | Mergl et al. |

(56) References Cited

U.S. PATENT DOCUMENTS

| | | |
|---|---|---|
| 2018/0073491 A1 | 3/2018 | Gissen et al. |
| 2018/0084915 A1 | 3/2018 | Norman et al. |
| 2018/0115260 A1 | 4/2018 | Chiba et al. |
| 2018/0130347 A1 | 5/2018 | Ricci et al. |
| 2018/0132825 A1 | 5/2018 | Tachibana |
| 2018/0134191 A1 | 5/2018 | Ketels et al. |
| 2018/0141562 A1 | 5/2018 | Singhal |
| 2018/0149141 A1 | 5/2018 | Cullen et al. |
| 2018/0151035 A1 | 5/2018 | Maalouf et al. |
| 2018/0178808 A1 | 6/2018 | Zhao et al. |
| 2018/0249772 A1 | 9/2018 | Koo et al. |
| 2018/0251234 A1 | 9/2018 | Wang |
| 2018/0264975 A1 | 9/2018 | Bonk et al. |
| 2018/0281621 A1 | 10/2018 | Kaku et al. |
| 2018/0286189 A1 | 10/2018 | Motamedi et al. |
| 2018/0321703 A1 | 11/2018 | Gandhi et al. |
| 2018/0345841 A1 | 12/2018 | Prokhorov et al. |
| 2018/0348759 A1 | 12/2018 | Freeman et al. |
| 2018/0355991 A1 | 12/2018 | Pfahler |
| 2019/0005272 A1 | 1/2019 | Gault et al. |
| 2019/0023161 A1 | 1/2019 | Sullivan et al. |
| 2019/0039525 A1 | 2/2019 | Hu |
| 2019/0041986 A1 | 2/2019 | Rihn et al. |
| 2019/0042857 A1 | 2/2019 | Endo et al. |
| 2019/0059608 A1 | 2/2019 | Yan et al. |
| 2019/0061307 A1 | 2/2019 | Chen et al. |
| 2019/0083022 A1 | 3/2019 | Huang |
| 2019/0135150 A1 | 5/2019 | Gao et al. |
| 2019/0143869 A1 | 5/2019 | Sequi et al. |
| 2019/0154122 A1 | 5/2019 | Lima et al. |
| 2019/0197842 A1 | 6/2019 | Long et al. |
| 2019/0232842 A1 | 8/2019 | Boccuccia et al. |
| 2019/0291649 A1 | 9/2019 | Ito |
| 2020/0010001 A1 | 1/2020 | Pinkelman et al. |
| 2020/0015493 A1 | 1/2020 | Ergun et al. |
| 2020/0015593 A1 | 1/2020 | Norman et al. |
| 2020/0032822 A1 | 1/2020 | Keplinger et al. |
| 2020/0088175 A1 | 3/2020 | Li et al. |
| 2020/0112269 A1 | 4/2020 | Taghavi et al. |
| 2020/0179168 A1 | 6/2020 | Kelleher et al. |
| 2020/0197250 A1 | 6/2020 | Wyatt et al. |
| 2020/0223325 A1 | 7/2020 | Pinkelman et al. |
| 2020/0238854 A1 | 7/2020 | Gandhi et al. |
| 2020/0247274 A1 | 8/2020 | Gandhi et al. |
| 2020/0276971 A1 | 9/2020 | Takeda et al. |
| 2020/0282878 A1 | 9/2020 | Gandhi et al. |
| 2020/0298732 A1 | 9/2020 | Gandhi et al. |
| 2020/0307416 A1 | 10/2020 | Gandhi et al. |
| 2020/0309102 A1 | 10/2020 | Henderson et al. |
| 2020/0339242 A1 | 10/2020 | Tsuruta et al. |
| 2020/0377036 A1 | 12/2020 | Lee et al. |
| 2020/0378370 A1 | 12/2020 | Kopfer et al. |
| 2021/0095646 A1 | 4/2021 | Blecha et al. |
| 2021/0118597 A1 | 4/2021 | Pinkelman et al. |
| 2021/0132396 A1 | 5/2021 | Shin et al. |
| 2021/0153754 A1 | 5/2021 | Ozawa et al. |
| 2021/0162457 A1 | 6/2021 | Eberfors |
| 2021/0221269 A1 | 7/2021 | Baranowski et al. |
| 2021/0236061 A1 | 8/2021 | Severgnini et al. |
| 2021/0237809 A1 | 8/2021 | Rowe et al. |
| 2021/0265922 A1 | 8/2021 | Nakagawa |
| 2022/0001530 A1 | 1/2022 | Sameoto et al. |
| 2022/0012458 A1 | 1/2022 | Uetabira |
| 2022/0031178 A1 | 2/2022 | Brulet et al. |
| 2022/0106941 A1 | 4/2022 | Easton |
| 2022/0119202 A1 | 4/2022 | Morrissey et al. |
| 2022/0154703 A1 | 5/2022 | Shin et al. |
| 2022/0164079 A1 | 5/2022 | Severgnini et al. |
| 2022/0196109 A1 | 6/2022 | Gandhi et al. |
| 2022/0242328 A1 | 8/2022 | Pinkelman et al. |
| 2022/0258656 A1 | 8/2022 | Little |
| 2022/0299016 A1 | 9/2022 | Tsuruta et al. |
| 2022/0307485 A1 | 9/2022 | Gummin et al. |
| 2022/0314857 A1 | 10/2022 | Tsuruta et al. |
| 2022/0316458 A1 | 10/2022 | Tsuruta et al. |
| 2022/0412325 A1* | 12/2022 | Köpfer .................. F03G 7/064 |
| 2023/0078040 A1 | 3/2023 | Rowe et al. |
| 2023/0088911 A1 | 3/2023 | Song et al. |
| 2023/0119407 A1 | 4/2023 | Sugiyama et al. |
| 2023/0120436 A1 | 4/2023 | Tsuruta et al. |
| 2023/0124526 A1 | 4/2023 | Tsuruta et al. |
| 2023/0136197 A1 | 5/2023 | Gilmore et al. |
| 2023/0179122 A1 | 6/2023 | Palaniswamy et al. |
| 2023/0185077 A1* | 6/2023 | Smolka .................. H02N 10/00 359/221.2 |
| 2023/0191953 A1 | 6/2023 | Panwar et al. |
| 2023/0193929 A1 | 6/2023 | Rowe et al. |
| 2023/0287871 A1 | 9/2023 | Rowe |
| 2023/0312109 A1 | 10/2023 | Joshi et al. |
| 2023/0331371 A1 | 10/2023 | Gupta et al. |
| 2023/0331372 A1 | 10/2023 | Gupta et al. |
| 2023/0337827 A1 | 10/2023 | Pinkelman et al. |
| 2024/0060480 A1 | 2/2024 | Panwar et al. |

FOREIGN PATENT DOCUMENTS

| | | |
|---|---|---|
| CN | 101417152 A | 4/2009 |
| CN | 102333504 A | 1/2012 |
| CN | 102152309 B | 11/2012 |
| CN | 103038094 A | 4/2013 |
| CN | 103147511 A | 6/2013 |
| CN | 102026842 B | 7/2013 |
| CN | 103935495 A | 7/2014 |
| CN | 102765354 B | 11/2014 |
| CN | 104290617 A | 1/2015 |
| CN | 204774820 U | 11/2015 |
| CN | 105517664 A | 4/2016 |
| CN | 106168523 A | 11/2016 |
| CN | 107111473 A | 1/2017 |
| CN | 206029888 U | 3/2017 |
| CN | 105946515 B | 4/2018 |
| CN | 108100228 A | 6/2018 |
| CN | 108819806 A | 11/2018 |
| CN | 106014897 B | 12/2018 |
| CN | 106956254 B | 3/2019 |
| CN | 109572966 A | 4/2019 |
| CN | 209010975 U | 6/2019 |
| CN | 105003405 B | 7/2019 |
| CN | 107485536 B | 1/2020 |
| CN | 112411375 A | 2/2021 |
| CN | 115706489 A | 2/2023 |
| DE | 10155119 B4 | 5/2003 |
| DE | 20309196 U1 | 11/2003 |
| DE | 10222022 A1 | 12/2003 |
| DE | 102010021902 A1 | 12/2011 |
| DE | 102016210214 A1 | 12/2017 |
| DE | 102019204866 A1 | 10/2020 |
| DE | 102008021679 B4 | 1/2021 |
| EP | 1420094 A1 | 5/2004 |
| EP | 1519055 A2 | 3/2005 |
| EP | 1904337 B1 | 10/2010 |
| EP | 2723069 A1 | 4/2014 |
| EP | 3196484 A1 | 7/2017 |
| FR | 3058108 A1 | 5/2018 |
| JP | S5870892 U | 5/1983 |
| JP | S61277898 A | 12/1986 |
| JP | H03276698 A | 12/1991 |
| JP | H06033895 A | 6/1994 |
| JP | 09-133069 A | 5/1997 |
| JP | H09168285 A | 6/1997 |
| JP | H10337061 A | 12/1998 |
| JP | 2003276698 A | 10/2003 |
| JP | 3706899 B2 | 10/2005 |
| JP | 2006000347 A | 1/2006 |
| JP | 2006006581 A | 1/2006 |
| JP | 2006248456 A | 9/2006 |
| JP | 2008014470 A | 1/2008 |
| JP | 2008138558 A | 6/2008 |
| JP | 2008154447 A | 7/2008 |
| JP | 4273902 B2 | 6/2009 |
| JP | 2009162233 A | 7/2009 |
| JP | 2010117457 A | 5/2010 |
| JP | 4576281 B2 | 11/2010 |
| JP | 5760241 | 8/2015 |

(56) References Cited

FOREIGN PATENT DOCUMENTS

| | | |
|---|---|---|
| JP | 2017175155 A | 9/2017 |
| JP | 2018188035 A | 11/2018 |
| JP | 2019094789 A | 6/2019 |
| JP | 2019101988 A | 6/2019 |
| JP | 2020090181 A | 6/2020 |
| JP | 2021107221 A | 7/2021 |
| KR | 19980044089 U | 9/1998 |
| KR | 20050056526 A | 6/2005 |
| KR | 1020130005989 | 1/2013 |
| KR | 101395364 B1 | 5/2014 |
| KR | 101861620 B1 | 4/2018 |
| KR | 1020180074003 A | 7/2018 |
| KR | 101931791 B1 | 12/2018 |
| KR | 20210052091 A | 5/2021 |
| KR | 20210086518 A | 7/2021 |
| KR | 102298464 B1 | 9/2021 |
| WO | 02011648 A1 | 2/2002 |
| WO | 2005004321 A1 | 1/2005 |
| WO | 2009079668 A2 | 6/2009 |
| WO | 2009111362 A2 | 9/2009 |
| WO | 2011017071 A2 | 2/2011 |
| WO | 2011111769 A1 | 9/2011 |
| WO | 2014145018 A2 | 9/2014 |
| WO | 2014172320 A1 | 10/2014 |
| WO | 2015037600 A1 | 3/2015 |
| WO | 2016017057 A1 | 2/2016 |
| WO | 2016130719 A2 | 8/2016 |
| WO | 2017077541 A1 | 5/2017 |
| WO | 2019043599 A1 | 3/2019 |
| WO | 2019097437 A1 | 5/2019 |
| WO | 2019173227 A1 | 9/2019 |
| WO | 2020110091 A2 | 6/2020 |
| WO | 2020183360 A1 | 9/2020 |
| WO | 2021118185 A2 | 6/2021 |

OTHER PUBLICATIONS

"HapWRAP: Soft Growing Wearable Haptic Device", retrieved from the Internet: <https://smartdevicess.createdsites.com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag—Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: <https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).
El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).
Park et al., "A Novel Fabric Muscle Based on Shape Memory Alloy Springs", Soft Robotics, vol. 7, No. 3, 2020 (11 pages).
Ebay, "Cardboard Dividers 5 Sets 7.5" X 10.5" X 4" High 12 cell", retrieved from the Internet: <https://www.ebay.comitm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al., "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, pp. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).
Alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, [Retrieved May 2, 2017] (3 pages).
Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 798100, Apr. 13, 2011 (8 pages).
Henry, "Dynamic Actuation Properties of Ni—Mn—Ga Ferromagnetic Shape Memory Alloys", submitted to the Massachusetts Institute of Technology Department of Materials Science and Engineering on May 22, 2002, images on pp. 64-66 (202 pages).

(56) References Cited

OTHER PUBLICATIONS

Zhu et al., U.S. Appl. No. 18/433,896, filed Feb. 6, 2024.
Rowe et al., U.S. Appl. No. 18/468,029, filed Sep. 15, 2023.
Rowe et al., U.S. Appl. No. 18/399,026, filed Dec. 28, 2023.
Rowe et al., U.S. Appl. No. 18/178,302, filed Mar. 3, 2023.
Song et al., "Resistance Modelling of SMA Wire Actuators", Canadian Institute for NDE, International Workshop: Smart Materials, Structures & NDT in Aerospace Conference, Nov. 2011 (10 pages).
Rowe et al., U.S. Appl. No. 18/452,602, filed Aug. 21, 2023.
Motzki, "Efficient SMA Actuation-Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on Apr. 5, 2020 by user "Andreas Spiess" accessible via the Internet: <https://www.youtube.com/watch?v=cG8moaufmQs>.
Williams et al., U.S. Appl. No. 18/738,516, filed Jun. 10, 2024.
International Search Report and Written Opinion for International Application No. PCT/US2024/014595 mailed on Jul. 15, 2024 (16 pages).
Rowe et al., U.S. Appl. No. 18/453,395, filed Aug. 22, 2023.
Rowe et al., U.S. Appl. No. 18/329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,734, filed Aug. 21, 2023.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga Adrenaline—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).
Edragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Zhu et al., U.S. Appl. No. 18/172,637, filed Feb. 22, 2023.
Pinkelman et al., U.S. Appl. No. 17/729,522, filed Apr. 26, 2022.
Ou et al., "jamSheets: Thin Interfaces with Tunable Stiffness Enabled by Layer Jamming," Proceedings of the 8th International Conference on Tangible, Embedded, and Embodied Interaction, 2014 (8 pages).
Ou et al., "aeroMorph—Heat-sealing Inflatable Shape-change Materials for Interaction Design," Proceedings of the 29th Annual Symposium on User Interface Software and Technology (2016) pp. 121-132 (10 pages).
Zhu et al., U.S. Appl. No. 18/399,075, filed Dec. 28, 2023.

* cited by examiner

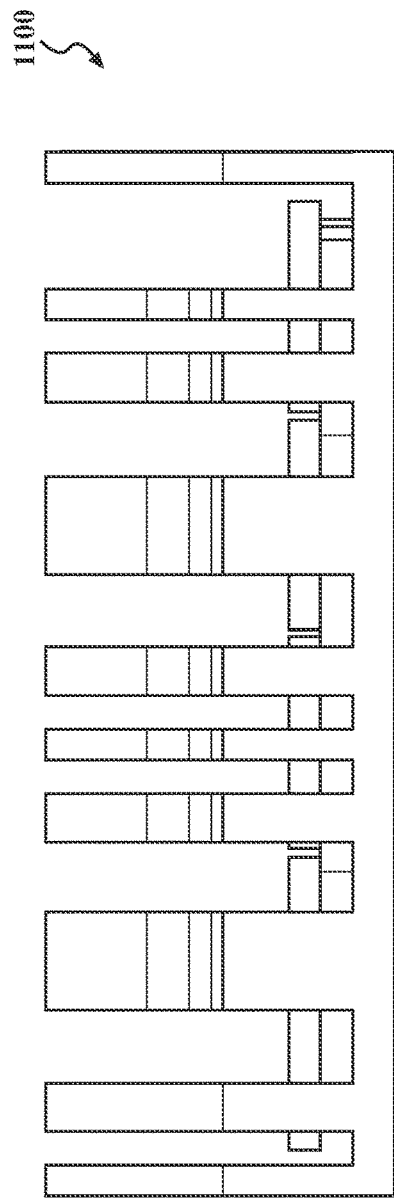
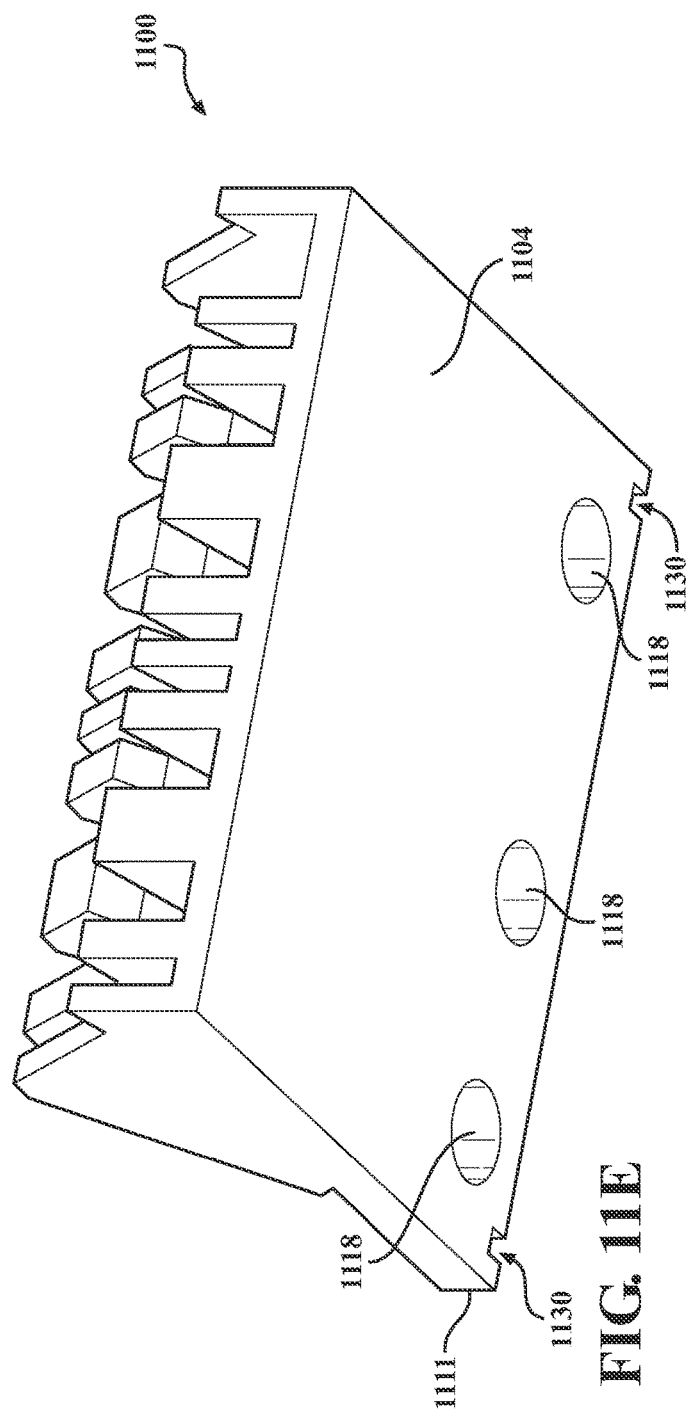
FIG. 11D
FIG. 11E

ACTUATOR WITH CONTRACTING MEMBER

CROSS-REFERENCE TO RELATED APPLICATIONS

This application is a continuation in part of U.S. patent application Ser. No. 18/329,217, filed on Jun. 5, 2023, which claims the benefit of U.S. Provisional Application No. 63/485,398, filed on Feb. 16, 2023, each of which is incorporated herein by reference in its entirety.

FIELD

The subject matter described herein relates in general to actuators and, more particularly, to actuators that include contracting members.

BACKGROUND

Shape memory alloys change shape when an activation input is provided to the material. When the activation input is discontinued, the material returns to its original shape. Shape memory alloys are used in some actuator designs.

SUMMARY

In one respect, the present disclosure is directed to an actuator. The actuator can include an outer body. At least a portion of the outer body can be configured to pivot. The actuator can include a contracting member. The contracting member can be operatively connected to opposing end portions of the actuator. When an activation input is provided to the contracting member, the contracting member can contract such that the opposing end portions of the actuator move toward each other. As a result, the actuator can be caused to morph into an activated configuration in which a dimension of the actuator increases.

In another respect, the present disclosure is directed to an actuator. The actuator can include an outer body. The outer body can include a first outer body portion and a second outer body portion arranged in a scissored configuration. The actuator can include a contracting member. When an activation input is provided to the contracting member, the contracting member can contract. As a result, the actuator can be caused to morph into an activated configuration in which a height of the actuator increases.

In still another respect, the present disclosure is directed to an actuator. The actuator can include an outer body. The outer body can include a first portion and a second portion pivotably connected to each other. The actuator can include a contracting member operatively connected to the first portion and the second portion. The actuator can include a track. The first portion and the second portion can operatively engage the track. When an activation input is provided to the contracting member, the contracting member can contract. As a result, the actuator can be caused to morph into an activated configuration in which a height of the actuator increases.

In yet another respect, the present disclosure is directed to an actuator. The actuator can include an outer body. The outer body can include a first portion, a second portion, and a cross body member operatively connected to the first portion and the second portion. The actuator can include a contracting member operatively connected to the first portion and the second portion. The actuator can include a track. The first portion and the second portion can operatively engage the track. When an activation input is provided to the contracting member, the contracting member can contract. As a result, the actuator can be caused to morph into an activated configuration in which a height of the actuator increases.

In a further respect, the present disclosure is directed to a system. The system can include an actuator. The actuator can include an outer body. At least a portion of the outer body can be configured to pivot. The actuator can include a contracting member. The system can include one or more processors operatively connected to selectively activate the contracting member. When an activation input is provided to the contracting member, the contracting member can contract. As a result, the actuator can be caused to morph into an activated configuration in which a dimension of the actuator increases.

BRIEF DESCRIPTION OF THE DRAWINGS

FIGS. 11A-11E show different views of an endcap portion for the actuator of FIG. 10.

DETAILED DESCRIPTION

Figure 1:
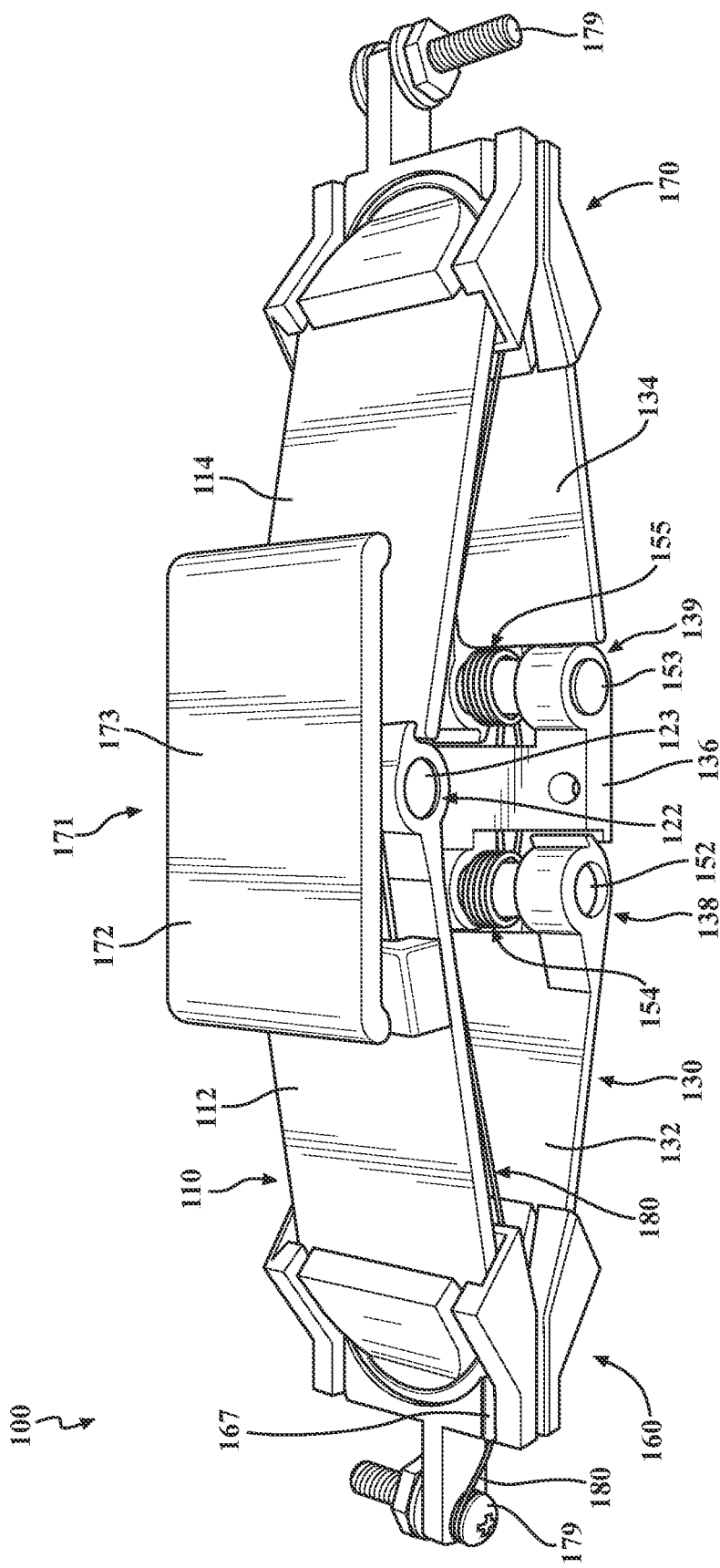
FIG. 1 is a view of an example of an actuator.

Accordingly, arrangements described herein are directed to, among other things, an actuator. The actuator can include one or more contracting members. The actuator can include an outer body member. At least a portion of the outer body can be configured to pivot. The actuator can have various configurations.

When an activation input (e.g., energy, heat, electrical energy, current, etc.) is provided to the one or more contracting member, the one or more contracting member can contract. As a result, the actuator can be caused to morph into an activated configuration in which a dimension (e.g., height) of the actuator increases.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-30, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Arrangements described herein are directed to an actuator. Generally, the actuator can include one or more shape memory material members. The actuator can have any suitable form. One example of an actuator will be described herein. However, it will be understood this example is not intended to be limiting. Indeed, there are numerous actuator designs that include one or more shape memory material members that can be operated according to arrangements described herein.

Figure 2:
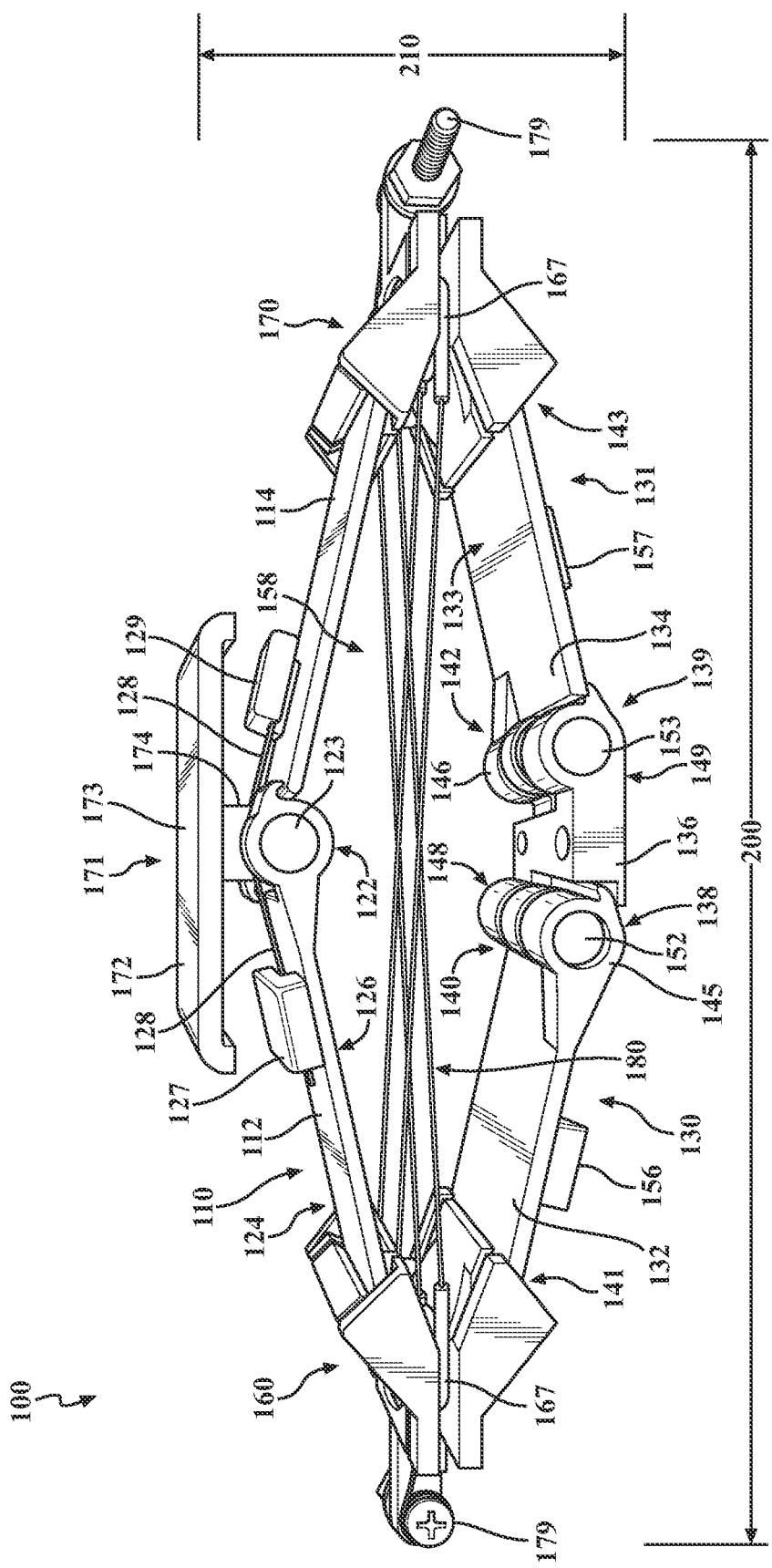
FIG. 2 is a view of the actuator of FIG. 1, showing a non-activated condition.
Figure 3:
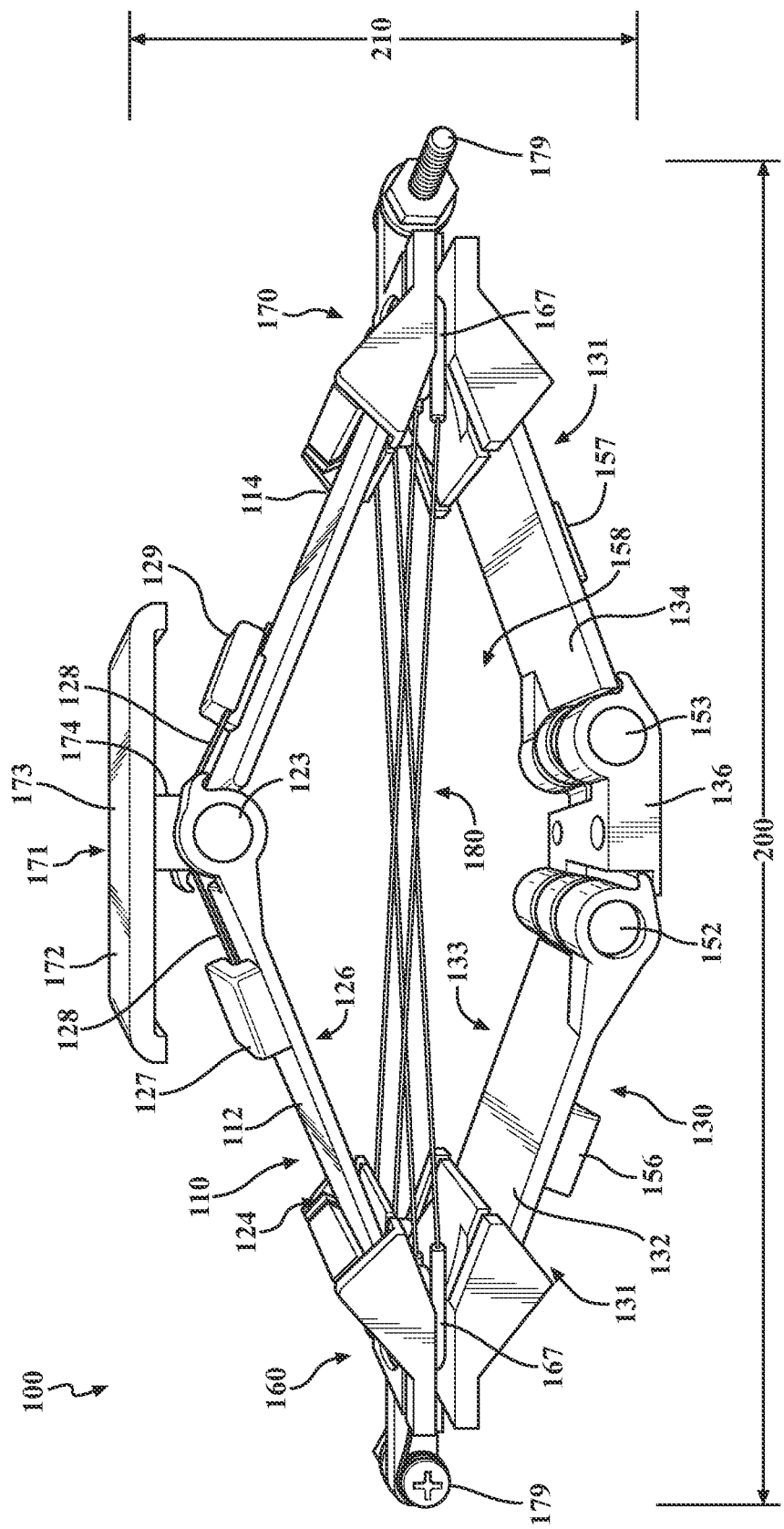
FIG. 3 is a view of the actuator of FIG. 1, showing an activated condition.

Referring to FIGS. 1-3, an example of an actuator 100 is shown. The actuator 100 can have any suitable configuration. The actuator 100 can include a first outer body member 110, a second outer body member 130, a first endcap 160, a second endcap 170, and a shape memory material member 180. These and other components will be described in turn below.

Figure 6:
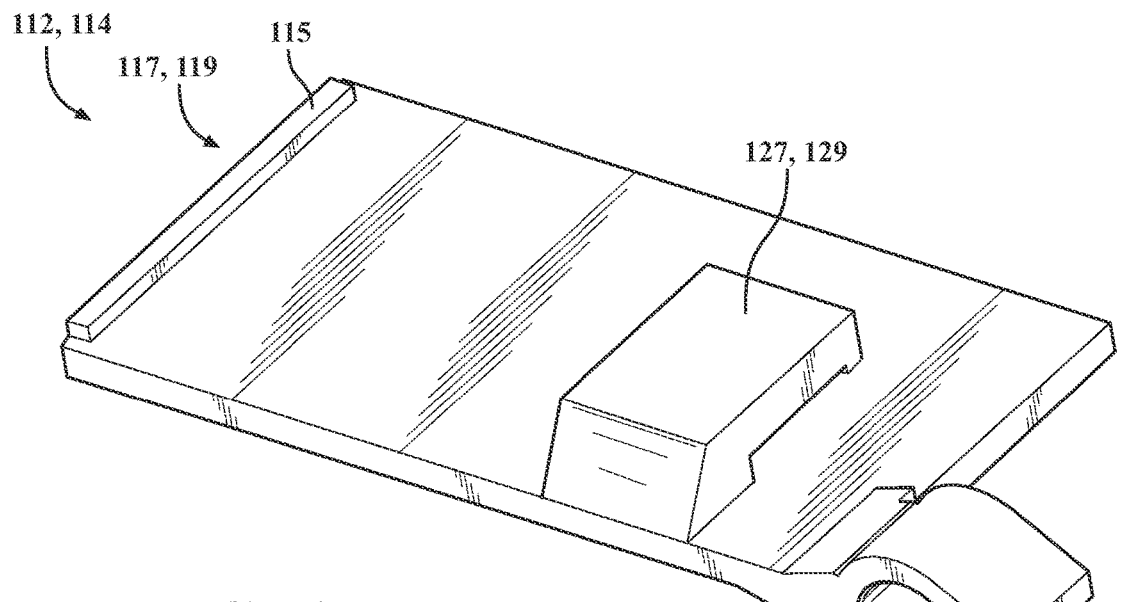
FIG. 6 is an example of a first portion or a second portion of a first outer body member of the actuator of FIG. 1.

The first outer body member 110 can include a first portion 112 and a second portion 114. The first portion 112 and the second portion 114 can have any suitable size, shape, and/or configuration. In some arrangements, the first portion 112 and the second portion 114 can be substantially identical to each other, but they can be in different orientations. In other arrangements, the first portion 112 and the second portion 114 can be different from each other in one or more respects. One example of the first portion 112 and the second portion 114 is shown in FIG. 6. The first portion 112 and the second portion 114 can be made of any suitable material, such as plastic or metal.

The first portion 112 and the second portion 114 can be operatively connected to each other such that the first portion 112 and the second portion 114 can move relative to each other. In one or more arrangements, the first portion 112 and the second portion 114 can be pivotably connected to each other. For example, the first portion 112 and the second portion 114 can be pivotably connected to each other by one or more hinges. In one or more arrangements, the first portion 112 and the second portion 114 can be pivotably connected to each other by one or more barrel hinges 122. In one or more arrangements, the one or more hinges can be a separate structure operatively connected to the first portion 112 and the second portion 114. Alternatively, the one or more hinges can be at least partially defined by the first portion 112 and the second portion 114.

The first portion 112 can include a first interfacing end 116 and a second interfacing end 117. The second portion 114 can include a first interfacing end 118 and a second interfacing end 119. The first interfacing end 116 of the first portion 112 and the first interfacing end 118 of the second portion 114 can be configured to interface with each other. For instance, the first interfacing end 116 of the first portion 112 can include a knuckle 120, and the first interfacing end 118 of the second portion 114 can include a knuckle 121. The knuckles 120, 121 can include openings that can be substantially aligned with each other to form in part the hinge. A pin 123 can pass through the aligned openings. In such arrangements, the first portion 112 and the second portion 114 can define the leaves of the hinge.

The second interfacing end 117 of the first portion 112 can be configured to interface with the first endcap 160. For instance, the second interfacing end 117 of the first portion 112 can include a lip 115, protrusion, or other feature for mechanically engaging a portion of the first endcap 160. The first endcap 160 can be configured to retainably engage the second interfacing end 117 of the first portion 112 while allowing the first portion 112 to pivot therein. The second interfacing end 119 of the second portion 114 can be configured to interface with the second endcap 170. For instance, the second interfacing end 119 of the second portion 114 can include a lip 115, protrusion, or other feature for mechanical engagement with a portion of the second endcap 170. The second endcap 170 can be configured to retainably engage the second interfacing end 119 of the second portion 114 while allowing the second portion 114 to pivot therein.

The first portion 112 and the second portion 114 can be angled relative to each other. As a result, the first outer body member 110 can have a generally V-shape. The first outer body member 110 can have an outer side 124 and an inner side 126.

The actuator 100 can include a biasing member 128. The biasing member 128 can be associated with the first outer body member 110. The biasing member 128 can be operatively positioned to bias the first outer body member 110 into a non-activated configuration of the actuator 100. More particularly, the biasing member 128 can exert a force on the first portion 112 and the second portion 114 to bias them into the non-activated configuration.

The biasing member 128 can be any suitable element for imparting a biasing force of the first outer body member 110. In one or more arrangements, the biasing member 128 can be a spring. More particularly, the biasing member 128 can be a torsion spring.

In some arrangements, the first outer body member 110 can be configured to engage or retain a portion of the biasing member 128. For instance, the first portion 112 can include a retaining member 127, and the second portion 114 can include a retaining member 129. The retaining members 127, 129 can have any suitable size, shape, and/or configuration. In one or more arrangements, the retaining members 127, 129 can be substantially L-shaped, as shown in FIGS. 2, 3, and 6, substantially U-shaped, substantially V-shaped, or substantially J-shaped, just to name a few possibilities. The retaining members 127, 129 can be formed as a unitary structure with the respective one of the first portion 112 and the second portion 114. In some arrangements, the retaining members 127, 129 can be formed separately from the first portion 112 and the second portion 114 and subsequently connected thereto.

Figure 8:
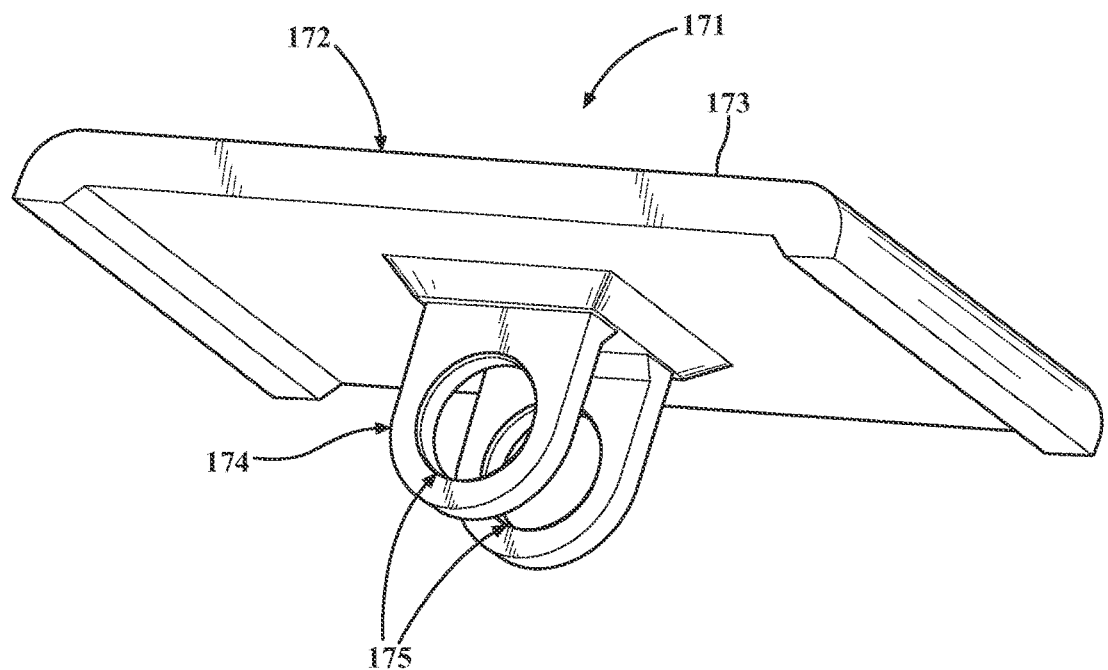
FIG. 8 is an example of a plush plate for the actuator of FIG. 1.

The actuator 100 can include a push plate 171. One example of the push plate 171 is shown in FIGS. 2-3 and 8. The push plate 171 can be configured to engage other structures or objects. The push plate 171 can focus the force of the actuator 100 on an intended target object. The push plate 171 can have any suitable size, shape, and/or configuration. In one or more arrangements, the push plate 171 can be substantially T-shaped. In some arrangements, the push plate 171 can include a platform 172 and a stem 174. In some arrangements, the platform 172 can be substantially rectangular in conformation, as is shown. In other arrangements, the platform 172 can be substantially circular, substantially square, substantially triangular, substantially polygonal, substantially hexagonal, substantially octagonal, or substantially trapezoidal, just to name a few possibilities.

The platform 172 can have an engaging surface 173. The engaging surface 173 can be configured to provide a desired actuation effect on an intended target. In some arrangements, the engaging surface 173 can be substantially planar. In some arrangements, the engaging surface 173 can include one or more contours, protrusions, steps, elements, or other raised or non-planar features. The engaging surface 173 can be configured to create a focal point for the actuation force of the actuator 100.

In some arrangements, the engaging surface 173 can be substantially parallel to the shape memory material member(s) 180 located within the cavity 158 and/or to a first dimension 200 of the actuator 100. In some arrangements, the engaging surface 173 can be angled relative to the shape memory material member(s) 180 located within the cavity 158 and/or to the first dimension 200 of the actuator 100. The engaging surface 173 can have any suitable orientation to achieve a desired actuation force effect.

The push plate 171 can be operatively connected to the first outer body member 110. For instance, a portion of the stem 174 can be configured to include one or more openings 175 that can substantially align with the openings 125 in the knuckles 120, 121 of the first portion 112 and the second portion 114 to form in part the hinge. The pin 123 can pass through the aligned openings 125, 175. While the first portion 112 and the second portion 114 can pivot relative to each other, the push plate 171 can substantially maintain its orientation. In some arrangements, the push plate 171 can be substantially centrally located on the first outer body member 110.

The second outer body member 130 can include a first portion 132, a second portion 134, and a base 136. The first portion 132, the second portion 134, and the base 136 can have any suitable size, shape, and/or configuration. In some arrangements, the first portion 132 and the second portion 134 can be substantially identical to each other, but they can be in different orientations. However, in other embodiments, the first portion 132 and the second portion 134 can be different from each other in one or more respects.

Figure 9:
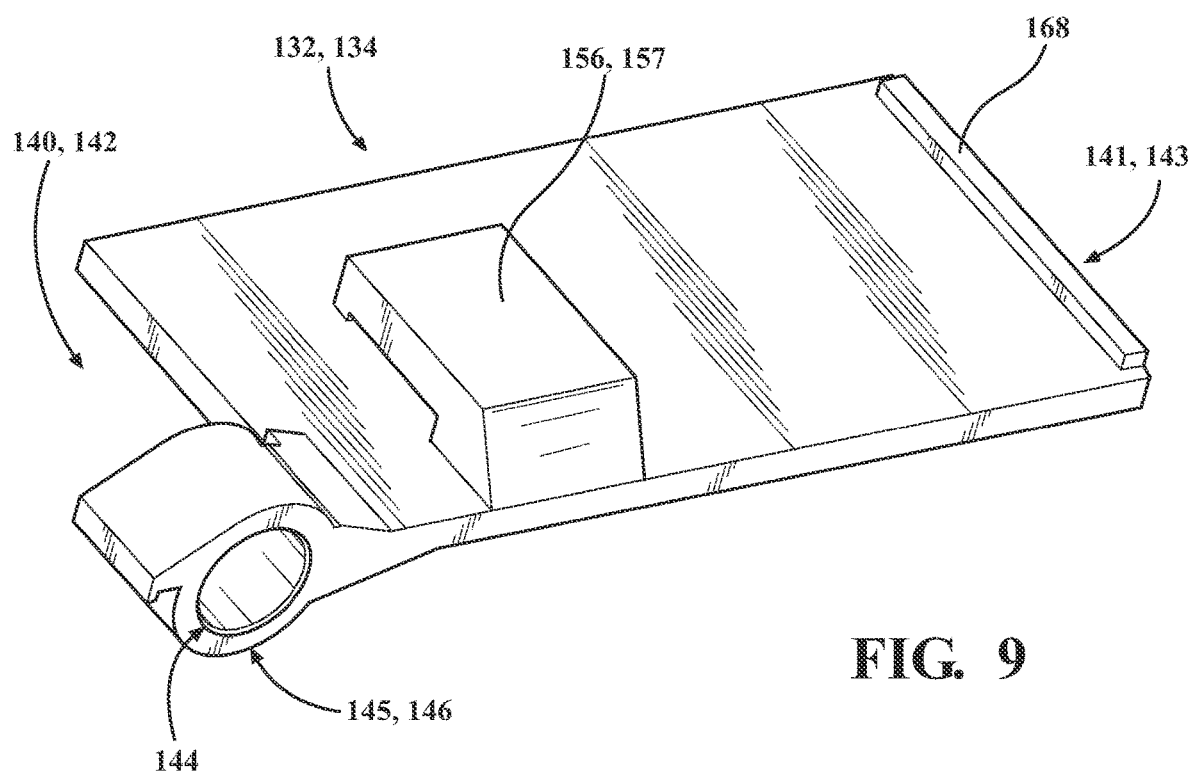
FIG. 9 is an example of a first portion or a second portion of a second outer body member of the actuator of FIG. 1.

One example of the first portion 132 and the second portion 134 is shown in FIG. 9. The first portion 132 and the second portion 134 can be made of any suitable material, such as plastic or metal. In some arrangements, the first portion 132 and the second portion 134 of the second outer body member 130 can be substantially mirror images of the first portion 112 and the second portion 114 of the first outer body member 110. The first portion 132 can include a first interfacing end 140 and a second interfacing end 141. The second portion 134 can include a first interfacing end 142 and a second interfacing end 143.

The first portion 132 and the second portion 134 can be operatively connected to another element such that the first portion 132 and the second portion 134 can move relative to each other. In one or more arrangements, the first portion 132 and the second portion 134 can be operatively connected to each other. In one or more arrangements, the first portion 132 and the second portion 134 can both be operatively connected to another structure. For instance, each of the first portion 132 and the second portion 134 can be pivotably connected another structure. In one or more arrangements, each of the first portion 132 and the second portion 134 can be pivotably connected to the base 136. For example, the first portion 132 can be pivotably connected to the base 136 by one or more hinges, and the second portion 134 can be pivotably connected to the base 136 by one or more hinges. In one or more arrangements, the first portion 132 can be pivotably connected to the base 136 by one or more barrel hinges 138, and the second portion 134 can be pivotably connected to the base 136 by one or more barrel hinges 139. The first portion 132 and the second portion 134 can be located on opposite sides of the base 136.

In some arrangements, the one or more hinges can be separate structures operatively connected to the first portion 132 and the base 136 and to the second portion 134 and the base 136. Alternatively, in some arrangements, the one or more hinges can be formed at least in part by the first portion 132, the second portion 134, and/or the base 136.

Figure 7:
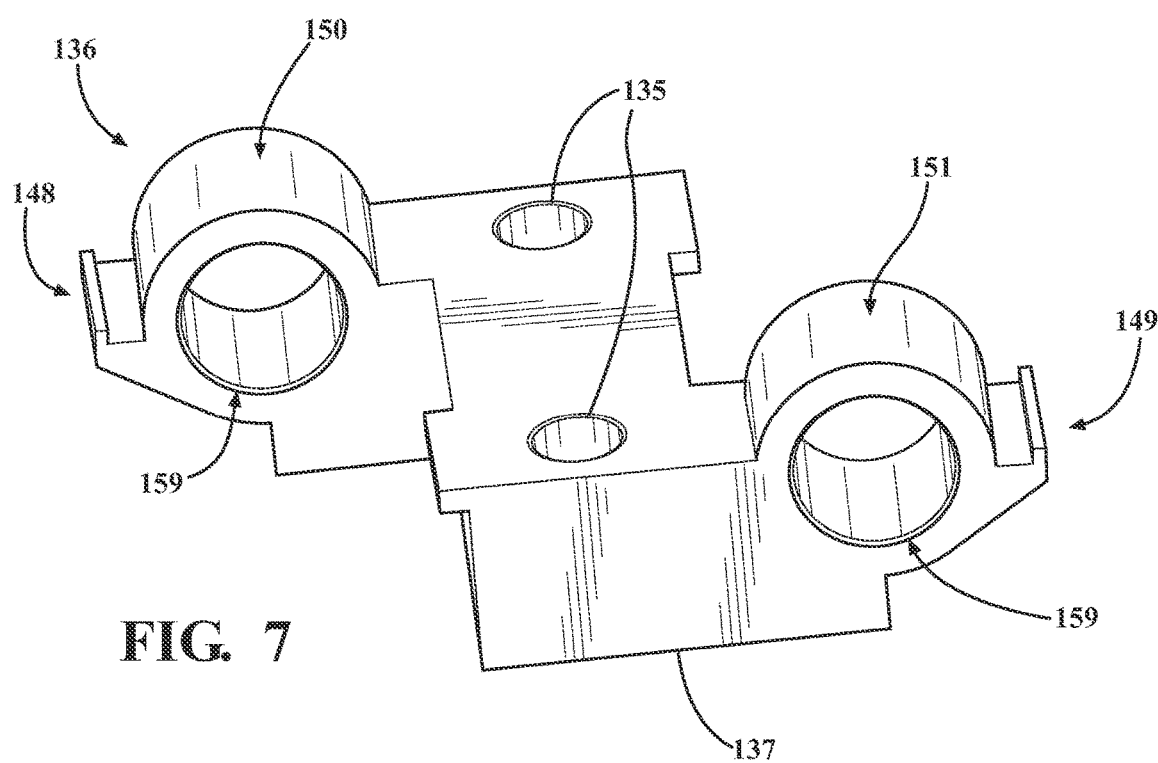
FIG. 7 is an example of a base of a second outer body member of the actuator of FIG. 1.

The base 136 can have any suitable size, shape, and/or configuration. One example of the base 136 is shown in FIG. 7. The base 136 can have a first interfacing end 148 and a second interfacing end 149. The base 136 can be configured to interface with the first portion 132 and the second portion 134. The first interfacing end 140 of the first portion 132 and the first interfacing end 142 of the second portion 134 can be configured to interface with the base 136. For instance, the first interfacing end 140 of the first portion 132 can include one or more knuckles 145, and the first interfacing end 142 of the second portion 134 can include one or more knuckles 146. The knuckles 145, 146 can define an opening 144. Further, the first interfacing end 148 of the base 136 can include one or more knuckles 150, and the second interfacing end 149 of the base 136 can include one or more knuckles 151. The knuckles 150, 151 can define an opening 159. The opening(s) 144 of the knuckle(s) 145 of the first portion 132 and the opening(s) 159 of the knuckle(s) 150 of the base 136 can be substantially aligned with each other. A pin 152 can be received in the aligned openings 144, 159. In such arrangements, the first portion 132 and the base 136 can be like the leaves of the hinge. The opening(s) 144 of the knuckle(s) 146 of the second portion 134 and the opening(s) 159 of the knuckle(s) 151 of the base 136 can be substantially aligned with each other. A pin 153 can be received in the aligned openings 144, 159. In such arrangements, the second portion 134 and the base 136 can be like the leaves of the hinge.

The second interfacing end 141 of the first portion 132 can be configured to interface with the first endcap 160. For instance, the second interfacing end 141 of the first portion 132 can include a lip 168, protrusion, or other feature for mechanically engaging a portion of the first endcap 160. The first endcap 160 can be configured to retainably engage the second interfacing end 141 of the first portion 132 while allowing the first portion 132 to pivot therein. The second interfacing end 143 of the second portion 134 can be configured to interface with the second endcap 170. For instance, the second interfacing end 143 of the second portion 134 can include a lip 168, protrusion, or other feature for mechanical engagement with a portion of the second endcap 170. The second endcap 170 can be configured to retainably engage the second interfacing end 143 of the second portion 134 while allowing the second portion 134 to pivot therein.

The first portion 132 and the second portion 134 can be angled relative to each other. The second outer body member 130 can have an outer side 131 and an inner side 133.

One or more biasing members can be associated with the second outer body member 130. For instance, a biasing member 154 can be associated with the first portion 132 and the base 136, and a biasing member 155 can be associated with the second portion 134 and the base 136. The biasing members 154, 155 can be operatively positioned to bias the second outer body member 130 into a non-activated configuration of the actuator 100. More particularly, the biasing member 154 can exert a force on the first portion 132 and the base 136 to bias at least the first portion 132 into the non-activated configuration. Further, the biasing member 155 can exert a force on the second portion 134 and the base 136 to bias at least the second portion 134 into the non-activated configuration.

The biasing members 154, 155 can be any suitable element for imparting a biasing force on the second outer body member 130. In one or more arrangements, the biasing members 154, 155 can be springs. More particularly, the biasing members 154, 155 can be torsion springs.

In some arrangements, the biasing members 128, 154, 155 can be substantially identical to each other. In some arrangements, one or more of the biasing members 128, 154, 155 can be different from the other biasing members in one or more respects, such as in terms of size, shape, configuration, and/or biasing force, just to name a few possibilities.

In some arrangements, the second outer body member 130 can be configured to engage or retain a portion of the biasing member 154, 155. For instance, the first portion 132 can include a retaining member 156, and the second portion 134 can include a retaining member 157. The retaining members 156, 157 can have any suitable size, shape, and/or configuration. In one or more arrangements, the retaining members 156, 157 can be substantially L-shaped, as shown in FIGS. 2, 3, and 9, substantially U-shaped, substantially V-shaped, or substantially J-shaped, just to name a few possibilities. The retaining members 156, 157 can be formed as a unitary structure with the respective one of the first portion 132 and the second portion 134. In some arrangements, the retaining members 156, 157 can be formed separately from the first portion 132 and the second portion 134 and subsequently connected thereto.

The first outer body member 110 and the second outer body member 130 can be oriented such that their inner sides 126, 133 face each other. The first outer body member 110 and the second outer body member 130 can define a cavity 158.

The base 136 can have any suitable size, shape, and/or configuration. In one or more arrangements, the base 136 can be substantially rectangular. The base 136 can be made of any suitable material, such as metal or plastic. The base 136 can be made of the same material as the first outer body member 110 and/or the second outer body member 130, or the base 136 can be made of a different material.

The base 136 can be configured to be supported on a surface. The base 136 can include an engaging surface 137. The engaging surface 137 can be configured to substantially matingly engage a surface on which the base 136 is supported. In some arrangements, the engaging surface 137 can be substantially planar. In some arrangements, the engaging surface 137 can include one or more non-planar features, such as contours, protrusions, recesses, curves, etc. In some arrangements, the base 136 can be configured for connection to another surface. For instance, the base 136 can include one or more apertures 135 to accommodate a fastener for attachment to another surface or structure.

The actuator 100 can include a first endcap 160 and a second endcap 170. The first endcap 160 and the second endcap 170 can be spaced apart. The first endcap 160 and the second endcap 170 can face toward each other. The first endcap 160 and the second endcap 170 can be substantially aligned with each other.

The first endcap 160 and the second endcap 170 can have any suitable size, shape, and/or configuration. In one or more arrangements, the first endcap 160 and the second endcap 170 can be substantially identical to each other. However, the first endcap 160 and the second endcap 170 can be oriented differently. The first endcap 160 and the second endcap 170 can be made of any suitable material, such as plastic or metal. In one or more arrangements, the first endcap 160 and the second endcap 170 can be different from each other in one or more respects.

One example of an endcap is shown in FIGS. 5A-5F. For convenience, the endcap will be referred to as the first endcap 160, but it will be understood that the description is also equally applicable to the second endcap 170.

Figure 5A:
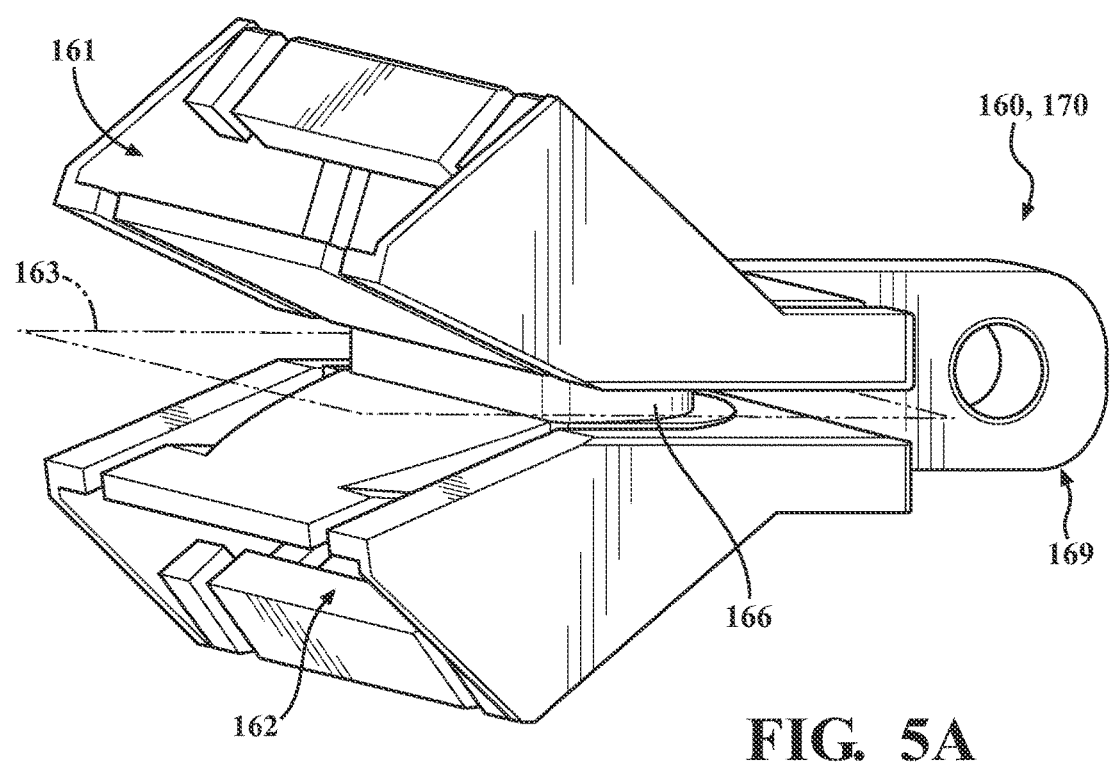
FIGS. 5A-5F show different views of an example of an endcap for the actuator of FIG. 1.
Figure 5B:
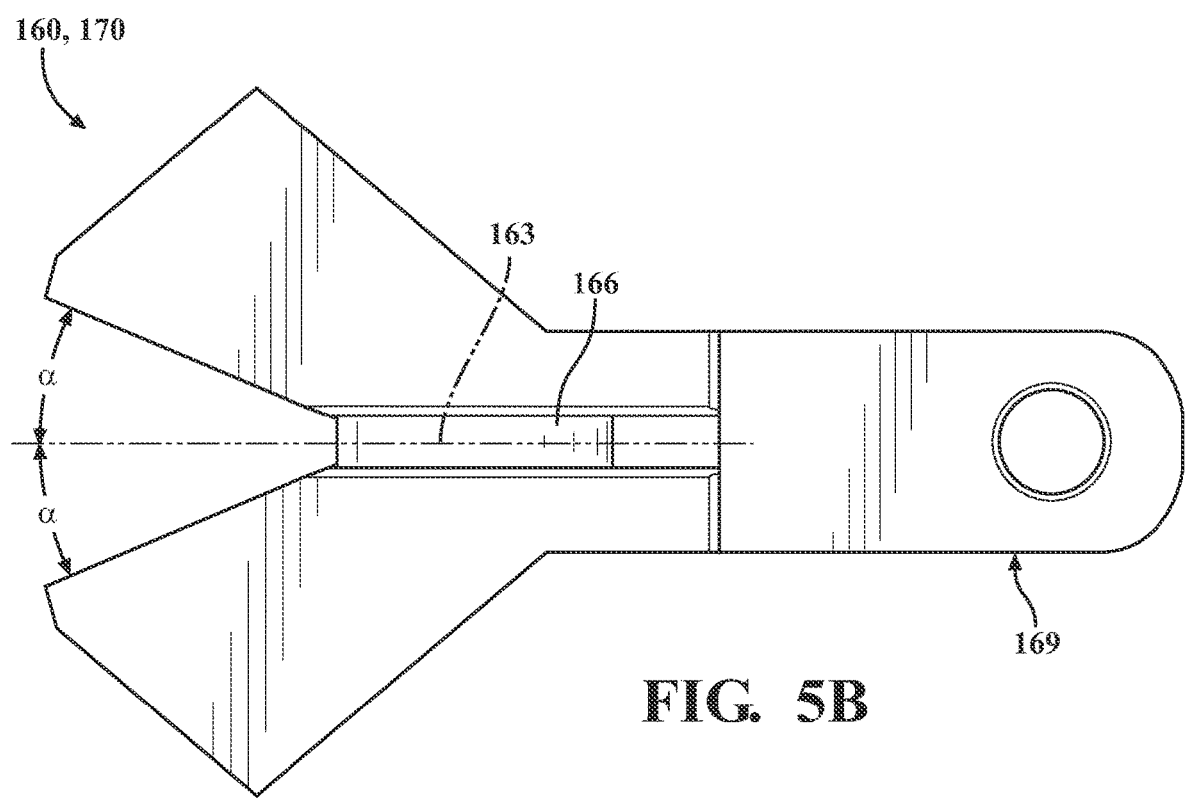
Figure 5C:
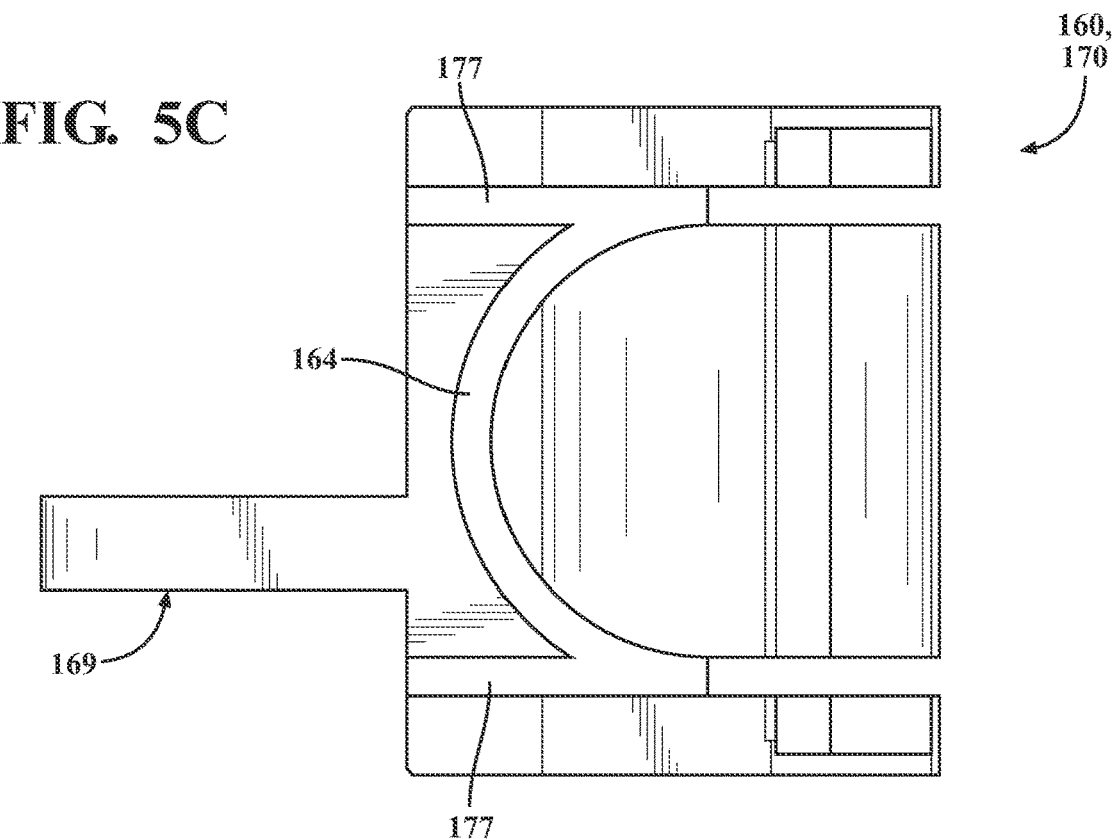
Figure 5D:
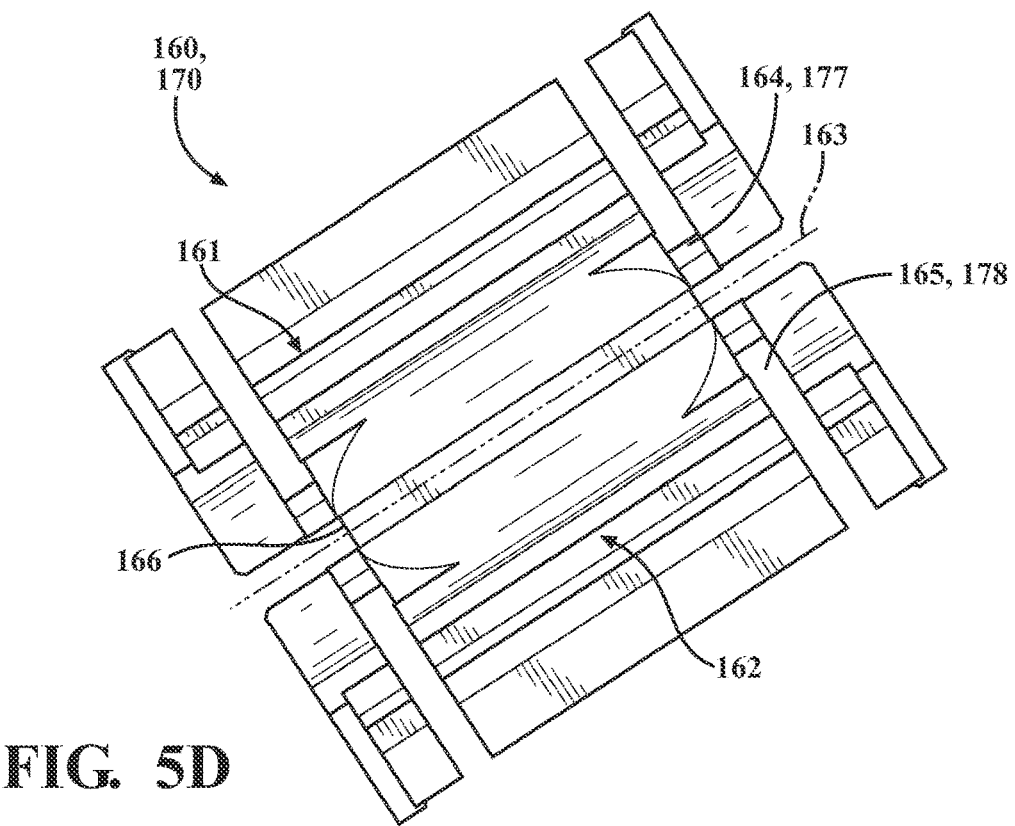
Figure 5E:
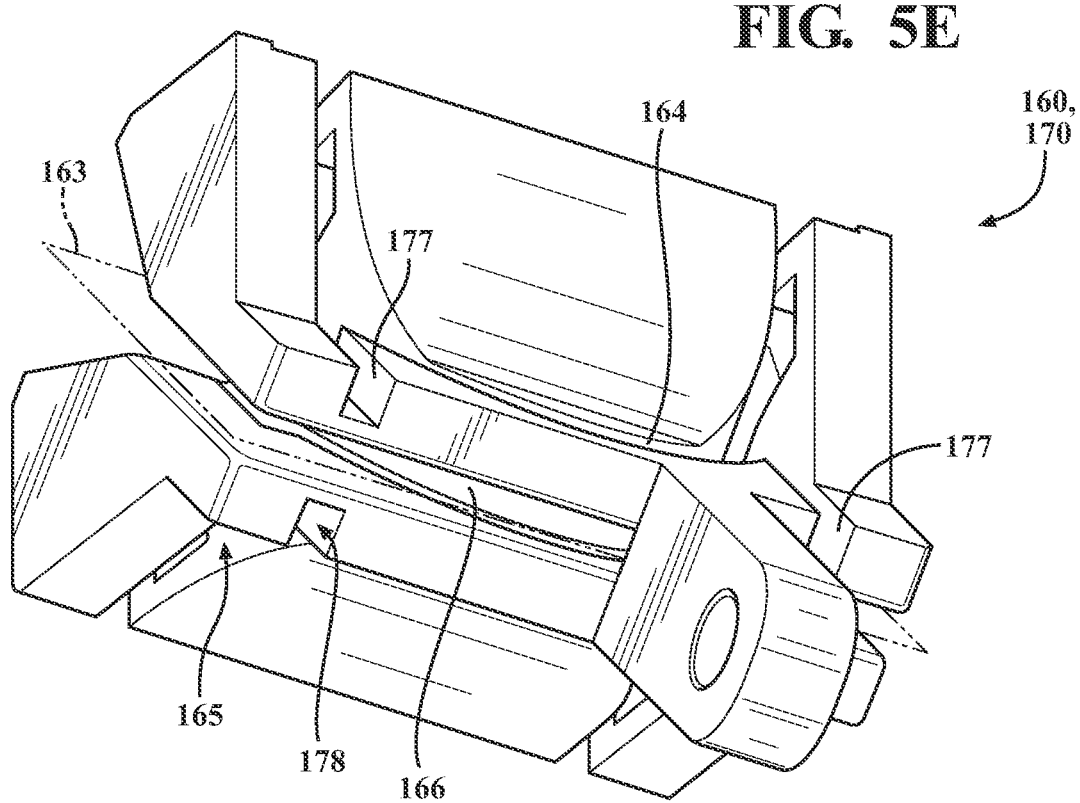
Figure 5F:
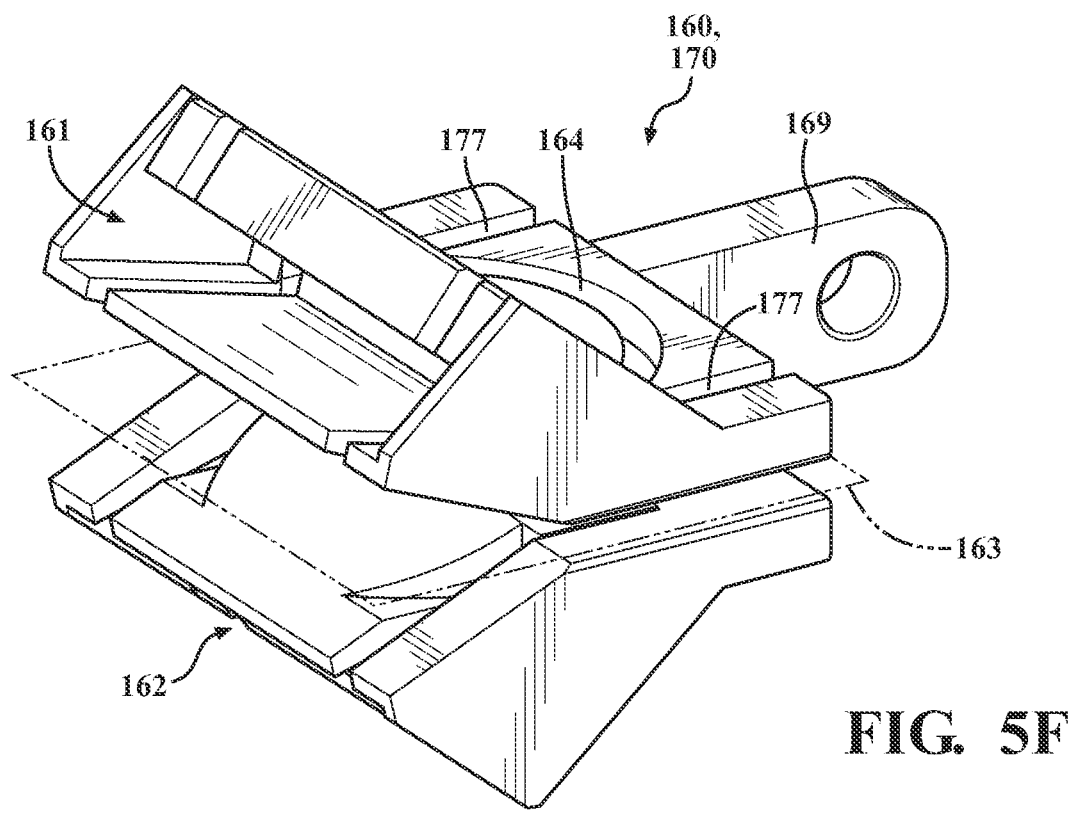

The first endcap 160 can be configured to engage the first outer body member 110 and the second outer body member 130. For instance, the first endcap 160 can include a first engaging cavity 161 and a second engaging cavity 162. The first engaging cavity 161 and the second engaging cavity 162 can be angled relative to a plane 163 of the first endcap 160, as shown in FIG. 5B. For instance, in one or more arrangements, the first engaging cavity 161 and the second engaging cavity 162 can be at an angle $\alpha$ of about 20 to about 25 degrees relative to the plane 163. The first endcap 160 can be substantially symmetrical about the plane 163.

The first engaging cavity 161 of the first endcap 160 can be configured for operative connection to the first outer body member 110. More particularly, the first engaging cavity 161 of the first endcap 160 can be configured for operative connection to the second interfacing end 117 of the first portion 112. Further, the first engaging cavity 161 of the second endcap 170 can be configured for operative connection to the second interfacing end 119 of the second portion 114.

There can be any suitable form of operative connection between the first outer body member 110 and the first engaging cavity 161. For instance, the first outer body member 110 can be operatively connected to the first engaging cavity 161 by mechanical engagement, one or more fasteners, one or more adhesives, and/or one or more brazes or weld, just to name a few possibilities. As an example, the first outer body member 110 can include a lip 115, protrusion, or other features that can engage with the respective endcap within the first engaging cavity 161, such as by interlocking engagement. The first outer body member 110 can be retainably engaged by the first engaging cavity 161. The first engaging cavity 161 can provide end containment for the first portion 112 or the second portion 114 to pivot in when the actuator 100 is activated or deactivated.

The second engaging cavity 162 of the first endcap 160 can be configured for operative connection to the second outer body member 130. More particularly, the second engaging cavity 162 of the first endcap 160 can be configured for operative connection to the second interfacing end 119 of the first portion 132. Further, the second engaging cavity 162 of the second endcap 170 can be configured for operative connection to the second interfacing end 119 of the second portion 134. The above discussion of the operative connection between the first outer body member 110 and the first engaging cavity 161 applies equally to the connection between the second outer body member 130 and the second engaging cavity 162. The first portion 132 and/or the second portion 134 of the second outer body member 130 can include a lip 115, protrusion, or other features can engage with the respective endcap within the second engaging cavity 162, such as by interlocking engagement. The second outer body member 130 can be retainably engaged by the second engaging cavity 162. The second engaging cavity 162 can provide end containment for the first portion 132 or the second portion 134 to pivot in when the actuator 100 is activated or deactivated.

The first endcap 160 can include a plurality of features to allow for engagement with the shape memory material member(s) 180. For instance, the first endcap 160 can include one or more features to enable the shape memory material member(s) 180 to turn around and extend toward the opposite endcap. For instance, each of the first endcap 160 and the second endcap 170 can include a first groove 164, a second groove 165, and a post 166. In some arrangements, the shape memory material member 180 can wrap around the post 166. In some arrangements, the shape memory material member 180 can extend along the first groove 164 and/or the second groove 165.

The first groove 164 and the second groove 165 can have any suitable size, shape, and/or configuration. In some arrangements, the first groove 164 and the second groove 165 can be substantially identical to each other. In other arrangements, the first groove 164 and the second groove 165 can be different from each other in one or more respects. In one or more arrangements, the first groove 164 and the second groove 165 can be substantially U-shaped. The post 166 can have any suitable size, shape, and/or configuration. For instance, the post 166 can be substantially semi-cylindrical.

The first endcap 160 can include one or more inlet/outlet passages 177 that extend between the first groove 164 and the exterior of the first endcap 160. The first endcap 160 can include one or more inlet/outlet passages 178 that extend between the second groove 165 and the exterior of the first endcap 160. The inlet/outlet passages 177, 178 can provide an entry or exit point for the shape memory material member(s) 180 from the first endcap 160 or the second endcap 170.

In some arrangements, at least a portion of the shape memory material member(s) 180 can be coated or covered with an insulating material. For instance, the portions of the shape memory material member(s) 180 that interact with the first groove 164, the second groove 165, and the post 166 can be coated or covered with an insulating material 167. In some arrangements, the insulating material 167 can be a sleeve or a wrap.

The shape memory material member(s) 180 can extend between the first endcap 160 and the second endcap 170 in any suitable manner. One non-limiting example of the routing of the shape memory material member(s) 180 will now be described. From the exterior of the first endcap 160, the shape memory material member 180 can enter the inlet/outlet passages 177 and extend substantially straight into a portion of the first groove 164. The shape memory material member 180 can extend substantially straight out of the first groove 164 and into the cavity 158. The shape memory material member 180 can extend across the cavity 158 and into the first groove 164 of the second endcap 170. The shape memory material member 180 can turn around in the first groove 164 of the second endcap 170. From there, the shape memory material member 180 can extend back across the cavity 158 and wrap around the post 166 of the first endcap 160. The shape memory material member 180 can then extend back across the cavity 158 and wrap around the post 166 of the second endcap 170. The shape memory material member 180 can extend across the cavity 158 and enter the second groove 165 of the first endcap 160. The shape memory material member 180 can extend within the second groove 165 and extend back across the cavity 158 and into the second groove 165 of the second endcap 170. The shape memory material member 180 can exit the second groove 165 via one of the inlet/outlet passages 178 of the second endcap 170.

It will be understood that other arrangements of the shape memory material member 180 are possible. For instance, the shape memory material member 180 can extend between post 166 of the first endcap 160 and the second endcap 170. As another example, the shape memory material member 180 can extend between the first groove 164 of the first endcap 160 and the first groove 164 of the second endcap 170. As still another example, the shape memory material member 180 can extend between the second groove 165 of the first endcap 160 and the second groove 165 of the second endcap 170. Still further, the shape memory material member 180 can extend between the first groove 164 of the first endcap 160 and the second groove 165 of the second endcap 170. As another possibility, the shape memory material member 180 can extend between the second groove 165 of the first endcap 160 and the first groove 164 of the second endcap 170. Of course, it will be appreciated that the shape memory material member(s) 180 can be routed in any combination of the above and other examples.

It should be noted that, when extending across the cavity 158, the shape memory material member(s) 180 can extend substantially straight across from one endcap to the other endcap. Alternatively, the shape memory material member(s) 180 can extend from one side of one of the endcaps to the opposite side of the other endcap. Thus, the shape memory material member(s) 180 can extend substantially diagonally across the cavity 158. In some arrangements, the shape memory material member(s) 180 can be wrapped around the post 166 a plurality of times. For instance, in one or more arrangements, the shape memory material member(s) 180 can be wrapped twice around the post 166.

The first endcap 160 can include a flange 169. The flange 169 can provide a connection point for an end of the shape memory material member(s) 180. In this location, the shape memory material member(s) 180 can operatively connected to another conductor or other element to a power source. In some instance, the shape memory material member(s) 180 can be operatively connected to the flange 169, such as by one or more fasteners 179 (FIG. 1), one or more adhesives, one or more forms of mechanical engagement, one or more other forms of connection, and/or any combination thereof.

The actuator 100 can include one or more shape memory material members 180. The shape memory material members 180 can be operatively connected to the first endcap 160 and the second endcap 170. Any suitable manner of operative connection can be provided, such as one or more fasteners, one or more adhesives, one or more welds, one or more brazes, one or more forms of mechanical engagement, or any combination thereof. In going from one endcap to the other endcap, the shape memory material member(s) 180 can extend across the cavity 158.

In some arrangements, there can be a single shape memory material member 180. In such case, the shape memory material member 180 can, for example, extend straight across the cavity from the first endcap 160 and the second endcap 170. In another example, the shape memory material member 180 can extend in a serpentine pattern between the first endcap 160 and the second endcap 170. In some arrangements, the first endcap 160 and the second endcap 170 can be configured to allow the shape memory material member 180 to turn around and extend in the opposite direction, as described above.

In some arrangements, there can be a plurality of shape memory material members 180. In such case, the plurality of shape memory material members 180 can be distributed, arranged, and/or oriented in any suitable manner. For instance, the shape memory material members 180 can extend substantially parallel to each other. In other arrangements, one or more of the shape memory material members 180 can extend non-parallel to the other shape memory material members 180. In some instances, some of the plurality of shape memory material members 180 may cross over each other. When activated, the shape memory material member(s) 180 can be configured to overcome the biasing forces exerted by the biasing members 128, 154, 155.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 180 can be shape memory material wires. As an example, the shape memory material members 180 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPA to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 180 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As a further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material member(s) 180 are described, in some implementations, as being wires, it will be understood that the shape memory material member(s) 180 are not limited to being wires. Indeed, it is envisioned that suitable shape memory materials may be employed in a variety of other forms, such as sheets, plates, panels, strips, cables, tubes, or combinations thereof. In some arrangements, the shape memory material member(s) 180 may include an insulating coating or an insulating sleeve over at least a portion of their length.

It should be noted that the shape memory material member(s) 180 can be located substantially entirely within the overall envelope of the actuator 100. A substantial majority of the shape memory material member(s) 180 can be located within the cavity 158. "Substantial majority" means about 60% or greater, about 65% or greater, about 70% or greater, about 75% or greater, about 80% or greater, about 85% or greater, about 90% or greater, or about 95% or greater. A portion of the shape memory material member(s) 180 can be routed within the first endcap 160 and the second endcap 170. A portion of the shape memory material member(s) 180 can extend outside of a respective one of the endcaps 160, 170 for connection to the flange 169 and/or to another conductor and/or power source. Thus, the actuator 100 can be a self-contained unit.

The actuator 100 can include a first dimension 200 and the second dimension 210. The first dimension 200 can describe a width of the actuator 100, and the second dimension 210 can describe a height of the actuator 100. The first dimension 200 and the second dimension 210 can be substantially perpendicular to each other.

FIG. 2 shows an example of the actuator 100 in a non-activated configuration. Here, the shape memory material member(s) 180 are not activated. FIG. 3 shows an example of the actuator 100 in an activated configuration. When an activation input (e.g., electrical energy) is provided to the shape memory material member(s) 180, the shape memory material member(s) 180 can contract. This contraction causes the shape memory material member(s) 180 to pull the first endcap 160 and the second endcap 170 toward each other in a direction that corresponds to the first dimension 200. As a result, the first outer body member 110 and the second outer body member 130 can extend outward and away from each other in a direction that corresponds to the second dimension 210. It will be appreciated that, in going from the non-activated condition to the activated condition, the first dimension 200 (i.e., the width) of the actuator 100 can decrease and/or the second dimension 210 (i.e., the height) of the actuator 100 can increase. Further, it will be appreciated that the actuator 100 can deliver a force in a direction that is out of plane or otherwise different from the direction of contraction of the shape memory material member(s) 180.

When the actuator 100 goes from a non-activated configuration to the activated configuration, the push plate 171 can be located at a higher elevation. Also, when the actuator 100 goes from a non-activated configuration to the activated configuration, the angle between the first portion 112 and the second portion 114 of the first outer body member 110 can decrease. Similarly, when the actuator 100 goes from a non-activated configuration to the activated configuration, the angle between the first portion 132 and the second portion 134 of the second outer body member 130 can decrease. It will be appreciated that the first endcap 160 and the second endcap 170 can be configured to accommodate the movement of the first outer body member 110 and the second outer body member 130 while maintaining the operative connection to them.

It should be noted that, in some arrangements, the push plate 171 can deliver an actuation force symmetrically, that is, substantially in line with a force direction of the actuator 100 (e.g., in direction of the second dimension 210). However, in other arrangements, the actuator 100 can be configured to deliver an actuation force that is asymmetric, that is, not in line with the force direction of the actuator 100. Delivery of an asymmetric actuation force can be achieved in various ways. As an example, the first portion 112 and the second portion 114 of the first outer body member 110 can have different lengths. Thus, one of the portions is longer than the other. As a result, the push plate 171 may no longer be substantially centrally located. Alternatively or additionally, the first portion 132 and the second portion 134 of the second outer body member 130 can have different lengths. As a still further example, the push plate 171 can be configured such that the engaging surface 173 or other portion of the push plate 171 is angled relative to the first dimension 200. As yet another example, the push plate 171 can be operatively connected to the first outer body member 110 such that the push plate 171 extends from the first outer body member 110 at an acute angle. As one more example, the biasing force of the biasing members 154, 155 can be different from each other. Of course, it will be appreciated that the delivery of an asymmetric actuation force can be achieved by any combination of the above and other arrangements.

Figure 10:
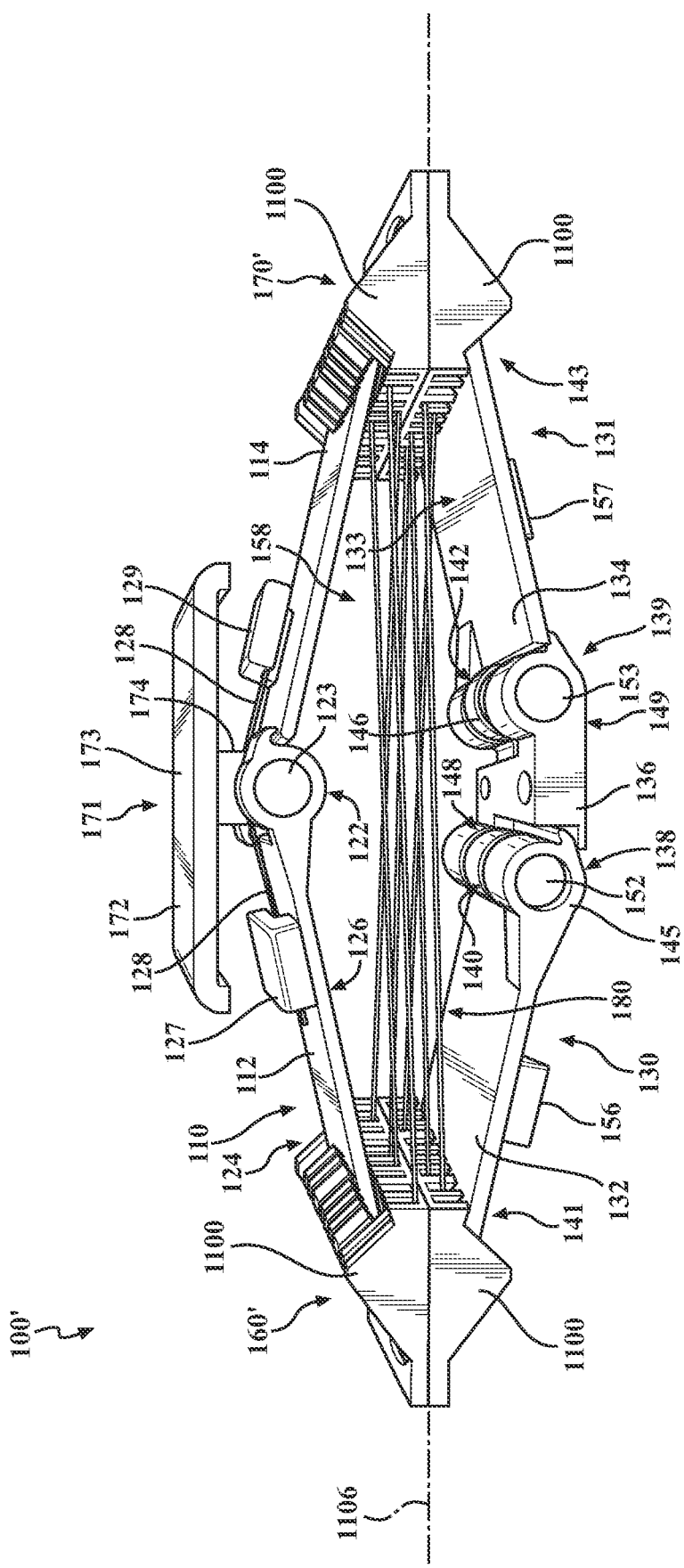
FIG. 10 is another example of an actuator.
Figure 11A:
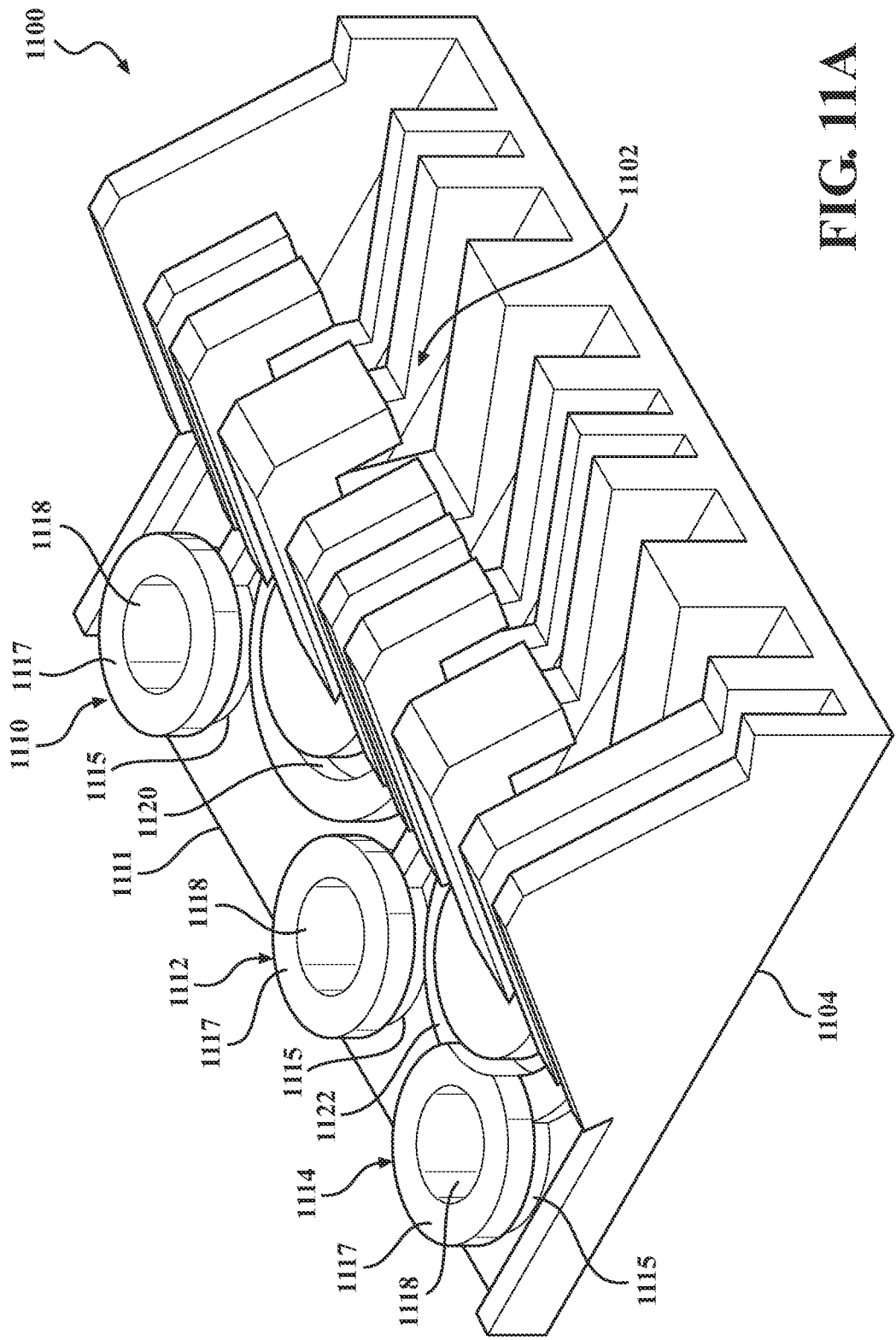
Figure 11C:
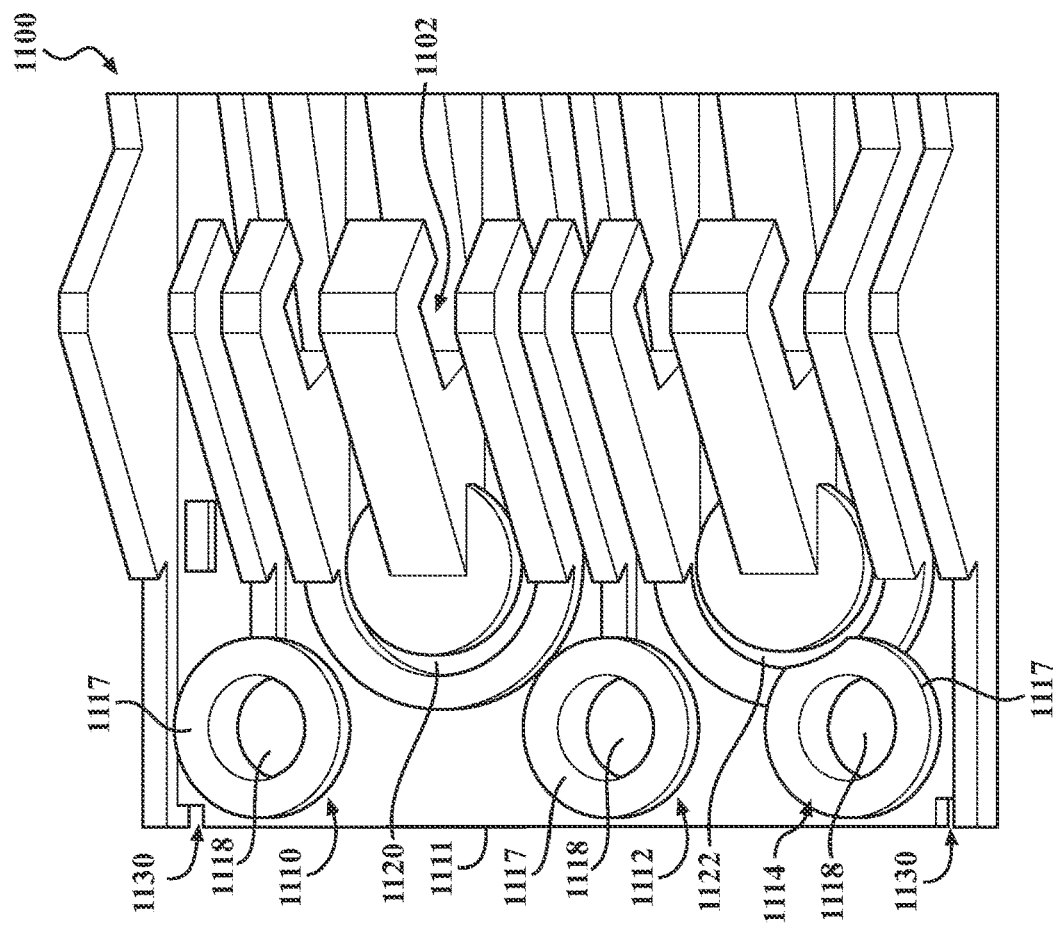
Figure 11B:
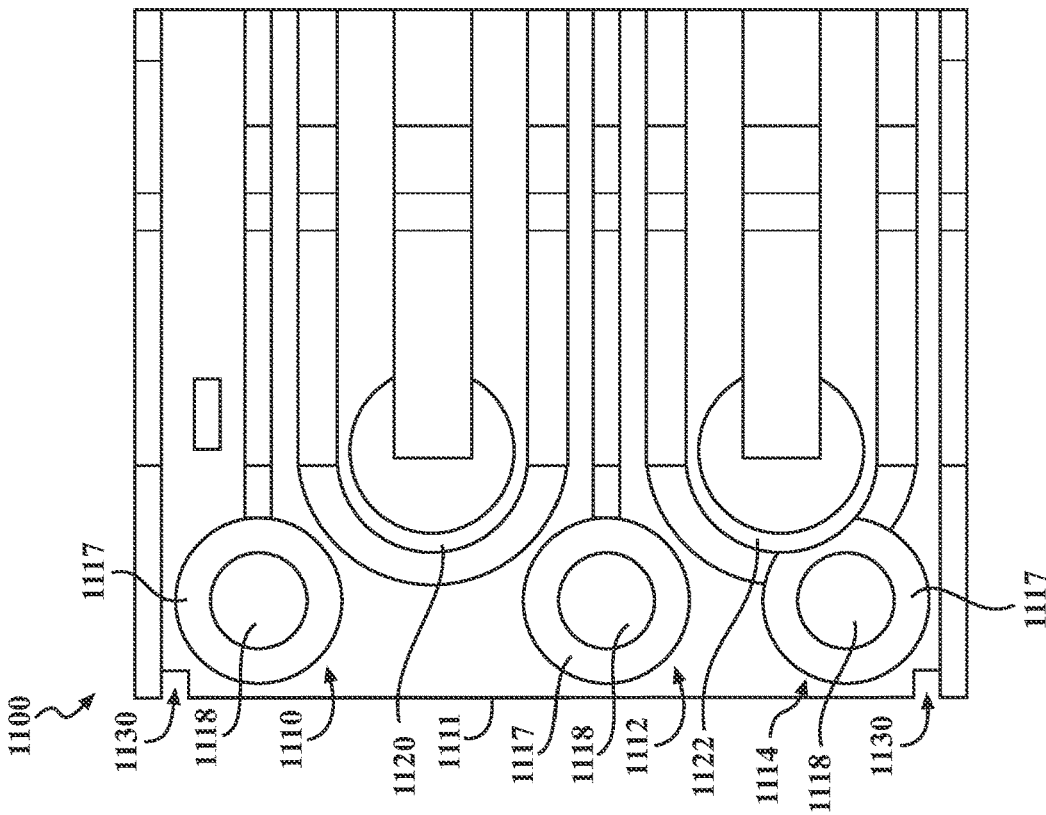
Figure 12:
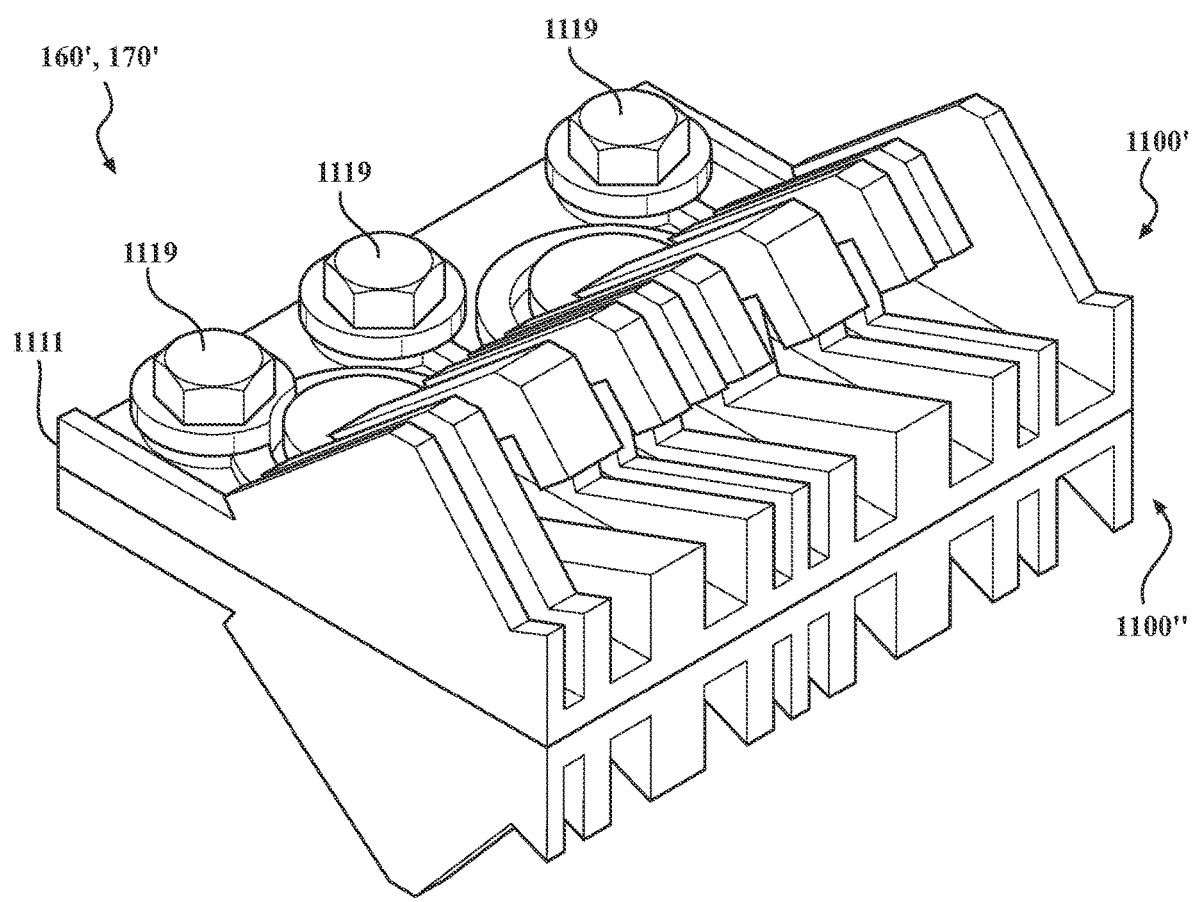
FIG. 12 is an example of an endcap for the actuator of FIG. 10, showing two endcap portions connected to each other.

Referring to FIG. 10, another example of an actuator 100' is shown. For convenience, the reference numbers used in connection with the actuator 100 in FIGS. 1-3 will be repeated here in connection with the actuator 100' of FIG. 14. The actuator 100' can include the first outer body member 110, the second outer body member 130, and the shape memory material member(s) 180. The above description of the first outer body member 110, the second outer body member 130, and the shape memory material member(s) 180 made in connection with the actuator 100 shown in FIGS. 1-3 applies equally to the same components here in connection with the actuator 100' of FIG. 14.

Figure 14:
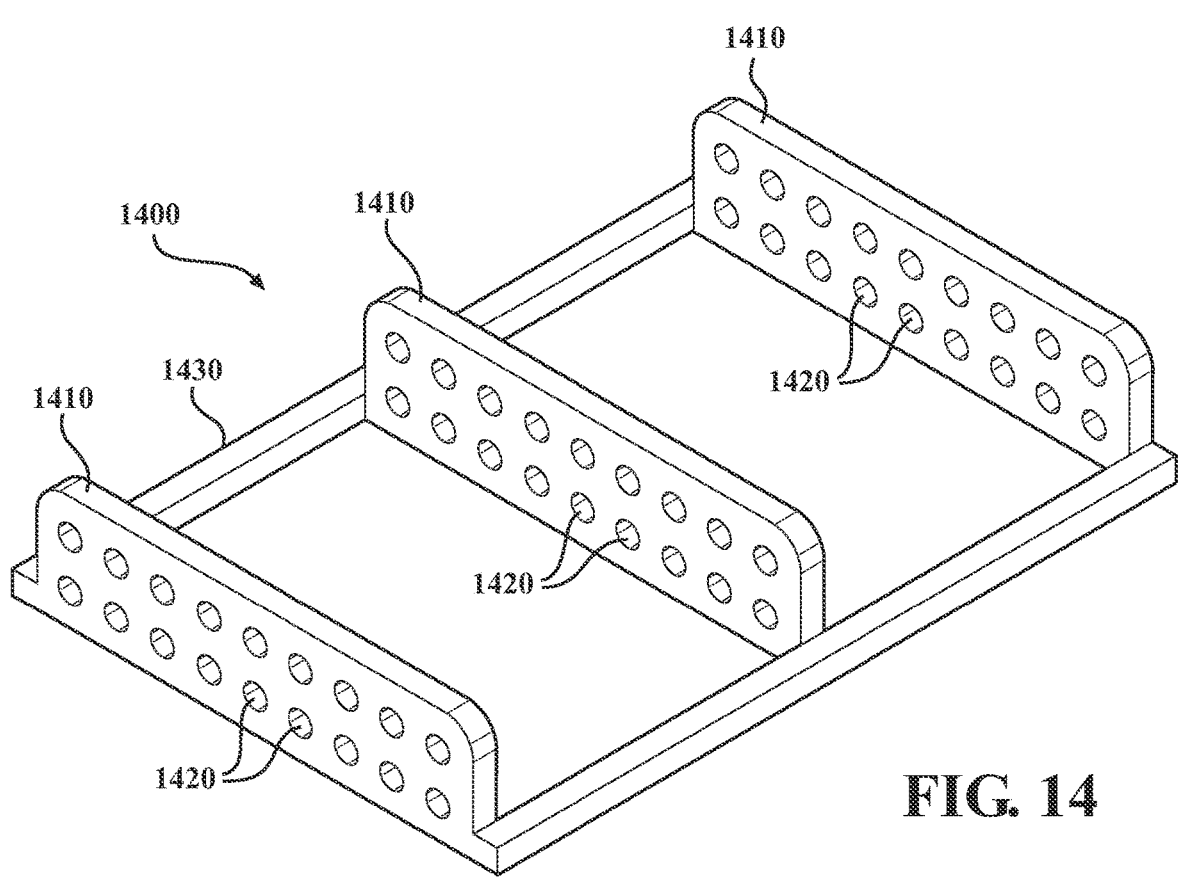
FIG. 14 is an example of a wire guide for use with the actuator of FIG. 1 or FIG. 10.

The actuator 100' includes a first endcap 160' and a second endcap 170'. The first endcap 160' and the second endcap 170' shown in FIG. 14 are different than the first endcap 160 and the second endcap 170 shown in FIGS. 5A-5F. The actuator 100' can include a first endcap 160 and a second endcap 170. The first endcap 160 and the second endcap 170 can be spaced apart. The first endcap 160 and the second endcap 170 can face toward each other. The first endcap 160 and the second endcap 170 can be substantially aligned with each other.

The first endcap 160' and the second endcap 170' can have any suitable size, shape, and/or configuration. In one or more arrangements, the first endcap 160' and the second endcap 170' can be substantially identical to each other. However, the first endcap 160' and the second endcap 170' can be oriented differently. The first endcap 160' and the second endcap 170' can be made of any suitable material, such as plastic or metal. In one or more arrangements, the first endcap 160' and the second endcap 170' can be different from each other in one or more respects.

In some arrangements, the first endcap 160' and/or the second endcap 170' can be a unitary structure. In other arrangements, the first endcap 160' and/or the second endcap 170' can be made of a plurality of portions. Referring to FIGS. 11A-11E, one example of an endcap portion 1100 of the first endcap 160' and/or the second endcap 170' is shown.

The endcap portion 1100 can be configured to engage the first outer body member 110 and the second outer body member 130. For instance, the endcap portion 1100 can include an interfacing surface 1104. The interfacing surface 1104 can be substantially planar. The endcap portion 1100 can include an engaging cavity 1102. The engaging cavity 1102 can be angled relative to the interfacing surface 1104. Alternatively or additionally, the engaging cavity 1102 can be angled relative to a plane 1106 of the first endcap 160' or the second endcap 170', as shown in FIG. 10. For instance, in one or more arrangements, the engaging cavity 1102 can be at an angle of about 20 to about 25 degrees relative to the plane 1106 and/or to the interfacing surface 1104.

The engaging cavity 1102 of the endcap portion 1100 can be configured for operative connection to the first outer body member 110 and/or the second outer body member 130. More particularly, the engaging cavity 1102 of the endcap portion 1100 can be configured for operative connection to the second interfacing end 117 of the first portion 112, the second interfacing end 119 of the second portion 114, the second interfacing end 119 of the first portion 132, and/or the second interfacing end 119 of the second portion 134.

There can be any suitable form of operative connection between the engaging cavity 1102 and the first outer body member 110 and/or the second outer body member 130. For instance, the first outer body member 110 and/or the second outer body member 130 can be operatively connected to the engaging cavity 1102 by mechanical engagement, one or more fasteners, one or more adhesives, and/or one or more brazes or weld, just to name a few possibilities. As an example, the first outer body member 110 and/or the second outer body member can include a lip 115, protrusion, or other feature that can engage with the respective endcap within the engaging cavity 1102, such as by interlocking engagement. The first outer body member 110 and/or the second outer body member 130 can be retainably engaged by the engaging cavity 1102. The engaging cavity 1102 can provide end containment for the first portion 112, the second portion 114, the first portion 132, and/or the second portion 134 to pivot in when the actuator 100 is activated or deactivated.

The endcap portion 1100 can include a plurality of features to allow for engagement with the shape memory material member(s) 180. For instance, the endcap portion 1100 can include one or more features to enable the shape memory material member(s) 180 to turn around and extend toward the opposite endcap, to enter the endcap portion 1100, and/or to exit the endcap portion 1100. For instance, endcap portion 1100 can include a plurality of posts (e.g., a first post 1110, a second post 1112, and a third post 1114) and a plurality of grooves (e.g., a first groove 1120, a second groove 1122). The endcap portion 1100 can include one or more inlet/outlet notches 1130. Further, the endcap portion 1100 can include various structures that can define a plurality of channels (e.g., a first channel 1141, a second channel 1142, a third channel 1143, a fourth channel 1144, a fifth channel 1145, a sixth channel 1146, a seventh channel 1147, an eighth channel 1148, and a ninth channel 1149).

In some arrangements, the shape memory material member(s) 180 can extend along the groove(s). The first groove 1120 and the second groove 1122 can have any suitable size, shape, and/or configuration. In some arrangements, the first groove 1120 and the second groove 1122 can be substantially identical to each other. In other arrangements, the first groove 1120 and the second groove 1122 can be different from each other in one or more respects. In one or more arrangements, the first groove 1120 and the second groove 1122 can be substantially U-shaped.

In some arrangements, the shape memory material member(s) 180 can wrap around the post(s). The post(s) can have any suitable size, shape, and/or configuration. In some arrangements, the post(s) can be substantially identical to each other. In other arrangements, the post(s) can be different from each other in one or more respects. In one or more arrangements, the post(s) can include a shaft 1115 and a cap 1117. The cap 1117 can be larger than the shaft 1115. In some arrangements, the shaft 1115 can be substantially cylindrical. The cap 1117 can be configured to help retain the shape memory material member(s) 180 on the shaft 1115. The cap 1117 can physically prevent the shape memory material member(s) 180 from slipping off of the end of the shaft 1115. An aperture 1118 can be defined in each of the post(s). The apertures 1118 can extend through the endcap portion 1100 such that openings are defined in the cap 1117 and the interfacing surface 1104.

There can be any suitable arrangement of the groove(s) and the post(s). For example, the post(s) and the groove(s) can alternate with each other. In some arrangements, the groove(s) and the post(s) can be substantially equally spaced from each other. In other arrangements, the groove(s) and the post(s) can be non-equally spaced in at least one or more areas. In some arrangements, the post(s) can be located closer to an outboard end 1111 of the endcap portion 1100 than the groove(s).

The endcap portion 1100 can include one or more inlet/outlet notches 1130. The inlet/outlet notch(es) 1130 can be provided in any suitable locations on the endcap portion 1100. For instance, the inlet/outlet notch(es) 1130 can be located outboard of the groove(s) and the post(s). The inlet/outlet notch(es) 1130 can provide an entry or exit point for the shape memory material member(s) 180 from the endcap portion 1100. When exiting the endcap portion 1100, the shape memory material member(s) 180 can extend to another endcap portion 1100, to a portion of an exterior of the endcap 160', 170', or to some other structure.

A plurality of endcap portions 1100 can be joined to form an endcap (e.g., endcap 160' or endcap 170'). For instance, a first endcap portion 1100' and a second endcap portion 1100" can be joined together to form the endcap 160', 170'. In one or more arrangements, the first endcap portion 1100' and the second endcap portion 1100" can be substantially identical to each other. In one or more arrangements, the first endcap portion 1100' and the second endcap portion 1100" can be substantially mirror images of each other. In one or more arrangements, the first endcap portion 1100' and the second endcap portion 1100" can be different from each other in one or more respects. While this example shows two endcap portions, it will be appreciated that there can be more than two endcap portions.

When the first and second endcap portions 1100', 1100" are joined, the interfacing surface 1104 of the first endcap portion 1100' and the interfacing surface 1104 of the second endcap portion 1100" can directly contact each other. The first and second endcap portions 1100', 1100" can be joined in any suitable manner, now known or later developed. For instance, the first and second endcap portions 1100', 1100" can be joined by one or more fasteners, one or more adhesives, one or more forms of mechanical engagement, one or more other forms of connection, and/or any combination thereof. In the example shown in FIG. 12, the first and second endcap portions 1100', 1100" can be joined by a plurality of bolts 1119, which can extend through the endcap portion 1100. In one or more arrangements, the head of the bolt 1119 can engage the cap 1117 of the respective post. The bolt 1119 can extend through the aperture 1118 in the first endcap portion 1100'. The bolt 1119 can extend through the aperture 1118 in the second endcap portion 1100". A distal end of the bolt can pass outside of the cap 1117 of the second endcap portion 1100". The distal end of the bolt 1119 can be engaged a retaining member, such as a nut or other retaining structure. It will be appreciated that, in some arrangements, the endcap 160' and/or 170' can be unitary structures made of a single piece, such as by three-dimensional printing or injection molding.

The shape memory material member(s) 180 can extend between the first endcap 160' and the second endcap 170' in any suitable manner. One non-limiting example of the routing of the shape memory material member(s) 180 will now be described in connection with one of the endcap portions 1100 in FIG. 13.

Figure 13:
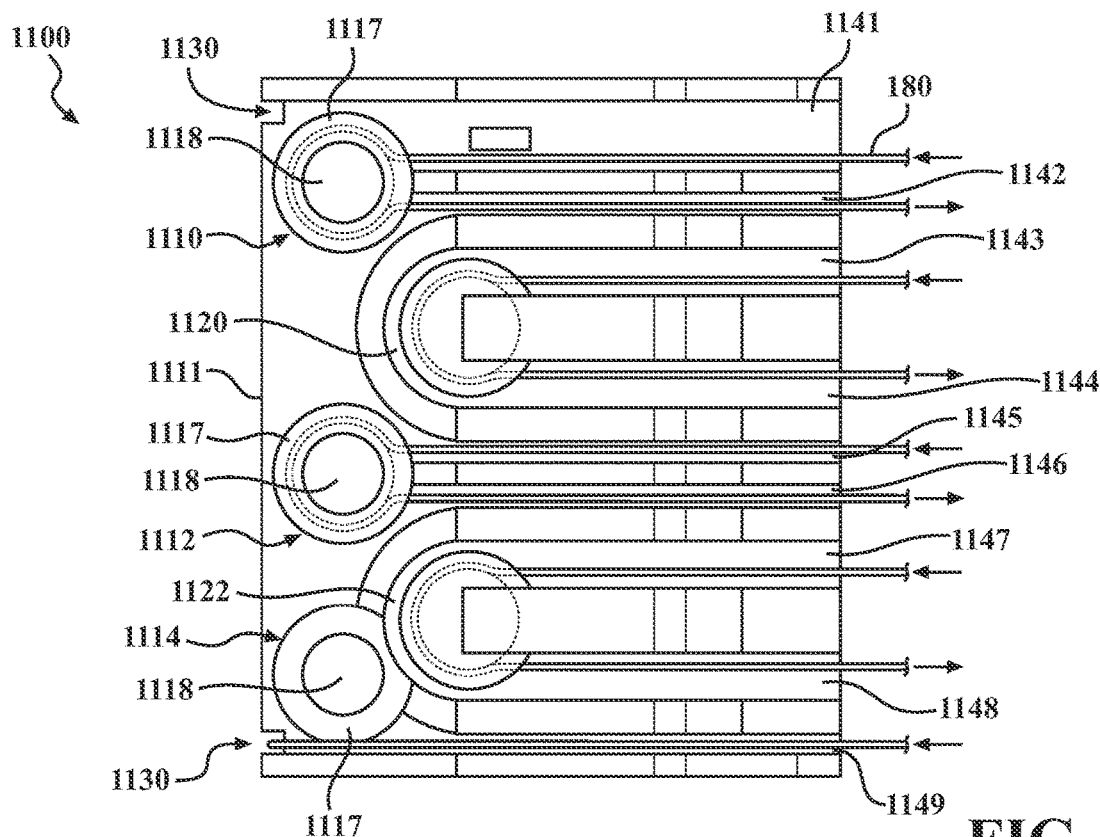
FIG. 13 is an example way of routing of a shape memory material member on the endcap shown in FIGS. 10-12.

Beginning near the top of the page in FIG. 13, the shape memory material member 180 can enter the first channel 1141. For example, the shape memory material member 180 can be coming from the opposite endcap (either substantially horizontally across the cavity 158 or diagonally across the cavity 158). The shape memory material member 180 can extend along the first channel 1141 to the first post 1110. The shape memory material member 180 can wrap around the first post 1110 so as to turn around and enter the second channel 1142. The shape memory material member 180 can be retained on the first post 1110 by the cap 1117.

The shape memory material member 180 can extend along the second channel 1142. The shape memory material member 180 can extend back across the cavity 158 and into engagement with the opposite endcap. The shape memory material member 180 can turn around in the opposite endcap, extend back across the cavity 158, and enter the third channel 1143. The shape memory material member 180 can extend along the third channel 1143 to the first groove 1120. The shape memory material member 180 can wrap around the first groove 1120 so as to turn around and enter the fourth channel 1144. The shape memory material member 180 can extend back across the cavity 158 and into engagement with the opposite endcap. The shape memory material member 180 can turn around in the opposite endcap and extend back across the cavity 158. The routing of the shape memory material member 180 can continue in the same manner with respect to the fifth channel 1145, the second post 1112, and the sixth channel 1146. The shape memory material member 180 can extend back across the cavity 158 and into engagement with the opposite endcap. The shape memory material member 180 can turn around in the opposite endcap and extend back across the cavity 158. The routing of the shape memory material member 180 can continue in the same manner with respect to the seventh channel 1147, the second groove 1122, and the eighth channel 1148.

The shape memory material member 180 can extend back across the cavity 158 and into engagement with the opposite endcap. The shape memory material member 180 can turn around in the opposite endcap and extend back across the cavity 158. The shape memory material member 180 can enter the ninth channel 1149. The shape memory material member 180 can extend along the ninth channel. The shape memory material member 180 can exit the endcap portion 1100 through the inlet/outlet notch 1130. From there, the shape memory material member 180 can extend to a point external to the endcap, to an attachment point on the endcap, to the other endcap portion to which the endcap portion shown in FIG. 13 is attached (e.g., by entering the inlet/outlet notch 1130 on the other endcap portion). In some arrangements, the shape memory material member 180 can wrap around the third post 1114 prior to exiting the endcap portion 1100 through the inlet/outlet notch 1130.

It will be understood that other arrangements of the shape memory material member 180 are possible and that the routing shown in FIG. 13 is merely one example. It should be noted that, when extending across the cavity 158, the shape memory material member(s) 180 can extend substantially straight across from one endcap to the other endcap. In such case, the shape memory material member(s) 180 can extend substantially parallel to the plane 1106. Alternatively, the shape memory material member(s) 180 can extend from the upper or lower side of one of the endcaps to the opposite one of the upper or lower side of the other endcap. Thus, the shape memory material member(s) 180 can extend substantially diagonally across the cavity 158. In some arrangements, the shape memory material member(s) 180 can be wrapped around one or more of the post(s) a plurality of times. For instance, in one or more arrangements, the shape memory material member(s) 180 can be wrapped twice around the post(s). In some arrangements, the shape memory material member(s) 180 can be wrapped around one or more of the groove(s) a plurality of times. Such wrapping of the shape memory material member(s) 180 can increase the actuation force imparted by the shape memory material member(s) 180 when activated.

In some arrangements, the endcaps 160', 170' or the endcap portions 1100 can be configured to provide a connection point for an end of the shape memory material member(s) 180. For instance, in one or more arrangements, the endcaps 160', 170' or the endcap portions 1100 can include a flange. The flange can provide a connection point for an end of the shape memory material member(s) 180. In this location, the shape memory material member(s) 180 can operatively connected to another conductor or other element to a power source. In some instance, the shape memory material member(s) 180 can be operatively connected to the flange, such as by one or more fasteners, one or more adhesives, one or more forms of mechanical engagement, one or more other forms of connection, and/or any combination thereof.

In some arrangements, the shape memory material member(s) 180 are bare, that is, they are not coated or covered with an insulating material. In some arrangements, at least a portion of the shape memory material member(s) 180 can be coated or covered with an insulating material. For instance, the portions of the shape memory material member(s) 180 that interact with the groove(s) and/or the post(s) can be coated or covered with an insulating material 167. In some arrangements, the insulating material can be a sleeve or a wrap.

It should be noted that, in at least some arrangements, the above-described actuators can use a wire guide to facilitate routing of the shape memory material member(s) 180. FIG. 14 is an example of a wire guide 1400. The wire guide 1400 can include a plurality of panels 1410. In each of the panels 1410, a plurality of apertures 1420 can be defined. The apertures 1420 can be sized, shaped, and/or configured to allow passage of the shape memory material member(s) 180 as they are routed between the endcaps 160, 170, 160', 170'. The plurality of panels 1410 can be spaced apart from each other. In some arrangements, the panels 1410 can be substantially equally spaced from each other. In other arrangements, the panels 1410 can be non-equally spaced from the each other. The panels 1410 can be connected to one or more frame members 1430. The wire guide 1400 can be made of any suitable material, such as one that does not interact with the shape memory material member(s) 180.

Figure 15:
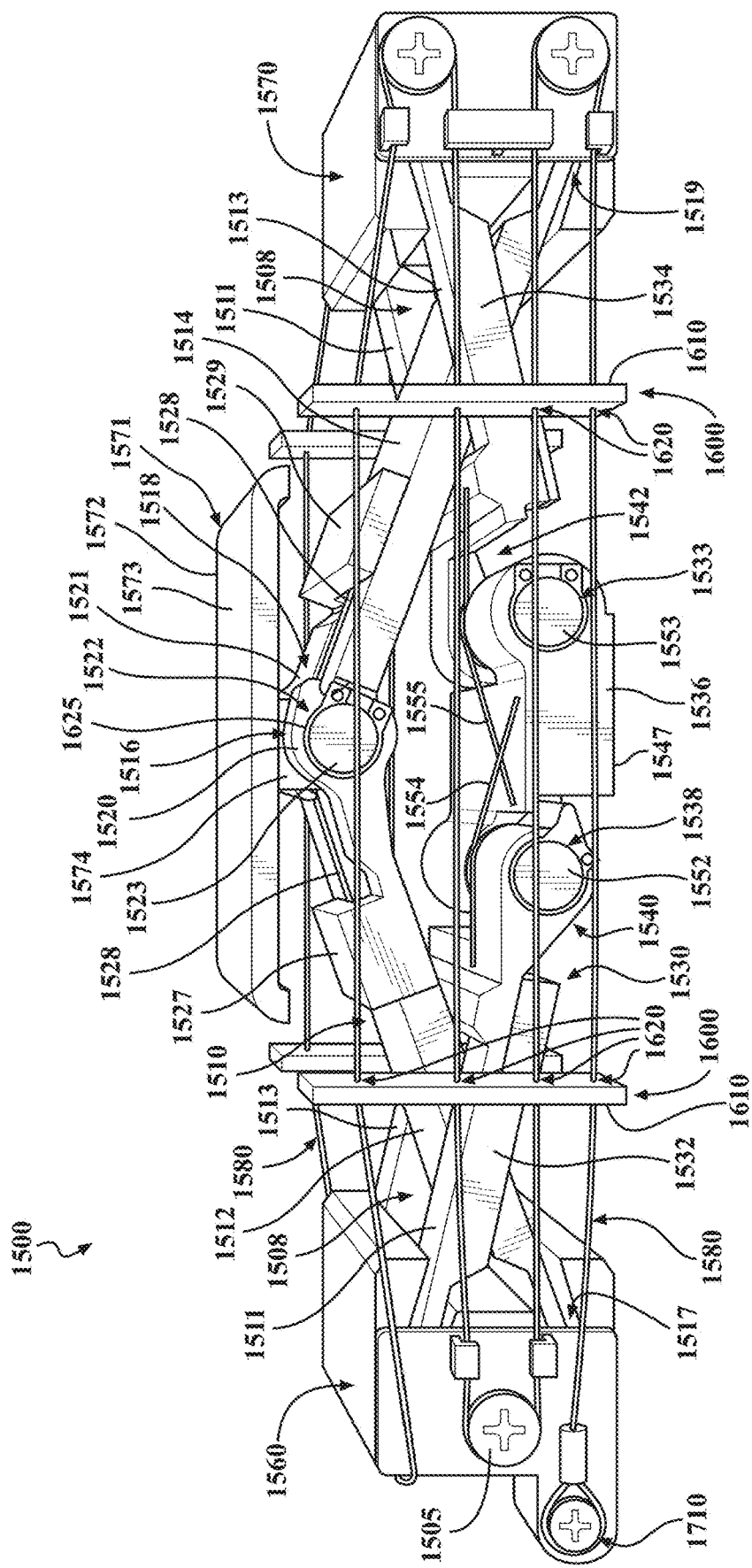
FIG. 15 is another example of an actuator.
Figure 16:
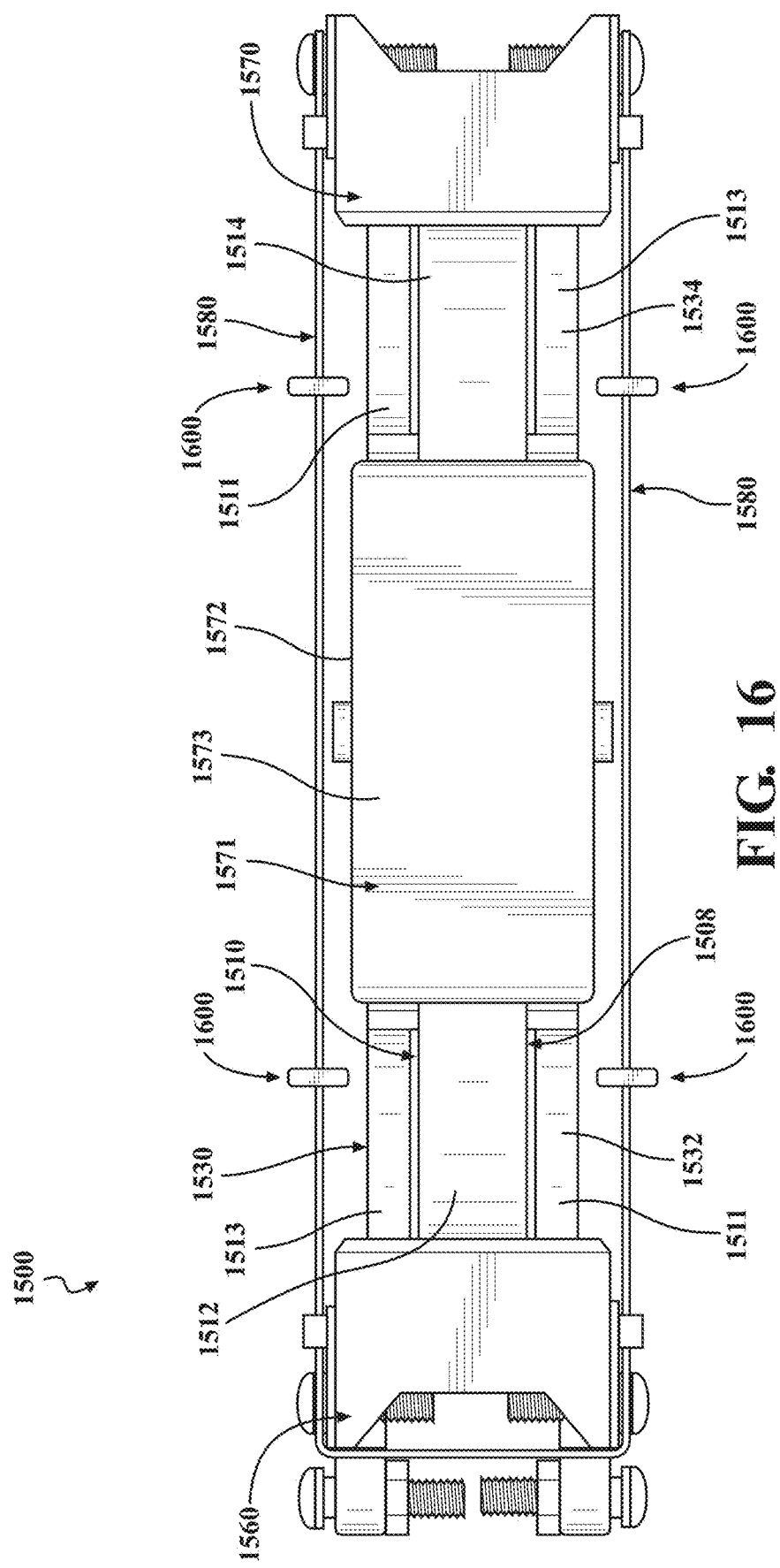
FIG. 16 is a view of the actuator of FIG. 15.

Referring to FIGS. 15-17, another example of an actuator 1500 is shown. The actuator 1500 can include a first outer body member 1510, a second outer body member 1530, a first endcap 1560, a second endcap 1570, and one or more contracting members 1580.

The first outer body member 1510 can include a first portion 1512 and a second portion 1514. The second outer body member 1530 can include a first portion 1532, a second portion 1534, and a base 1536.

The first outer body member 1510 the second outer body member 1530 can be arranged in a scissored configuration. In one or more arrangements, a portion of the first outer body member 1510 can cross a portion of the second outer body member 1530. More particularly, the first portion 1512 of the first outer body member 1510 and the first portion 1532 of the second outer body member 1530 can cross each other. Alternatively or additionally, the second portion 1514 of the first outer body member 1510 and the second portion 1534 of the second outer body member 1530 can cross each other. In one or more arrangements, the first portion 1512 of the first outer body member 1510 can pass through the first portion 1532 of the second outer body member 1530 and/or the second portion 1514 of the first outer body member 1510 can pass through the second portion 1534 of the second outer body member 1530. An example of such an arrangement will be described herein. Of course, it will be appreciated that, in other arrangements, the first portion 1532 of the second outer body member 1530 can pass through the first portion 1512 of the first outer body member 1510 and/or the second portion 1534 of the second outer body member 1530 can pass through the second portion 1514 of the first outer body member 1510.

Figure 19A:
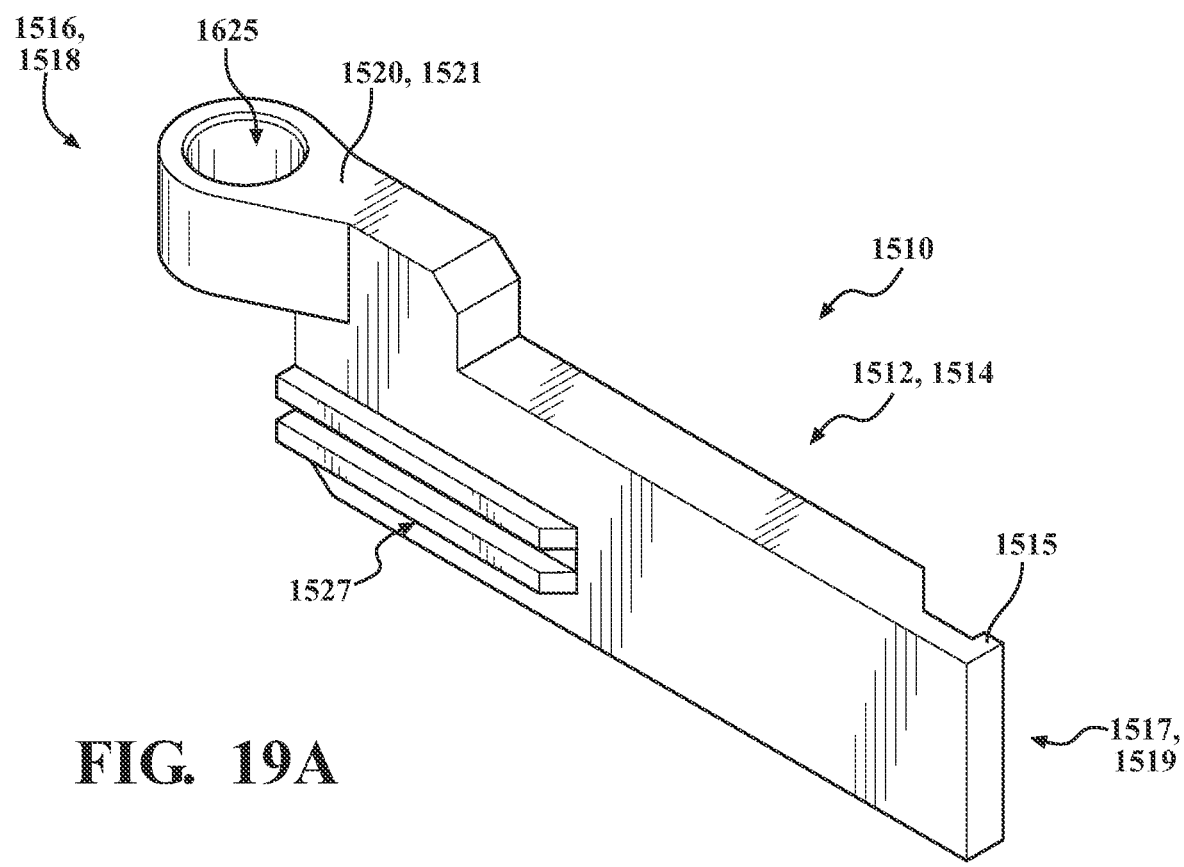
FIGS. 19A-19B show different views of an example of a first outer body member for the actuator of FIG. 15.
Figure 19B:
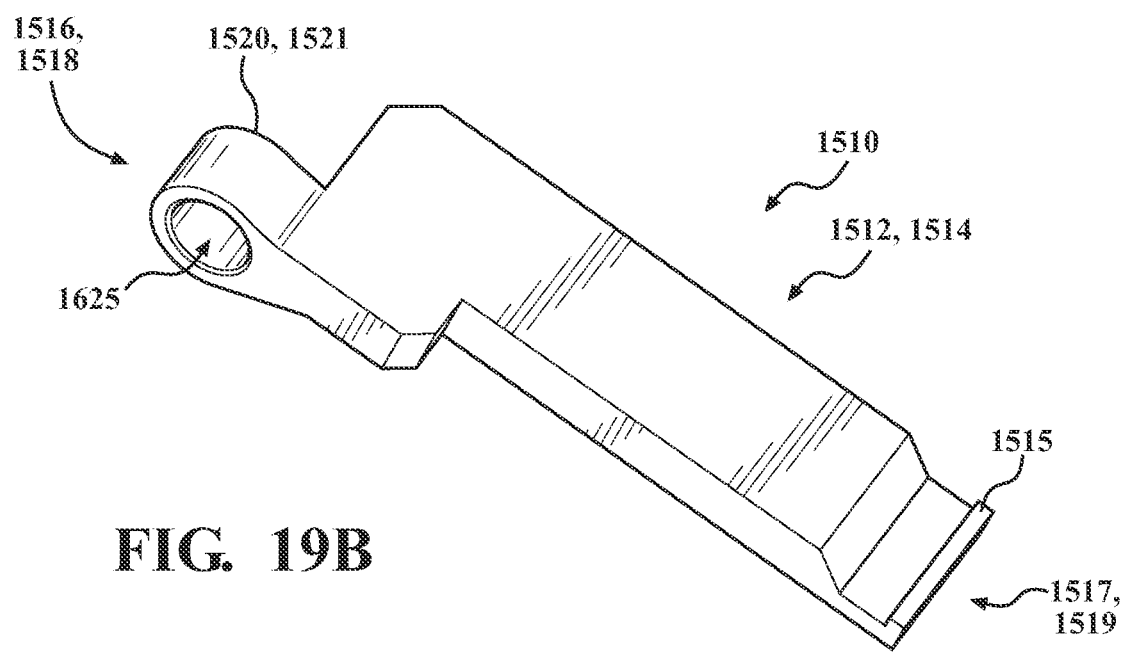

The first portion 1512 and the second portion 1514 can have any suitable size, shape, and/or configuration. In some arrangements, the first portion 1512 and the second portion 1514 can be substantially identical to each other, but they can be in different orientations. In other arrangements, the first portion 1512 and the second portion 1514 can be different from each other in one or more respects. One example of the first portion 1512 and the second portion 1514 is shown in FIGS. 19A and 19B. The first portion 1512 and the second portion 1514 can be made of any suitable material, such as plastic or metal.

The first portion 1512 and the second portion 1514 can be operatively connected to each other such that the first portion 1512 and the second portion 1514 can move relative to each other. In one or more arrangements, the first portion 1512 and the second portion 1514 can be pivotably connected to each other. For example, the first portion 1512 and the second portion 1514 can be pivotably connected to each other by one or more hinges. In one or more arrangements, the first portion 1512 and the second portion 1514 can be pivotably connected to each other by one or more barrel hinges 1522. In one or more arrangements, the one or more hinges can be a separate structure operatively connected to the first portion 1512 and the second portion 1514. Alternatively, the one or more hinges can be at least partially defined by the first portion 1512 and the second portion 1514.

The first portion 1512 can include a first interfacing end 1516 and a second interfacing end 1517. The second portion 1514 can include a first interfacing end 1518 and a second interfacing end 1519. The first interfacing end 1516 of the first portion 1512 and the first interfacing end 1518 of the second portion 1514 can be configured to interface with each other. For instance, the first interfacing end 1516 of the first portion 1512 can include a knuckle 1520, and the first interfacing end 1518 of the second portion 1514 can include a knuckle 1521. The knuckles 1520, 1521 can include openings 1625 that can be substantially aligned with each other to form in part the hinge. A pin 1523 can pass through the aligned openings. In such arrangements, the first portion 1512 and the second portion 1514 can define the leaves of the hinge.

The second interfacing end 1517 of the first portion 1512 can be configured to interface with the first endcap 1560. For instance, the second interfacing end 1517 of the first portion 1512 can include a lip 1515, hook, protrusion, tooth/teeth, or other feature for mechanically engaging a portion of the first endcap 1560. The first endcap 1560 can be configured to retainably engage the second interfacing end 1517 of the first portion 1512 while allowing the first portion 1512 to pivot therein. The second interfacing end 1519 of the second portion 1514 can be configured to interface with the second endcap 1570. For instance, the second interfacing end 1519 of the second portion 1514 can include a lip 1515, protrusion, or other feature for mechanical engagement with a portion of the second endcap 1570. The second endcap 1570 can be configured to retainably engage the second interfacing end 1519 of the second portion 1514 while allowing the second portion 1514 to pivot therein.

The first portion 1512 and the second portion 1514 can be angled relative to each other. As a result, the first outer body member 1510 can have a generally V-shape.

The actuator 1500 can include a biasing member 1528. The biasing member 1528 can be associated with the first outer body member 1510. The biasing member 1528 can be operatively positioned to bias the first outer body member 1510 into a non-activated configuration of the actuator 1500. More particularly, the biasing member 1528 can exert a force on the first portion 1512 and the second portion 1514 to bias them into the non-activated configuration.

The biasing member 1528 can be any suitable element for imparting a biasing force of the first outer body member 1510. In one or more arrangements, the biasing member 1528 can be a spring. More particularly, the biasing member 1528 can be a torsion spring.

In some arrangements, the first outer body member 1510 can be configured to engage or retain a portion of the biasing member 1528. For instance, the first portion 1512 can include a retaining member 1527, and the second portion 1514 can include a retaining member 1529. The retaining members 1527, 1529 can have any suitable size, shape, and/or configuration. In one or more arrangements, the retaining members 1527, 1529 can define a channel into which a portion of the biasing member 1528 can be received. Alternatively, the retaining members 1527, 1529 can be substantially L-shaped, substantially U-shaped, substantially V-shaped, or substantially J-shaped, just to name a few possibilities. For instance, in some arrangements, the retaining members 1527, 1529 can be similar to the retaining members 127, 129 in FIGS. 1-3. The retaining members 1527, 1529 can be formed as a unitary structure with the respective one of the first portion 1512 and the second portion 1514. In some arrangements, the retaining members 1527, 1529 can be formed separately from the first portion 1512 and the second portion 1514 and subsequently connected thereto.

In some arrangements, the actuator 1500 can include a push structure 1571. One example of the push structure 1571 is shown in FIGS. 15-17. The push structure 1571 can be configured to engage other structures or objects. The push structure 1571 can focus the force of the actuator 1500 on an intended target object. The push structure 1571 can have any suitable size, shape, and/or configuration. In one or more arrangements, the push structure 1571 can be substantially T-shaped. In some arrangements, the push structure 1571 can include a platform 1572 and a stem 1574.

The platform 1572 can have an engaging surface 1573. The engaging surface 1573 can be configured to provide a desired actuation effect on an intended target. In some arrangements, the engaging surface 1573 can be substantially planar. In some arrangements, the engaging surface 1573 can include one or more contours, protrusions, steps, elements, or other raised or non-planar features. The engaging surface 1573 can be configured to create a focal point for the actuation force of the actuator 1500.

In some arrangements, the engaging surface 1573 can be substantially rectangular in conformation, as is shown. In other arrangements, the engaging surface 1573 can be substantially circular, substantially square, substantially triangular, substantially polygonal, substantially hexagonal, substantially octagonal, or substantially trapezoidal, just to name a few possibilities.

In some arrangements, the engaging surface 1573 can be substantially parallel to the contracting member(s) 1580 and/or to a first dimension 1501 of the actuator 1500. In some arrangements, the engaging surface 1573 can be angled relative to the first dimension 1501 of the actuator 1500. The engaging surface 1573 can have any suitable orientation to achieve a desired actuation force effect.

The push structure 1571 can be operatively connected to the first outer body member 1510 and/or the second outer body member 1530. For instance, a portion of the stem 1574 can be configured to include one or more openings (like the openings 175 in FIG. 8) that can substantially align with the openings in the knuckles 1520, 1521 of the first outer body member 1510 and the second outer body member 1530 to form in part the hinge. The pin 1523 can pass through the aligned openings. While the first outer body member 1510 and the second outer body member 1530 can pivot relative to each other, the push structure 1571 can substantially maintain its orientation. In some arrangements, the push structure 1571 can be substantially centrally located with respect to the first outer body member 1510 and the second outer body member 1530.

The second outer body member 1530 can include a first portion 1532, a second portion 1534, and a base 1536. The first portion 1532, the second portion 1534, and the base 1536 can have any suitable size, shape, and/or configuration. In some arrangements, the first portion 1532 and the second portion 134 can be substantially identical to each other, but they can be in different orientations. However, in other embodiments, the first portion 1532 and the second portion 1534 can be different from each other in one or more respects.

Figure 18A:
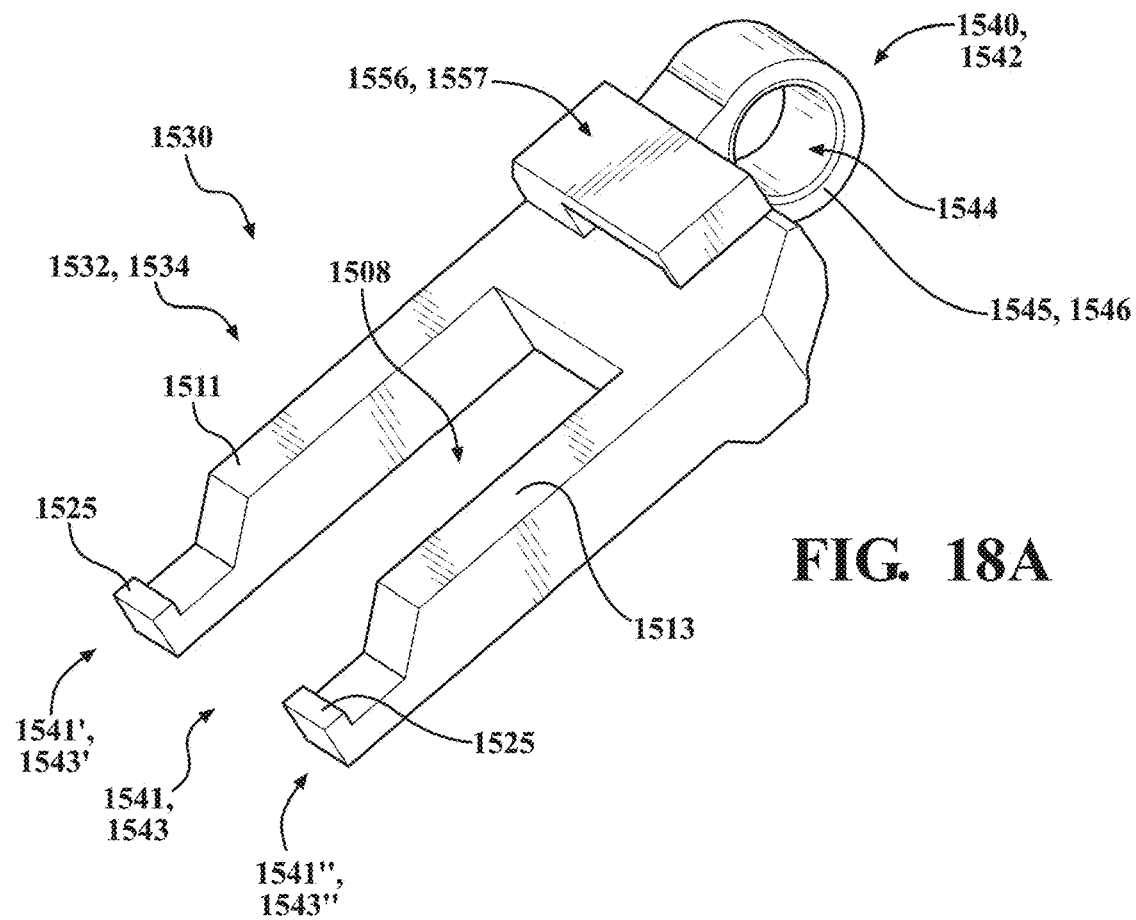
FIGS. 18A-18C show different view of an example of a second outer body member for the actuator of FIG. 15.
Figure 18B:
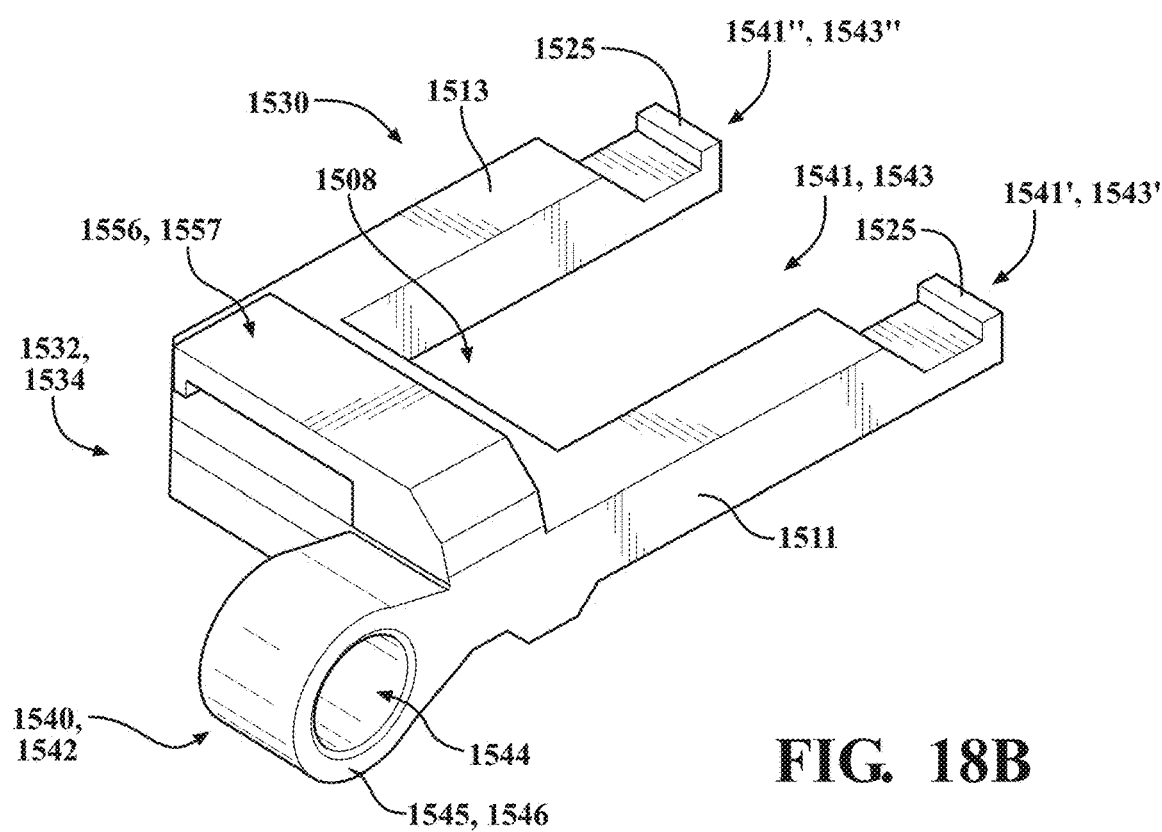
Figure 18C:
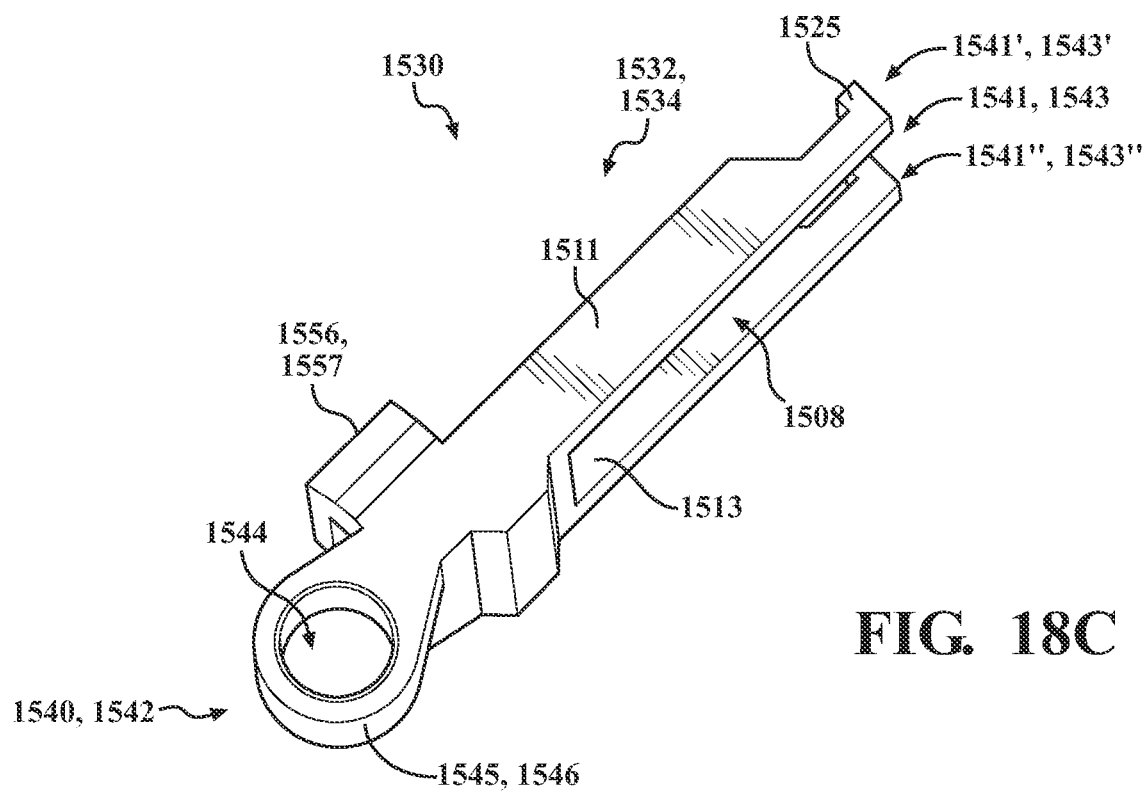

One example of the first portion 1532 and the second portion 1534 is shown in FIG. 18A-18C. The first portion 1532 and the second portion 1534 can be made of any suitable material, such as plastic or metal.

In some arrangements, the second outer body member 1530 can be configured to allow passage of the first outer body member 1510 through it. For instance, the second outer body member 1530 can have a forked configuration including a first leg 1511 and a second leg 1513. An aperture 1508 can be defined between the first leg 1511 and the second leg 1513. The aperture 1508 can be sized, shaped, and/or configured to allow the first outer body member 1510 to pass therethrough. The aperture 1508 can be sized, shaped, and/or configured to allow for movement of the first outer body member 1510 and the second outer body member 1530 when the actuator 1500 is activated or deactivated.

The first portion 1532 can include a first interfacing end 1540 and a second interfacing end 1541. In the forked configuration of the second outer body member 1530, the second interfacing end 1541 can have a first portion 1541' and a second portion 1541". The second portion 1534 can include a first interfacing end 1542 and a second interfacing end 1543. In the forked configuration of the second outer body member 1530, the second interfacing end 1543 can have a first portion 1543' and a second portion 1543".

The first portion 1532 and the second portion 1534 can be operatively connected to another element such that the first portion 1532 and the second portion 1534 can move relative to each other. In one or more arrangements, the first portion 1532 and the second portion 1534 can be operatively connected to each other. In one or more arrangements, the first portion 1532 and the second portion 1534 can both be operatively connected to another structure. For instance, each of the first portion 1532 and the second portion 1534 can be pivotably connected another structure. In one or more arrangements, each of the first portion 1532 and the second portion 1534 can be pivotably connected to the base 1536. For example, the first portion 1532 can be pivotably connected to the base 1536 by one or more hinges, and the second portion 1534 can be pivotably connected to the base 1536 by one or more hinges. In one or more arrangements, the first portion 1532 can be pivotably connected to the base 1536 by one or more barrel hinges 1538, and the second portion 1534 can be pivotably connected to the base 1536 by one or more barrel hinges 1533. The first portion 1532 and the second portion 1534 can be located on opposite sides of the base 1536.

In some arrangements, the one or more hinges can be separate structures operatively connected to the first portion 1532 and the base 1536 and to the second portion 1534 and the base 1536. Alternatively, in some arrangements, the one or more hinges can be formed at least in part by the first portion 1532, the second portion 1534, and/or the base 1536.

Figure 23:
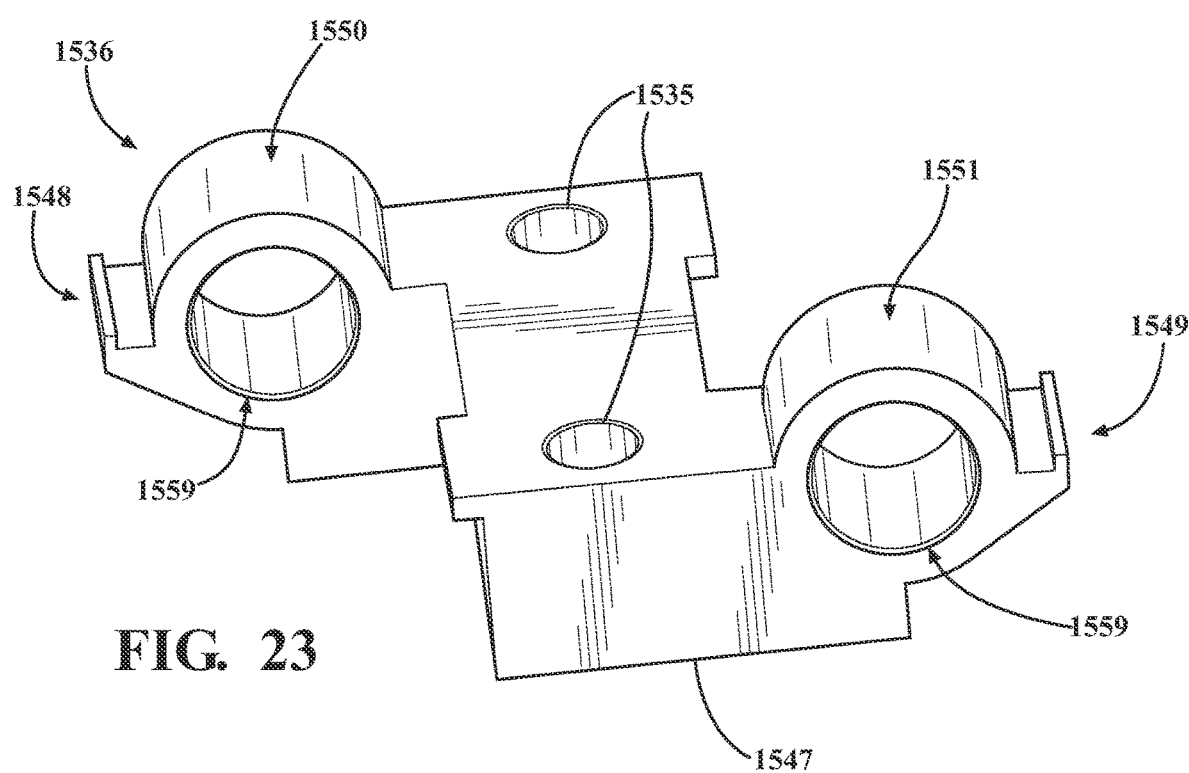
FIG. 23 is an example of a base of a second outer body member of the actuator of FIG. 15.

The base 1536 can have any suitable size, shape, and/or configuration. One example of the base 1536 is shown in FIG. 23. The base 1536 can have a first interfacing end 1548 and a second interfacing end 1549. The base 1536 can be configured to interface with the first portion 1532 and the second portion 1534. The first interfacing end 1540 of the first portion 1532 and the first interfacing end 1542 of the second portion 1534 can be configured to interface with the base 1536. For instance, the first interfacing end 1540 of the first portion 1532 can include one or more knuckles 1545, and the first interfacing end 1542 of the second portion 1534 can include one or more knuckles 1546. The knuckles 1545, 1546 can define an opening 1544. Further, the first interfacing end 1548 of the base 1536 can include one or more knuckles 1550, and the second interfacing end 1549 of the base 1536 can include one or more knuckles 1551. The knuckles 1550, 1551 can define an opening 1559. The opening(s) 1544 of the knuckle(s) 1545 of the first portion 1532 and the opening(s) 1559 of the knuckle(s) 1550 of the base 1536 can be substantially aligned with each other. A pin 1552 can be received in the aligned openings 1544, 1559. In such arrangements, the first portion 1532 and the base 1536 can be like the leaves of the hinge. The opening(s) 1544 of the knuckle(s) 1546 of the second portion 1534 and the opening(s) 1559 of the knuckle(s) 1551 of the base 1536 can be substantially aligned with each other. A pin 1553 can be received in the aligned openings 1544, 1559. In such arrangements, the second portion 1534 and the base 1536 can be like the leaves of the hinge.

The second interfacing end 1541 of the first portion 1532 can be configured to interface with the first endcap 1560. For instance, the second interfacing end 1541 of the first portion 1532 can include a lip 1515, hook, protrusion, tooth/teeth, or other feature for mechanically engaging a portion of the first endcap 1560. The first endcap 1560 can be configured to retainably engage the second interfacing end 1541 of the first portion 1532 while allowing the first portion 1532 to pivot therein. The second interfacing end 1543 of the second portion 1534 can be configured to interface with the second endcap 1570. For instance, the second interfacing end 1543 of the second portion 1534 can include a lip 1525, hook, tooth/teeth, protrusion, or other feature for mechanical engagement with a portion of the second endcap 1570. The second endcap 1570 can be configured to retainably engage the second interfacing end 1543 of the second portion 1534 while allowing the second portion 1534 to pivot therein.

One or more biasing members can be associated with the second outer body member 1530. For instance, a biasing member 1554 can be associated with the first portion 1532 and the base 1536, and a biasing member 1555 can be associated with the second portion 1534 and the base 1536. The biasing members 1554, 1555 can be operatively positioned to bias the second outer body member 1530 into a non-activated configuration of the actuator 1500. More particularly, the biasing member 1554 can exert a force on the first portion 1532 and the base 1536 to bias at least the first portion 1532 into the non-activated configuration. Further, the biasing member 1555 can exert a force on the second portion 1534 and the base 1536 to bias at least the second portion 1534 into the non-activated configuration.

The biasing members 1554, 1555 can be any suitable element for imparting a biasing force on the second outer body member 1530. In one or more arrangements, the biasing members 1554, 1555 can be springs. More particularly, the biasing members 1554, 1555 can be torsion springs.

In some arrangements, the biasing members 1528, 1554, 1555 can be substantially identical to each other. In some arrangements, one or more of the biasing members 1528, 1554, 1555 can be different from the other biasing members in one or more respects, such as in terms of size, shape, configuration, and/or biasing force, just to name a few possibilities.

In some arrangements, the second outer body member 1530 can be configured to engage or retain a portion of the biasing member 1554, 1555. For instance, the first portion 1532 can include a retaining member 1556, and the second portion 1534 can include a retaining member 1557. The retaining members 1556, 1557 can have any suitable size, shape, and/or configuration. In one or more arrangements, the retaining members 1556, 1557 can be substantially L-shaped (as shown in FIGS. 18A-18C), substantially U-shaped, substantially V-shaped, or substantially J-shaped, just to name a few possibilities. The retaining members 1556, 1557 can be formed as a unitary structure with the respective one of the first portion 1532 and the second portion 1534. In some arrangements, the retaining members 1556, 1557 can be formed separately from the first portion 1532 and the second portion 1534 and subsequently connected thereto.

The base 1536 can have any suitable size, shape, and/or configuration. In one or more arrangements, the base 1536 can be substantially rectangular. The base 1536 can be made of any suitable material, such as metal or plastic. The base 1536 can be made of the same material as the first outer body member 1510 and/or the second outer body member 1530, or the base 1536 can be made of a different material.

The base 1536 can be configured to be supported on a surface. The base 1536 can include an engaging surface 1547. The engaging surface 1547 can be configured to substantially matingly engage a surface on which the base 1536 is supported. In some arrangements, the engaging surface 1547 can be substantially planar. In some arrangements, the engaging surface 1547 can include one or more non-planar features, such as contours, protrusions, recesses, curves, etc. In some arrangements, the base 1536 can be configured for connection to another surface. For instance, the base 1536 can include one or more apertures 1535 to accommodate a fastener for attachment to another surface or structure.

The actuator 1500 can include a first endcap 1560 and a second endcap 1570. The first endcap 1560 and the second endcap 1570 can be spaced apart, such as in a direction corresponding to the first dimension 1501 of the actuator 1500. The first endcap 1560 and the second endcap 1570 can face toward each other. The first endcap 1560 and the second endcap 1570 can be substantially aligned with each other.

The first endcap 1560 and the second endcap 1570 can have any suitable size, shape, and/or configuration. In one or more arrangements, the first endcap 1560 and the second endcap 1570 can be substantially identical to each other. However, the first endcap 1560 and the second endcap 1570 can be oriented differently. The first endcap 1560 and the second endcap 1570 can be made of any suitable material, such as plastic or metal. In one or more arrangements, the first endcap 1560 and the second endcap 1570 can be different from each other in one or more respects.

In some arrangements, the first endcap 1560 and the second endcap 1570 can be configured to engage the first outer body member 1510 and the second outer body member 1530. Further, the first endcap 1560 and the second endcap 1570 can be configured to engage the contracting member(s) 1580.

One example of an endcap is shown in FIGS. 15-17 and 20-22. For convenience, the endcap will be referred to as the first endcap 1560, but it will be understood that the description is also equally applicable to the second endcap 1570.

Figure 20:
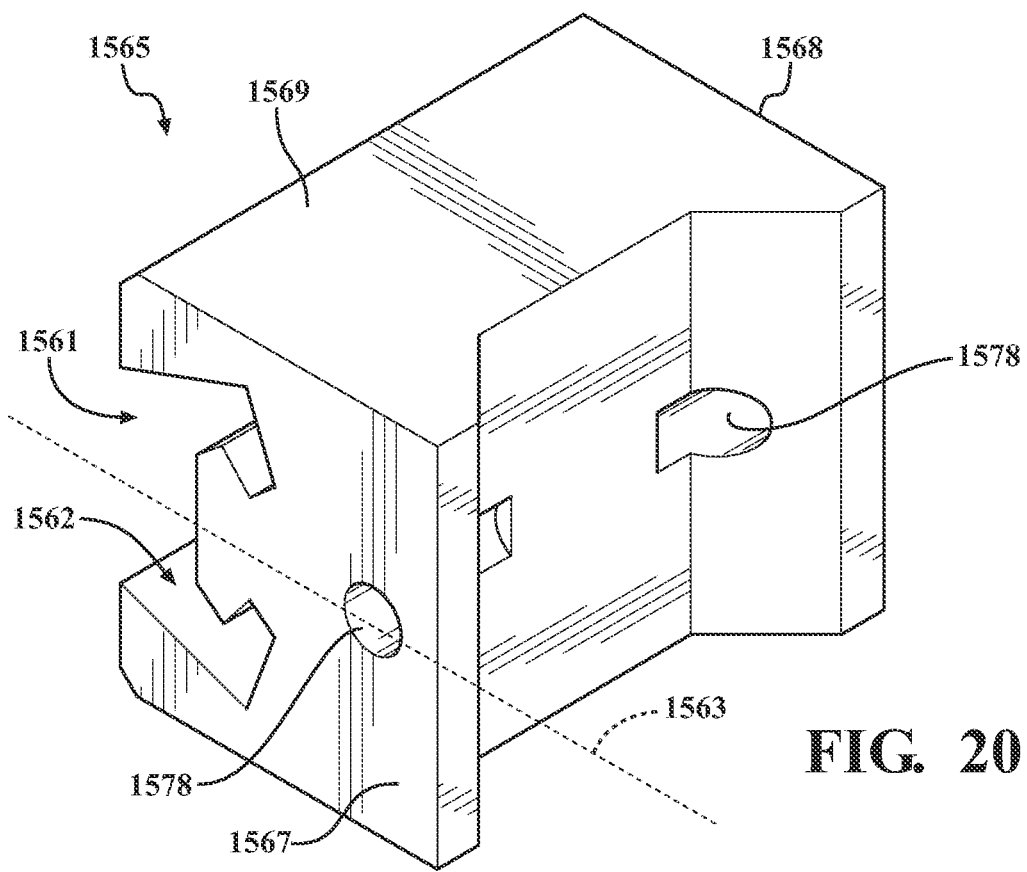
FIG. 20 is an example of a first portion of an endcap for the actuator of FIG. 15.
Figure 21:
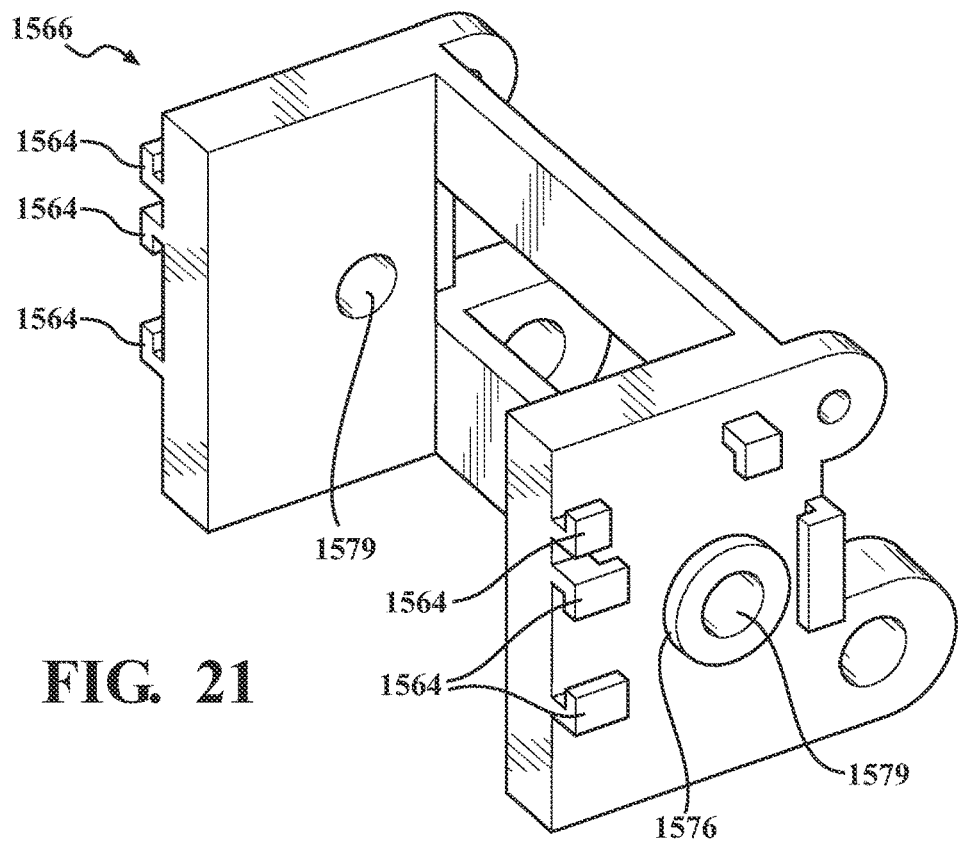
FIG. 21 is an example of a second portion of an endcap for the actuator of FIG. 15.

The first endcap 1560 can have any suitable construction. In some arrangements, the first endcap 1560 can include a first portion 1565 (FIG. 20) and a second portion 1566 (FIG. 21). The first portion 1565 and the second portion 1566 can be operatively connected to collectively form the first endcap 1560, such as by one or more fasteners (e.g., bolts 1505), one or more adhesives, one or more welds, one or more brazes, one or more forms of mechanical engagement, one or more other forms of connection, or any combination thereof.

The first endcap 1560 can be configured to engage the first outer body member 1510 and the second outer body member 1530. For instance, the first endcap 1560 can include one or more first engaging cavities 1561 and one or more second engaging cavities 1562. The first engaging cavity 1561 and the second engaging cavity 1562 can be angled relative to a central plane 1563 of the first endcap 1560. For instance, in one or more arrangements, the first engaging cavity 1561 and the second engaging cavity 1562 can be at an angle of about 20 to about 25 degrees relative to the central plane 1563. The first endcap 1560 can be substantially symmetrical about the central plane 1563.

The first engaging cavity 1561 of the first endcap 1560 can be configured for operative connection to the second outer body member 1530. More particularly, the first engaging cavity 1561 of the first endcap 1560 can be configured for operative connection to the second interfacing end 1541 of the first portion 1532. In the forked configuration example of the second outer body member 1530, the first engaging cavity 1561 can be a single cavity or two separate cavities to accommodate the first and second portions 1541', 1541" of the second interfacing end 1541.

Further, the first engaging cavity 1561 of the second endcap 1570 can be configured for operative connection to the second outer body member 1530. More particularly, the first engaging cavity 1561 of the second endcap 1570 can be configured for operative connection to the second interfacing end 1543 of the second portion 1534. In the forked configuration example of the second outer body member 1530, the first engaging cavity 1561 can be a single cavity or two separate cavities to accommodate the first and second portions 1543', 1543" of the second interfacing end 1543.

There can be any suitable form of operative connection between the second outer body member 1530 and the first engaging cavity 1561. For instance, the second outer body member 1530 can be operatively connected to the first engaging cavity 1561 by mechanical engagement, one or more fasteners, one or more adhesives, and/or one or more brazes or weld, just to name a few possibilities. As an example, the second outer body member 1530 can include a lip 1525, hook, tooth/teeth, protrusion, or other feature(s) that can engage with the respective endcap within the first engaging cavity 1561, such as by interlocking engagement. The second outer body member 1530 can be retainably engaged by the first engaging cavity 1561. The first engaging cavity 1561 can provide end containment for the first portion 1532 or the second portion 1534 to pivot in when the actuator 1500 is activated or deactivated.

The second engaging cavity 1562 of the first endcap 1560 can be configured for operative connection to the first outer body member 1510. More particularly, the second engaging cavity 1562 of the first endcap 1560 can be configured for operative connection to the second interfacing end 1517 of the first portion 1512. Further, the second engaging cavity 1562 of the second endcap 1570 can be configured for operative connection to the second interfacing end 1519 of the second portion 1514. The above discussion of the operative connection between the second outer body member 1530 and the first engaging cavity 1561 applies equally to the connection between the first outer body member 1510 and the second engaging cavity 1562. The first portion 1512 and/or the second portion 1514 of the first outer body member 1510 can include a lip 1515, hook, tooth/teeth, protrusion, or other features can engage with the respective endcap within the second engaging cavity 1562, such as by interlocking engagement. The first outer body member 1510 can be retainably engaged by the second engaging cavity 1562. The second engaging cavity 1562 can provide end containment for the first portion 1512 or the second portion 1514 to pivot in when the actuator 1500 is activated or deactivated.

The first endcap 1560, the first engaging cavity 1561, the second engaging cavity 1562, and the second interfacing ends 1517, 1519, 1541, 1543 can be configured to allow the second interfacing ends 1517, 1519, 1541, 1543 to be inserted substantially horizontally into their respective engaging cavity. As a result, assembly of the actuator 1500 can be facilitated.

Figure 17A:
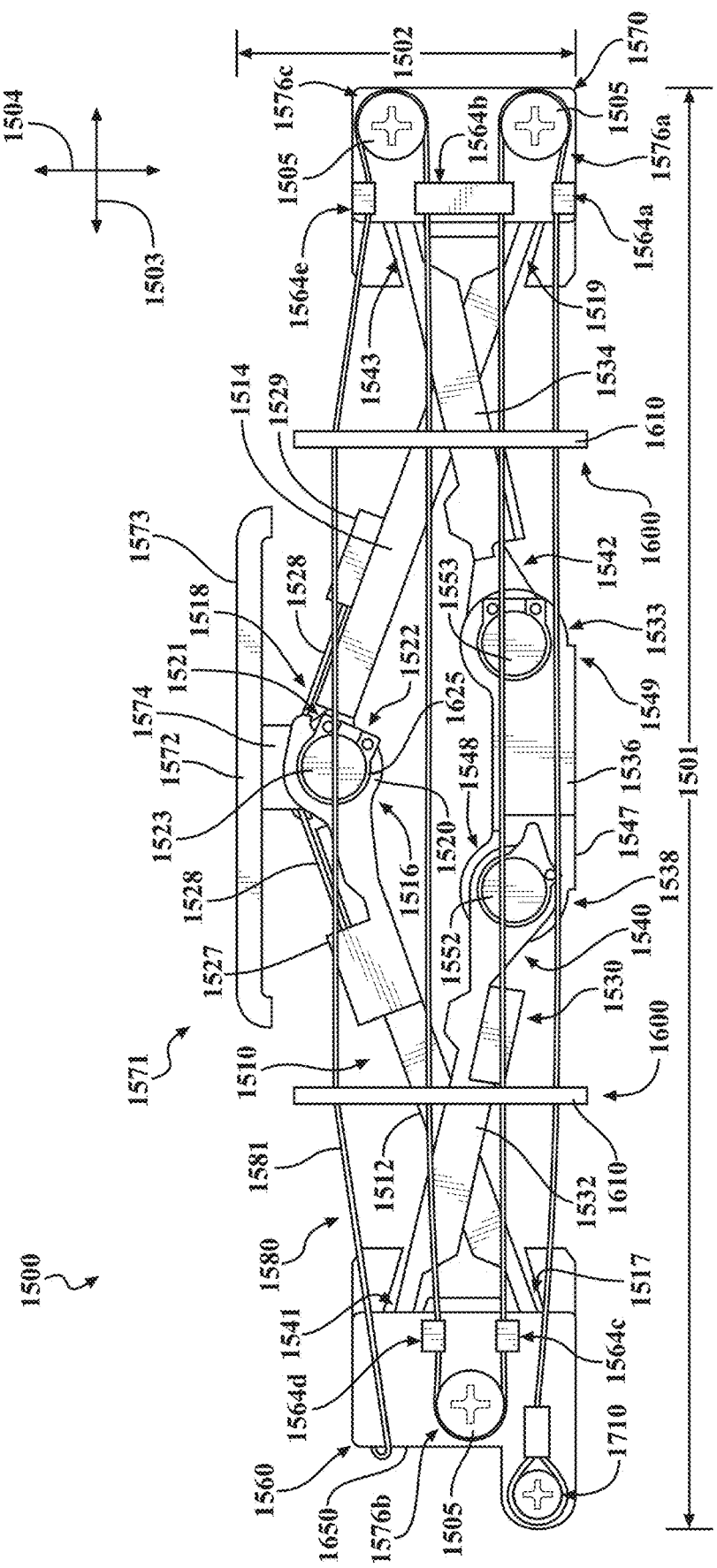
FIG. 17A is an example of the actuator of FIG. 15, showing a non-activated configuration.
Figure 17B:
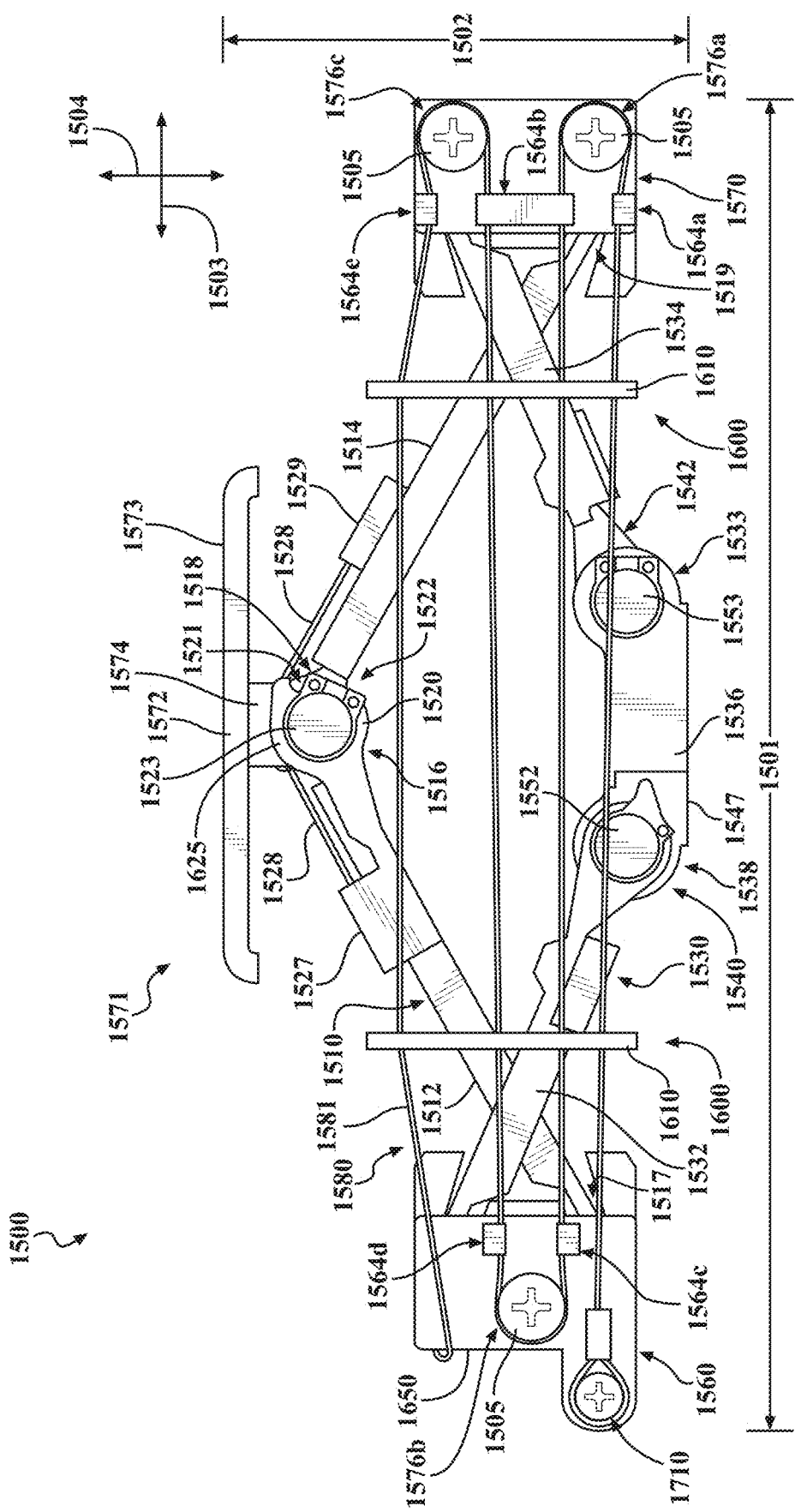
FIG. 17B is an example of the actuator of FIG. 15, showing an activated configuration.

Further, it should be noted that as a result of the scissoring arrangement of the first outer body member 1510 and the second outer body member 1530 that, at least in the orientation of the actuator 1500 shown in FIGS. 17A-17B, the second interfacing ends 1517, 1519 of the first outer body member 1510 can be located lower than the second interfacing ends 1541, 1543 of the second outer body member 1530.

The first endcap 1560 and the second endcap 1570 can include one or more features for engaging the contracting member(s) 1580. For instance, the first endcap 1560 can include one or more features to enable the contracting member(s) 1580 to turn around and extend toward the second endcap 1570. For instance, the first endcap 1560 and/or the second endcap 1570 can include one or more post(s) 1576. In some arrangements, the contracting member(s) 1580 can wrap around the post(s) 1576. The first endcap 1560 and/or the second endcap 1570 can include one or more guide(s) 1564. The guide(s) 1564 can be any structure that can direct, constrain, influence, or guide the position of the contracting member(s) 1580. In some arrangements, the contracting member(s) 1580 can be routed in part by the guide(s) 1564.

There can be any quantity of the posts(s) 1576, the guide(s) 1564, and/or other features for engaging the contracting member(s) 1580. Further, the one or more features for engaging the contracting member(s) 1580 can be provided on one or more sides of the first endcap 1560 and the second endcap 1570. For instance, the one or more feature for engaging the contracting member(s) 1580 can be provided on opposite sides of the first endcap 1560 and the second endcap 1570.

Figure 22:
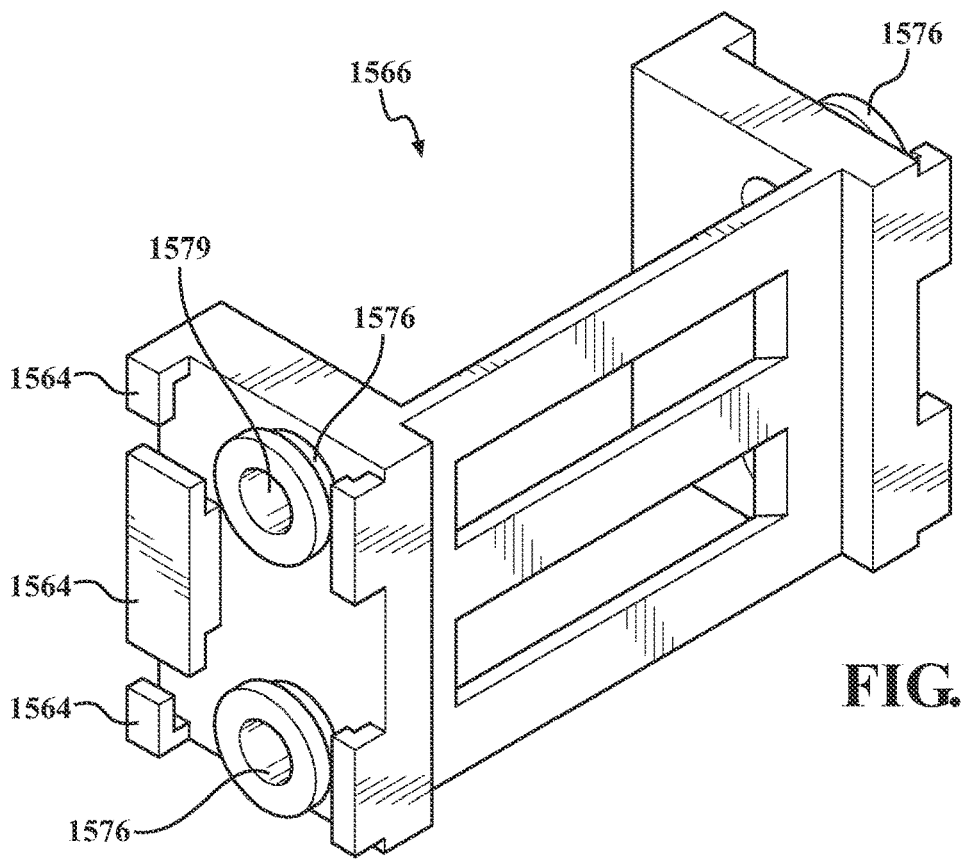
FIG. 22 is another example of the second portion of an endcap for the actuator of FIG. 15.

Some examples of the first endcap 1560 will now be described with respect to FIGS. 20-22. It will be understood that this discussion applies equally to the second endcap 1570. Further, it will be understood that the features and structures shown are merely an example, and arrangements described herein are not limited to the examples shown.

The first endcap 1560 can be a single piece. Alternatively, the first endcap 1560 can be made of a plurality of pieces. Referring to FIGS. 20 and 21, the first endcap 1560 can be made of a first portion 1565 and a second portion 1566. The first portion 1565 can include a body 1569. The body 1569 can define one or more engaging cavities. For instance, the body 1569 can define the first engaging cavity 1561 and the second engaging cavity 1562. In some arrangements, the first engaging cavity 1561 and the second engaging cavity 1562 can extend across the entire width of the first portion 1565. In such case, the first engaging cavity 1561 and the second engaging cavity 1562 can open to the lateral sides 1567, 1568 of the first portion 1565. Alternatively, the first engaging cavity 1561 and the second engaging cavity 1562 can extend partially across the width of the first portion 1565. In such case, the first engaging cavity 1561 and the second engaging cavity 1562 may open to only one of the lateral sides 1567, 1568 or neither of the lateral sides 1567, 1568. In the forked configuration example of the second outer body member 1530 described above, the first engaging cavity 1561 can be a single cavity or two separate cavities to accommodate the first and second portions 1541', 1541" of the second interfacing end 1541.

The first portion 1565 can include one or more guides 1564 on the lateral sides 1567 and/or 1568. In some instances, two or more of the guides 1564 can cooperate to define a routing for the contracting member(s) 1580. The first portion 1565 can include one or more apertures 1578 to facilitate the assembly of the first endcap 1560.

Referring to FIG. 21, an example of the second portion 1566 is shown. The second portion 1566 can include one or more features for engaging the contracting member(s) 1580. For instance, the second portion 1566 can include the posts 1576 and the guides 1564. Apertures 1579 can be defined in the posts 1576. When the first portion 1565 and the second portion 1566 are assembled, the apertures 1578, 1579 can be substantially aligned. A fastener (e.g., bolt 1505) can be received in the aligned apertures 1578, 1579 to operatively connect the first portion 1565 and the second portion 1566.

When assembled, the second portion 1566 can cover at least a portion of the first engaging cavity 1561 and/or the second engaging cavity 1562 As a result, the second portion 1566 can prevent the second interfacing ends 1517, 1519, 1541, 1543 from coming out of the lateral sides 1567, 1568 of the first portion 1565.

The second portion 1566 in FIG. 21 is merely one example. FIG. 22 shows an alternative example of the second portion 1566. In this example, there can be a plurality of the posts 1576 on one or both of the lateral sides 1567, 1568 of the second portion 1566. In such case, there can be an aperture 1579 associated with at least one of the posts 1576. Alternatively or additionally, the guides 1564 can be different from those shown in FIG. 21.

Again, it will be appreciated that the first endcap 1560 and the second endcap 1570 shown are merely one example. Indeed, the actuator 1500 can include any of the endcaps shown in various endcaps shown in FIGS. 1-3, 5, and 1013 or any other suitable type of endcap.

The contracting member(s) 1580 can extend between the first endcap 1560 and the second endcap 1570 in any suitable manner. One non-limiting example of the routing of the contracting member(s) 1580 will now be described in connection with FIG. 17A.

Beginning at a lower left region if the actuator 1500, the contracting member 1580 can be operatively connected to the first endcap 1560, such as by a fastener 1710 and/or in any other suitable manner. In this location, the contracting member 1580 can operatively connected to another conductor or other element to a power source.

The contracting member 1580 can extend from the first endcap 1560 to the second endcap 1570, passing through the wire guides 1600 along the way. The contracting member 1580 can be routed by the guide structure 1564a on the second endcap 1570. The contracting member 1580 can wrap around the post 1576a and extend back toward the first endcap 1560, guided by the guide structure 1564b, the wire guides 1600, and the guide structure 1564c. The contracting member 1580 can wrap around the post 1576b and turn back toward the second endcap 1570. The contracting member 1580 can be routed by the guide structure 1564d, the wire guides 1600, and the guide structure 1564b. The contracting member 1580 can wrap around the post 1576c and turn back toward the first endcap 1560. The contracting member 1580 can be routed by the guide structure 1564e and the wire guides 1600.

In some arrangements, the contracting member 1580 can end here, or it can be operatively connected to another structure (e.g., the first endcap 1560) or to a power source. In such instances, there can be another contracting member 1580 extending between the first endcap 1560 and the second endcap 1570 on the other side of the actuator 1500. In such an arrangements, the routing of the contracting member 1580 on one side of the actuator 1500 can be substantially the same as the routing on the other side of the actuator 1500. Alternatively, the routing of the contracting member 1580 on one side of the actuator 1500 can be different from the routing on the other side of the actuator 1500 in one or more respects.

Alternatively, the contracting member 1580 can extend around a back side 1650 of the first endcap 1560 and then continue to be routed on the opposite side of the actuator 1500 between the first endcap 1560 and the second endcap 1570. Thus, a single contracting member 1580 can be used on both sides of the actuator 1500. In such an arrangements, the routing of the contracting member 1580 on one side of the actuator 1500 can be substantially the same as the routing on the other side of the actuator 1500. Alternatively, the routing of the contracting member 1580 one side of the actuator 1500 can be different from the routing on the other side of the actuator 1500 in one or more respects.

It will be understood that other arrangements of the contracting member 1580 are possible and that the routing shown in FIG. 17A is merely one example. The example routing of the contracting member(s) 1580 shown in FIG. 17A shows the contracting member(s) 1580 routed on the outboard sides of the actuator 1500. However, it will be appreciated that arrangements are not limited in this regard. Indeed, the contracting member(s) 1580 can be routed within the overall envelope of the actuator 1500. For instance, the contracting member(s) 1580 can be routed in the space between the first outer body member 1510 and the second outer body member 1530. In such case, the first endcap 1560 and the second endcap 1570 of the actuator 1500 can be any suitable endcap, including of those shown and described in connection with FIGS. 1-3, 5, and 10 13.

Further, FIGS. 17A and 17B show the contracting member 1580 extending substantially straight across from one endcap to the other endcap. In such case, the contracting member(s) 1580 can extend substantially parallel to the direction corresponding to the first dimension 1501. In other arrangements, the contracting member(s) 1580 can extend non-parallel to the direction corresponding to the first dimension 1501. For instance, the contracting member(s) 1580 can extend from the upper or lower side of one of the endcaps to the opposite one of the upper or lower side of the other endcap. Thus, the contracting member(s) 1580 can extend substantially diagonally. In some arrangements, the contracting member(s) 1580 can be wrapped around one or more of the post(s) 1576 a plurality of times. Such wrapping of the contracting member(s) 1580 can increase the actuation force imparted by the contracting member(s) 1580 when activated.

In some arrangements, the contracting member(s) 1580 can be bare, that is, they are not coated or covered with an insulating material. In some arrangements, at least a portion of the contracting member(s) 1580 can be coated or covered with an insulating material. For instance, the portions of the contracting member(s) 1580 that interact with the post(s) 1576 and/or the guide(s) 1564 can be coated or covered with an insulating material. In some arrangements, the insulating material can be a sleeve or a wrap.

It should be noted that, in at least some arrangements, the above-described actuators can use one or more wire guides 1600 to facilitate routing of the contracting member(s) 1580. One example of the wire guide(s) 1600 is shown in FIGS. 15-17. The wire guide(s) 1600 can include one or more panels 1610. A plurality of apertures 1620 can be defined in the panel(s) 1610. The apertures 1620 can be sized, shaped, and/or configured to allow passage of the contracting member(s) 1580 (e.g., the shape memory material member(s) 1581) as they are routed between the endcaps 1560, 1570. The wire guide 1600 can be made of any suitable material, such as one that does not interact with or otherwise affect the performance of the contracting member(s) 1580.

FIG. 17A shows an example of the actuator 1500 in a non-activated configuration. Here, the contracting member(s) 1580 are not activated. FIG. 17B shows an example of the actuator 100 in an activated configuration. When an activation input (e.g., energy, electrical energy, heat, etc.) is provided to the contracting member(s) 1580, the contracting member(s) 1580 can contract. This contraction causes the contracting member(s) 1580 to pull the first endcap 1560 and the second endcap 1570 toward each other in a direction 1503 that corresponds to the first dimension 1501. As a result, the first outer body member 1510 and the second outer body member 1530 can extend outward and away from each other in a direction 1504 that corresponds to the second dimension 1502. It will be appreciated that, in going from the non-activated condition to the activated condition, the first dimension 1501 (i.e., the width) of the actuator 1500 can decrease and/or the second dimension 1502 (i.e., the height) of the actuator 1500 can increase. Further, it will be appreciated that the actuator 1500 can deliver a force in a direction that is out of plane or otherwise different from the direction of contraction of the contracting member(s) 1580.

When the actuator 1500 goes from a non-activated configuration to the activated configuration, the push structure 1571 can be located at a higher elevation. Also, when the actuator 1500 goes from a non-activated configuration to the activated configuration, the angle between the first portion 1512 and the second portion 1514 of the first outer body member 1510 can decrease. Similarly, when the actuator 1500 goes from a non-activated configuration to the activated configuration, the angle between the first portion 1532 and the second portion 1534 of the second outer body member 1530 can decrease. It will be appreciated that the first endcap 1560 and the second endcap 1570 can be configured to accommodate the movement of the first outer body member 1510 and the second outer body member 1530 while maintaining the operative connection to them.

It should be noted that, in some arrangements, the push structure 1571 can deliver an actuation force symmetrically, that is, substantially in line with a force direction of the actuator 1500 (e.g., in direction of the second dimension 1502). However, in other arrangements, the actuator 1500 can be configured to deliver an actuation force that is asymmetric, that is, not in line with the force direction of the actuator 1500. Delivery of an asymmetric actuation force can be achieved in various ways. As an example, the first portion 1512 and the second portion 1514 of the first outer body member 1510 can have different lengths. Thus, one of the portions is longer than the other. As a result, the push structure 1571 may no longer be substantially centrally located. Alternatively or additionally, the first portion 1532 and the second portion 1534 of the second outer body member 1530 can have different lengths. As a still further example, the push structure 1571 can be configured such that the engaging surface 1573 or other portion of the push structure 1571 is angled relative to the first dimension 1501. As yet another example, the push structure 1571 can be operatively connected to the first outer body member 110 such that the push structure 1571 extends from the first outer body member 1510 at an acute angle. As one more example, the biasing force of the biasing members 1554, 1555 can be different from each other. Of course, it will be appreciated that the delivery of an asymmetric actuation force can be achieved by any combination of the above and other arrangements.

Figure 30:
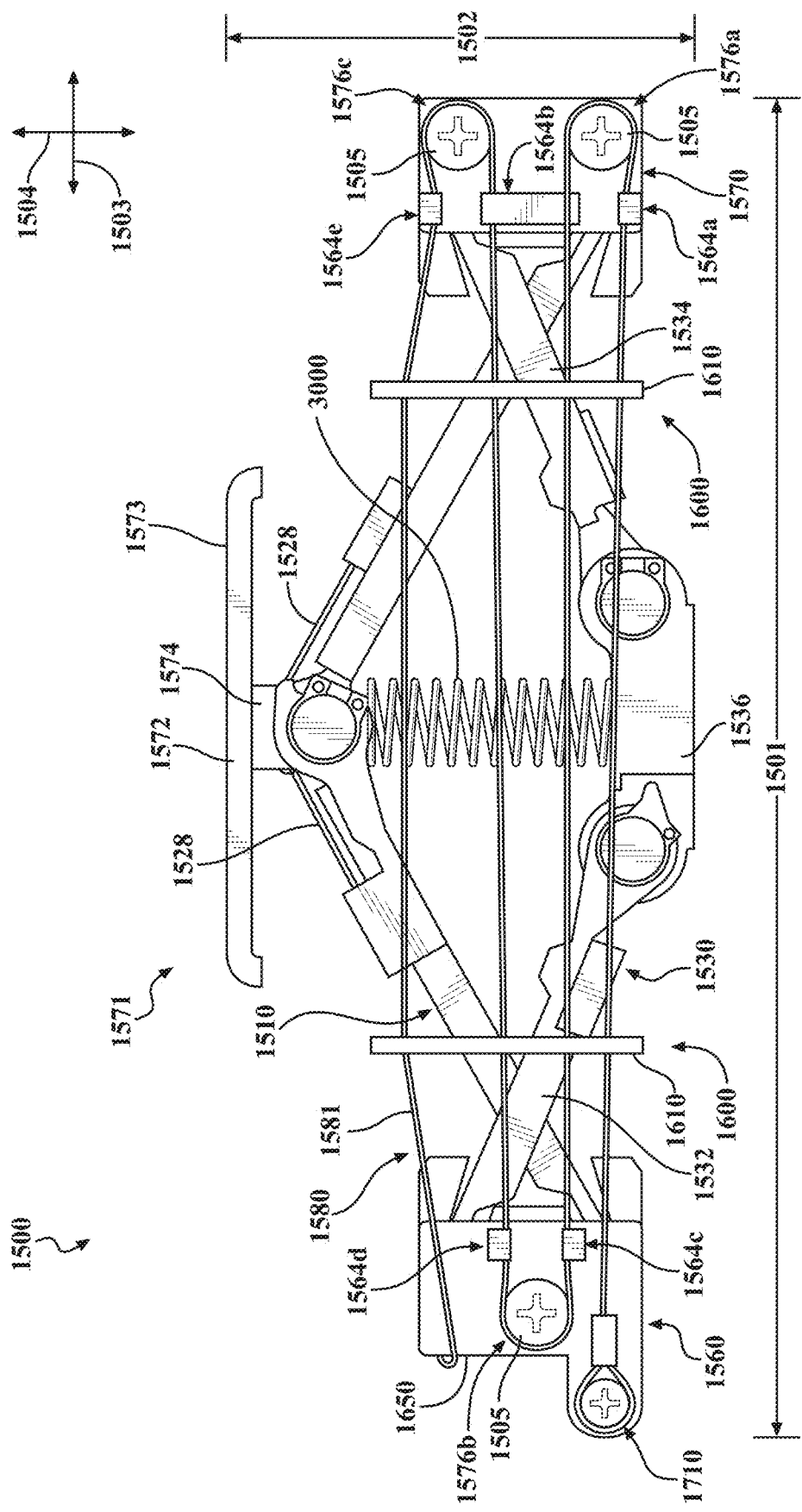
FIG. 30 is another example of an actuator of FIG. 15, showing a central biasing member.

FIG. 30 is an alternative arrangement of the actuator 1500. In this arrangement, the actuator 1500 can have a central biasing member 3000. In some arrangements, the central biasing member 3000 can be a spring and, more particularly, a compression spring. However, it will be appreciated that the central biasing member 3000 can be any suitable biasing member, now known or later developed.

In one or more arrangements, the central biasing member 3000 can be operatively connected to one or more portions of the actuator 1500. For example, the central biasing member 3000 can be operatively connected to the first outer body member 1510 and the second outer body member 1530. More particularly, the central biasing member 3000 can be operatively connected a portion of the first outer body member 1510 where the first portion 1512 and the second portion 1514 come together. Further, the central biasing member 3000 can be operatively connected to the base 1536 of the second outer body member 1530. There can be any suitable form of operative connection between the central biasing member 3000 and the one or more portions of the actuator 1500, including, for example, one or more welds, one or more brazes, one or more adhesives, one or more forms of mechanical engagement, one or more fasteners, or any combination thereof.

The central biasing member 3000 can provide improved comfort. The central biasing member 3000 can extend the force curve drop-off over a longer stroke. The central biasing member can be configured to bias the actuator 1500 to the non-activated configuration. It will be appreciated that the central biasing member 3000 can be used in connection with any of the actuators described herein.

It will be appreciated that the actuator 1500 can provide numerous advantages. For instance, the actuator 1500 can provide a more compact design with respect to the other actuators 100, 100'. The actuator 1500 can provide a lower height profile compared to the other actuators 100, 100'. In arrangements in which the actuator 1500 is used in connection with a vehicle seat, it will be appreciated that the slimmer profile of the actuator 1500 can facilitate integration of the actuator 1500 into the vehicle seat. The actuator 1500 can minimize or avoid enlargement of the vehicle seat, which, in turn, can minimize or avoid encroachment of the space behind the vehicle seat (e.g., second row leg room). Thus, the length on the vehicle does not have to be increased to accommodate the actuator 1500 and, as a result, the weight of the vehicle does not have to increase significantly.

Figure 24:
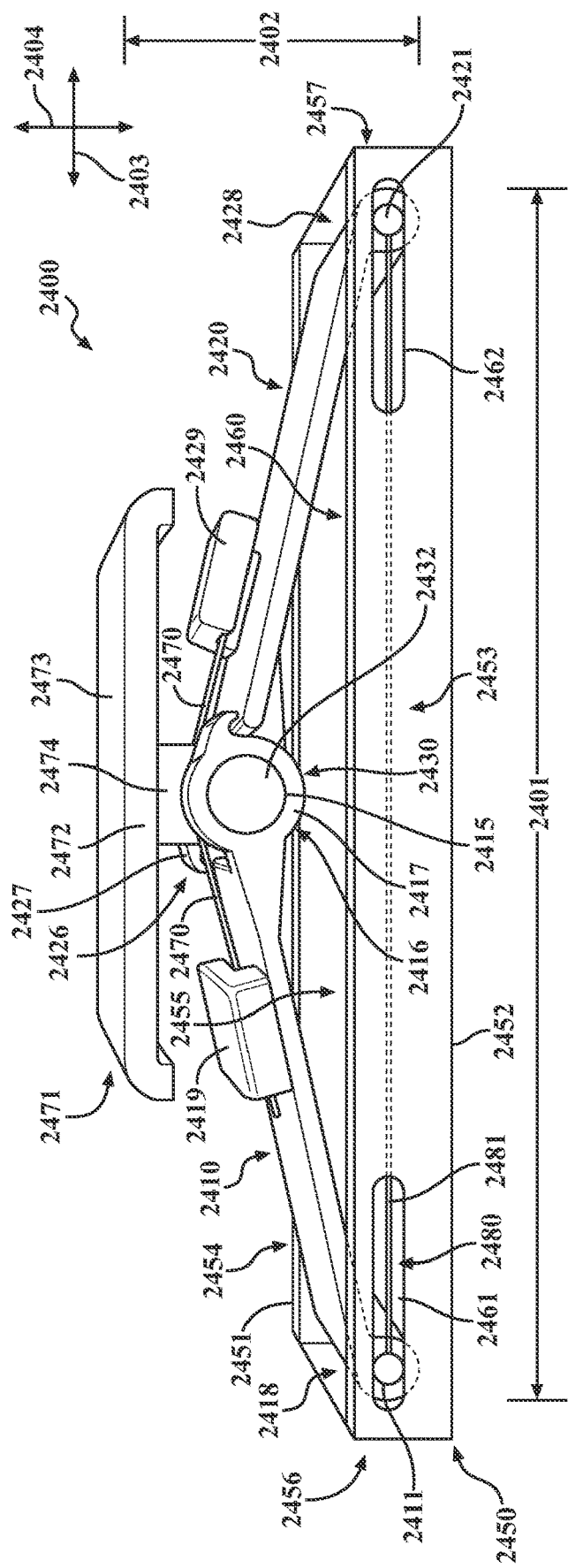
FIG. 24 is another example of an actuator, showing a non-activated configuration.
Figure 25:
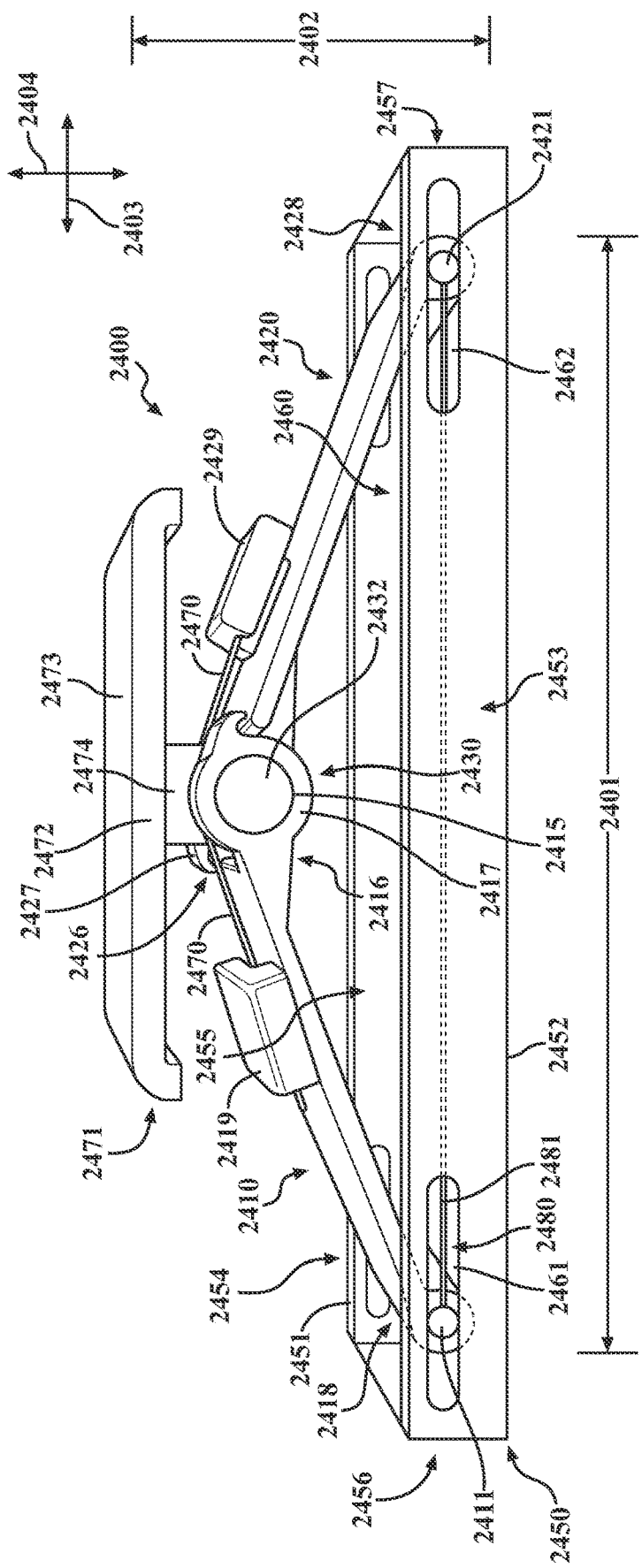
FIG. 25 is a view of the actuator of FIG. 25, showing an activated configuration.

Referring to FIGS. 24-25, another example of an actuator 2400 is shown. The actuator 2400 can have any suitable configuration. The actuator 2400 can include a first outer body member 2410, a second outer body member 2420, and one or more contracting members 2480. These and other components will be described in turn below.

The first outer body member 2410 and the second outer body member 2420 can have any suitable size, shape, and/or configuration. In some arrangements, the first outer body member 2410 and the second outer body member 2420 can be substantially identical to each other, but they can be in different orientations. In other arrangements, the first outer body member 2410 and the second outer body member 2420 can be different from each other in one or more respects. In some arrangements, the first outer body member 2410 and the second outer body member 2420 can be similar to the examples of the first portion 112 and the second portion 114 is shown in FIG. 6. While the first outer body member 2410 and the second outer body member 2420 are shown as being generally rectangular in shape, it will be appreciated that arrangements herein are not limited to any particular shape. The first outer body member 2410 and the second outer body member 2420 can be made of any suitable material, such as plastic or metal.

The first outer body member 2410 and the second outer body member 2420 can be operatively connected to each other such that the first outer body member 2410 and the second outer body member 2420 can move relative to each other. In one or more arrangements, the first outer body member 2410 and the second outer body member 2420 can be pivotably connected to each other. For example, the first outer body member 2410 and the second outer body member 2420 can be pivotably connected to each other by one or more hinges. In one or more arrangements, the first outer body member 2410 and the second outer body member 2420 can be pivotably connected to each other by one or more barrel hinges 2430. In one or more arrangements, the one or more hinges can be a separate structure operatively connected to the first outer body member 2410 and the second outer body member 2420. Alternatively, the one or more hinges can be at least partially defined by the first outer body member 2410 and/or the second outer body member 2420.

The first outer body member 2410 can include a first interfacing end portion 2416 and a second interfacing end portion 2418. The second outer body member 2420 can include a first interfacing end portion 2426 and a second interfacing end portion 2428. The first interfacing end portion 2416 of the first outer body member 2410 and the first interfacing end portion 2426 of the second outer body member 2420 can be configured to interface with each other. For instance, the first interfacing end portion 2416 of the first outer body member 2410 can include a knuckle 2417, and the first interfacing end portion 2426 of the second outer body member 2420 can include a knuckle 2427. The knuckle 2417 can define an opening 2415, and the knuckle 2427 can define an opening (not visible in FIG. 24). The opening of the knuckle 2417 and the opening of the knuckle 2427 can be substantially aligned with each other to form in part the hinge. A pin 2432 can pass through the aligned openings. In such arrangements, the first outer body member 2410 and the second outer body member 2420 can define the leaves of the hinge.

The first outer body member 2410 and the second outer body member 2420 can be angled relative to each other. As a result, the actuator 2400 can generally form an inverted V-shape or an A-shape.

The actuator 2400 can include a track 2450. The track 2450 can be made of any suitable material, such as plastic or metal. The track 2450 can have any suitable size, shape, and/or configuration. The track 2450 can include an upper side 2451, a lower side 2452, a first lateral side 2453, and a second lateral side 2454. It will be appreciated that the terms "upper," "lower," and "lateral" are used for convenience to facilitate the discussion with respect to the orientation of the actuator 2400 shown in FIGS. 24 and 25. Accordingly, it will be understood that these terms are not intended to be limiting.

The first outer body member 2410 and the second outer body member 2420 can be configured to interface with the track 2450. The first outer body member 2410 and the second outer body member 2420 can be configured to be slidable within the track 2450. The track 2450 can have any suitable configuration. For example, the track 2450 can include a channel 2455 into which a portion of the first outer body member 2410 and a portion of the second outer body member 2420 can be received. More particularly, the second interfacing end portion 2418 of the first outer body member 2410 and the second interfacing end portion 2428 of the second outer body member 2420 can be received in the channel 2455.

The channel 2455 can be open to the upper side 2451 of the track 2450. Thus, the channel 2455 can define an opening 2460 in the track 2450. The first outer body member 2410 and the second outer body member 2420 can extend through the opening 2460.

The channel 2455 can include a first lateral end 2456 and a second lateral end 2457. In some arrangements, the first lateral end 2456 and the second lateral end 2457 of the channel 2455 can be closed to prevent the portions of the first outer body member 2410 and the second outer body member 2420 from leaving coming out of the channel 2455 at an open end. To that end, the first lateral end 2456 and/or the second lateral end 2457 of the channel 2455 can include a closure element or blocking structure to physically block the lateral outward movement of the first outer body member 2410 and the second outer body member 2420. In some arrangements, the first lateral end 2456 and/or the second lateral end 2457 of the channel 2455 can be closed as a result of the construction of the track 2450. For instance, the track 2450 can be made of a machined block of material in which at least one of the first lateral end 2456 and the second lateral end 2457 is closed.

The track 2450, the channel 2455, the second interfacing end portion 2418 of the first outer body member 2410, and/or the second interfacing end portion 2428 of the second outer body member 2420 can be configured so that the second interfacing end portions 2418, 2428 are retainable received within the channel 2455. For instance, the second interfacing end portions 2418, 2428 can include a lip, protrusion, an enlarged portion, or other feature for mechanically engaging a portion of the channel 2455. In some arrangements, the second interfacing end portions 2418, 2428 and the channel 2455 can be configured for interlocking engagement. Thus, the first outer body member 2410 and the second outer body member 2420 cannot separate from the channel 2455 through the opening 2460 in the upper side 2451 of the track 2450.

The track 2450, the channel 2455, the first outer body member 2410, and/or the second outer body member 2420 can be configured to facilitate movement of the first outer body member 2410 and the second outer body member 2420 within the channel 2455. For instance, in some arrangements, the channel 2455, the first outer body member 2410, and/or the second outer body member 2420 can include one or more friction reducing coatings, lubricants, materials, substances, and/or treatments. Alternatively or additionally, the channel 2455, the first outer body member 2410, and/or the second outer body member 2420 can include one or more rollers, bearings, or low shear materials.

In some arrangements, the track 2450, the channel 2455, the first outer body member 2410, and/or the second outer body member 2420 can be configured to define the range of movement of the first outer body member 2410 and the second outer body member 2420 within the channel 2455. As an example, the track 2450 can include a first slot 2461 and a second slot 2462. The first slot 2461 and the second slot 2462 can be substantially identical to each other. Alternatively, the first slot 2461 and the second slot 2462 can be different from each other in one or more respects, including size, shape, length, width, and/or configuration. The first outer body member 2410 can include a protrusion 2411, and the second outer body member 2420 can include a protrusion 2421. The protrusion 2411 can be received within the first slot 2461, and the protrusion 2421 can be received within the second slot 2462. Thus, it will be appreciated that the range of movement of the first outer body member 2410, and/or the second outer body member 2420 can be defined by the range of movement of the protrusions 2411, 2421 within the slots 2461, 2462. However, in other arrangements, the range of movement of the first outer body member 2410 and/or the second outer body member 2420 can be defined by the channel 2455.

It should be noted that, in some arrangements, the slots 2461, 2462 and protrusions 2411, 2421 can be provided on only one side of track 2450 and the outer body members 2410, 2420. However, in other arrangements, the slots 2461, 2462 and protrusions 2411, 2421 can be provided on opposite sides of track 2450 and the outer body members 2410, 2420.

The actuator 2400 can include one or more biasing members 2470. The biasing member(s) 2470 can be associated with the first outer body member 2410 and/or the second outer body member 2420. The biasing member(s) 2470 can be operatively positioned to bias the first outer body member 2410 and/or the second outer body member 2420 into a non-activated configuration of the actuator 2400. More particularly, the biasing member(s) 2470 can exert a force on the first outer body member 2410 and the second outer body member 2420 to bias them into the non-activated configuration.

The biasing member(s) 2470 can be any suitable element for imparting a biasing force on the first outer body member 2410 and/or the second outer body member 2420. In one or more arrangements, the biasing member(s) 2470 can be a spring. More particularly, the biasing member(s) 2470 can be a torsion spring.

In some arrangements, the first outer body member 2410 and the second outer body member 2420 can be configured to engage or retain a portion of the biasing member 2470. For instance, the first outer body member 2410 can include a retaining member 2419, and the second outer body member 2420 can include a retaining member 2429. The retaining members 2419, 2429 can have any suitable size, shape, and/or configuration. In one or more arrangements, the retaining members 2419, 2429 can be substantially L-shaped (as shown in FIGS. 24-25), substantially U-shaped, substantially V-shaped, or substantially J-shaped, just to name a few possibilities. The retaining members 2419, 2429 can be formed as a unitary structure with the respective one of the first outer body member 2410 and the second outer body member 2420. In some arrangements, the retaining members 2419, 2429 can be formed separately from the first outer body member 2410 and the second outer body member 2420 and subsequently connected thereto. The retaining members 2419, 2429 can be substantially identical to each other, or they can be different from each other in one or more respects.

The actuator 2400 can include a push structure 2471. One example of the push structure 2471 is shown in FIGS. 24-25. The push structure 2471 can be configured to engage other structures or objects. The push structure 2471 can focus the force of the actuator 2400 on an intended target object. The push structure 2471 can have any suitable size, shape, and/or configuration. In one or more arrangements, the push structure 2471 can be substantially T-shaped. In some arrangements, the push structure 2471 can include a platform 2472 and a stem 2474.

The platform 2472 can have an engaging surface 2473. The engaging surface 2473 can be configured to provide a desired actuation effect on an intended target. In some arrangements, the engaging surface 2473 can be substantially planar. In some arrangements, the engaging surface 2473 can include one or more contours, protrusions, steps, elements, or other raised or non-planar features. The engaging surface 2473 can be configured to create a focal point for the actuation force of the actuator 2400.

In some arrangements, the engaging surface 2473 can be substantially rectangular in conformation, as is shown. In other arrangements, the engaging surface 2473 can be substantially circular, substantially square, substantially triangular, substantially polygonal, substantially hexagonal, substantially octagonal, or substantially trapezoidal, just to name a few possibilities.

In some arrangements, the engaging surface 2473 can be substantially parallel to the contracting member(s) 2480 and/or to a first dimension 2401 of the actuator 2400. In some arrangements, the engaging surface 2473 can be angled relative to the contracting member(s) 2480 and/or to the first dimension 2401 of the actuator 2400. The engaging surface 2473 can have any suitable orientation to achieve a desired actuation force effect.

The push structure 2471 can be operatively connected to the first outer body member 2410 and/or the second outer body member 2420. For instance, a portion of the stem 2474 can be configured to include one or more openings (see e.g., openings 175 in FIG. 8) that can substantially align with the openings in the knuckles 2417, 2427 of the first outer body member 2410 and the second outer body member 2420 to form in part the hinge. The pin 2432 can pass through the aligned openings. While the first outer body member 2410 and the second outer body member 2420 can pivot relative to each other, the push structure 2471 can substantially maintain its orientation. In some arrangements, the push structure 2471 can be substantially centrally located with respect to the first outer body member 2410 and the second outer body member 2420.

As noted above, the actuator 2400 can have one or more contracting members 2480. The contracting member(s) 2480 can be any member or material that, when an activation input is provided to the contracting member, the contracting member can contract.

The actuator 2400 can include one or more shape memory material members 2481. The shape memory material member(s) 2481 can be operatively connected to the first outer body member 2410 and the second outer body member 2420. More particularly, the shape memory material member(s) 2481 can be operatively connected to the second interfacing end portion 2418 of the first outer body member 2410 and the second interfacing end portion 2428 of the second outer body member 2420. Any suitable manner of operative connection can be provided, such as one or more fasteners, one or more adhesives, one or more welds, one or more brazes, one or more forms of mechanical engagement, or any combination thereof.

In going from outer body member to the other outer body member, the shape memory material member(s) 2481 can extend within the channel 2455. In some arrangements, the shape memory material member(s) 2481 can extend within the opening 2460. In some arrangements, the shape memory material member(s) 2481 can extend outside of the track 2450. In some arrangements, the shape memory material member(s) 2481 can extend substantially parallel to the channel 2455.

In some arrangements, there can be a single shape memory material member 2481. In such case, the shape memory material member 2481 can, for example, extend straight between the first outer body member 2410 and the second outer body member 2420. In another example, the shape memory material member 2481 can extend in a serpentine or zigzag pattern between the first outer body member 2410 and the second outer body member 2420. In some arrangements, the first outer body member 2410 and the second outer body member 2420 can be configured to allow the shape memory material member 2481 to turn around and extend in the opposite direction, such as by providing one or more posts, channels, eyelets, or other features that can enable such turning around. When activated, the shape memory material member(s) 2481 can be configured to overcome the biasing forces exerted by the biasing member(s) 2470.

In some arrangements, there can be a plurality of shape memory material members 2481. In such case, the plurality of shape memory material members 2481 can be distributed, arranged, and/or oriented in any suitable manner. For instance, the shape memory material members 2481 can extend substantially parallel to each other. In other arrangements, one or more of the shape memory material members 2481 can extend non-parallel to the other shape memory material members 2481. In some instances, some of the plurality of shape memory material members 2481 may cross over each other. When activated, the shape memory material member(s) 2481 can be configured to overcome the biasing forces exerted by the biasing members 2470.

The general discussion of the contracting members and the shape memory material member(s) 180 made in connection with FIGS. 1-3 applies equally to the actuator 2400 shown in FIGS. 24-25 as well.

It should be noted that the shape memory material member(s) 2481 can be located substantially entirely within the overall envelope of the actuator 2400. "Substantial majority" means about 60% or greater, about 65% or greater, about 70% or greater, about 75% or greater, about 80% or greater, about 85% or greater, about 90% or greater, or about 95% or greater. In some arrangements, a portion of the shape memory material member(s) 2481 can extend outside of the overall envelope of the actuator 2400 for operative connection to conductor and/or power source.

The actuator 2400 can include a first dimension 2401 and the second dimension 2402. The first dimension 2401 can describe a width of the actuator 2400, and the second dimension 2402 can describe a height of the actuator 2400. The first dimension 2401 and the second dimension 2402 can be substantially perpendicular to each other.

FIG. 24 shows an example of the actuator 2400 in a non-activated configuration. Here, the contracting member 2480 is not activated. FIG. 25 shows an example of the actuator 2400 in an activated configuration. When an activation input (e.g., electrical energy, heat, energy, etc.) is provided to the contracting member(s) 2480, the contracting member(s) 2480 can contract. This contraction causes the contracting member(s) 2480 to pull the first outer body member 2410 and the second outer body member 2420 toward each other in a first direction 2403 that corresponds to the first dimension 2401. More particularly, the second interfacing end portion 2418 of the first outer body member 2410 and the second interfacing end portion 2428 of the second outer body member 2420 can be pulled toward each other in the direction 2403 that corresponds to the first dimension 2401.

As a result, the first outer body member 2410 and the second outer body member 2420 can extend outward in a second direction 2404 that corresponds to the second dimension 2402. More particularly, the first interfacing end portion 2416 of the first outer body member 2410 and the first interfacing end portion 2426 of the second outer body member 2420 can extend outward and away from the track 2450 in the direction 2404 that corresponds to the second dimension 2402.

It will be appreciated that, in going from the non-activated condition to the activated condition, the first dimension 2401 (i.e., the width) of the actuator 2400 can decrease and/or the second dimension 2402 (i.e., the height) of the actuator 2400 can increase. Further, it will be appreciated that the actuator 2400 can deliver a force in a direction that is out of plane or otherwise different from the direction of contraction of the contracting member(s) 2480.

When the actuator 2400 goes from a non-activated configuration to the activated configuration, the location of the push structure 2471 can be change. In the orientation of FIGS. 24 and 25, the push structure 2471 can be located at a higher elevation when the actuator 2400 is activated. Also, when the actuator 2400 goes from a non-activated configuration to the activated configuration, the angle between the first outer body member 2410 and the second outer body member 2420 can decrease. It will be appreciated that the track 2450 can be configured to accommodate the movement of the first outer body member 2410 and the second outer body member 2420 while maintaining the operative connection to them.

It should be noted that, in some arrangements, the push structure 2471 can deliver an actuation force symmetrically, that is, substantially in line with a force direction of the actuator 2400 (e.g., in direction of the second dimension 2402). However, in other arrangements, the actuator 2400 can be configured to deliver an actuation force that is asymmetric, that is, not in line with the force direction of the actuator 2400. Delivery of an asymmetric actuation force can be achieved in various ways. As an example, the first outer body member 2410 and the second outer body member 2420 can have different lengths. As a result, the push structure 2471 may no longer be substantially centrally located. As a still further example, the push structure 2471 can be configured such that the engaging surface 2473 or other portion of the push structure 2471 is angled relative to the first dimension 2401. As yet another example, the push structure 2471 can be operatively connected so as to extend from the first outer body member 2410 or the second outer body member 2420 at an acute angle. Of course, it will be appreciated that the delivery of an asymmetric actuation force can be achieved by any combination of the above and other arrangements.

Figure 26:
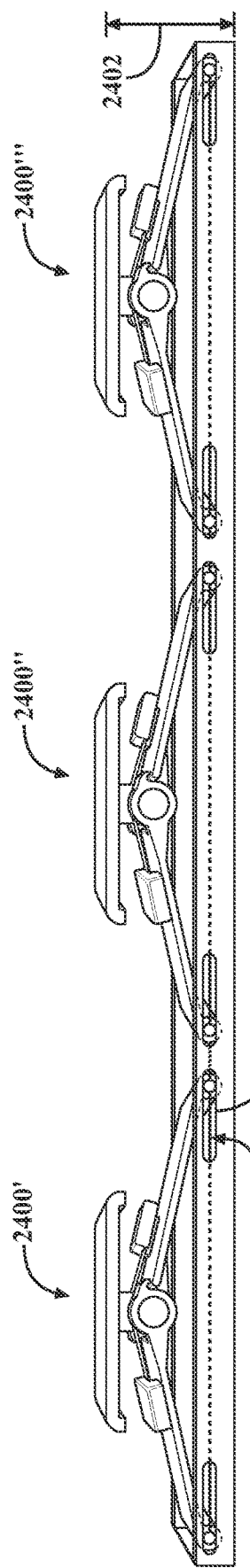
FIG. 26 is an example of a plurality of the actuators of FIG. 25, showing a non-activated condition.
Figure 27:
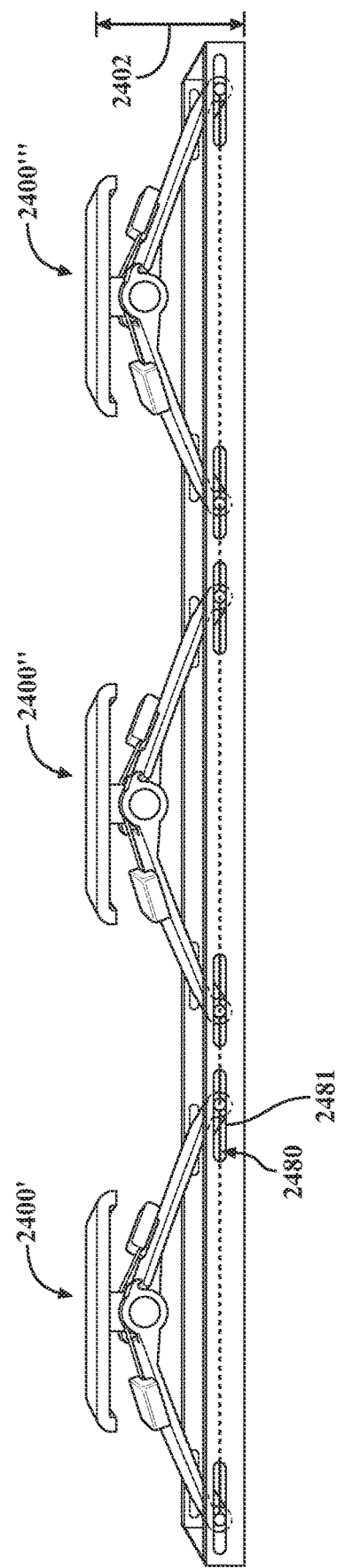
FIG. 27 is a view of the plurality of actuators of FIG. 26, showing an activated condition.

FIGS. 26-27 show an arrangement in which there are a plurality of the actuators 2400. The above discussion of the actuator 2400 in connection with FIGS. 24-25 applies equally to each individual actuator 2400 of the arrangement shown in FIGS. 26-27.

In some arrangements, the plurality of actuators 2400 can be activated and/or deactivated individually. In such case, each of the plurality of actuators 2400 can include one or more contracting members 2480. Thus, when an activation input is provided to the contracting member(s) 2480 for an individual one of the plurality of actuators 2400, only that particular actuator will be activated.

In other arrangements, the plurality of actuators 2400 can be activated and/or deactivated collectively. One example of such collective activation will now be described.

Referring to FIG. 26, the plurality of actuators 2400 can include three actuators: a first actuator 2400', a second actuator 2400", and a third actuator 2400'". While FIG. 26 shows an example in which there are three actuators, it will be appreciated that there can be any number of actuators. The plurality of actuators 2400 can be substantially identical to each other. Alternatively, one or more of the plurality of actuators 2400 can be different from the other actuators in one or more respects, including, for example, size, shape, configuration, activation force, activation time, height, width, structure, or in any other manner.

In some arrangements, there can be one or more contracting members 2480 associated with the plurality of actuators 2400. In this particular example, there can be a single contracting member 2480 operatively connected to the plurality of actuators 2400. The single contracting member 2480 can be routed in any suitable manner between the plurality of actuators 2400. In some arrangements, the single contracting member 2480 can be operatively connected to the first outer body member 2410 and the second outer body member 2420 of each of the plurality of actuators 2400. In some arrangements, the single contracting member 2480 can extend through apertures in one or more of the first outer body member 2410 and the second outer body member 2420 of the plurality of actuators 2400.

It should be noted that FIGS. 26 and 27 show each individual actuator 2400 as having its own first slot 2461 and second slot 2462, it will be appreciated that arrangements are not limited in this regard. Indeed, in some arrangements, two or more of the actuators 2400 or portions thereof can share a slot. In other arrangements, there can be a single slot for all of the actuators 2400. In further arrangements, the track 2450 may not include slots, and the first and second interfacing end portions 2418, 2428 of the actuators 2400' 2400", 2400''' can all be located within the channel 2455.

FIG. 26 shows an example of the plurality of actuators 2400 in a non-activated configuration. Here, the contracting member 2480 is not activated. FIG. 27 shows an example of the actuator 2400 in an activated configuration. When an activation input (e.g., electrical energy, heat, energy, etc.) is provided to the contracting member(s) 2480, the contracting member(s) 2480 can contract. This contraction causes the contracting member(s) 2480 to pull the first outer body member 2410 and the second outer body member 2420 of each individual actuator 2400 toward each other in a direction that corresponds to the first dimension 2401. More particularly, the second interfacing end portion 2418 of the first outer body member 2410 and the second interfacing end portion 2428 of the second outer body member 2420 of each actuator 2400 can be pulled toward each other in a direction that corresponds to the first dimension 2401.

As a result, the first outer body member 2410 and the second outer body member 2420 of each actuator 2400 can extend outward in a direction that corresponds to the second dimension 2402. More particularly, the first interfacing end portion 2416 of the first outer body member 2410 and the first interfacing end portion 2426 of the second outer body member 2420 of each actuator 2400 can extend outward and away from the track 2450 in a direction that corresponds to the second dimension 2402.

It will be appreciated that, in going from the non-activated condition to the activated condition, the first dimension 2401 (i.e., the width) of the plurality of actuators 2400 can decrease and/or the second dimension 2402 (i.e., the height) of the plurality of actuators 2400 can increase. Further, it will be appreciated that the plurality of actuators 2400 can deliver a force in a direction that is out of plane or otherwise different from the direction of contraction of the contracting member(s) 2480.

When the plurality of actuators 2400 go from a non-activated configuration to the activated configuration, the location of the push structures 2471 can be change. In the orientation of FIGS. 26 and 27, the push structures 2471 can be located at a higher elevation when the actuator 2400 is activated. Also, when the plurality of actuators 2400 go from a non-activated configuration to the activated configuration, the angle between the first outer body member 2410 and the second outer body member 2420 can decrease. It will be appreciated that the track 2450 can be configured to accommodate the movement of the first outer body member 2410 and the second outer body member 2420 of each actuator 2400 while maintaining the operative connection to them.

In some arrangements, the plurality of actuators 2400 can be selectively activated individually and/or collectively.

Figure 28:
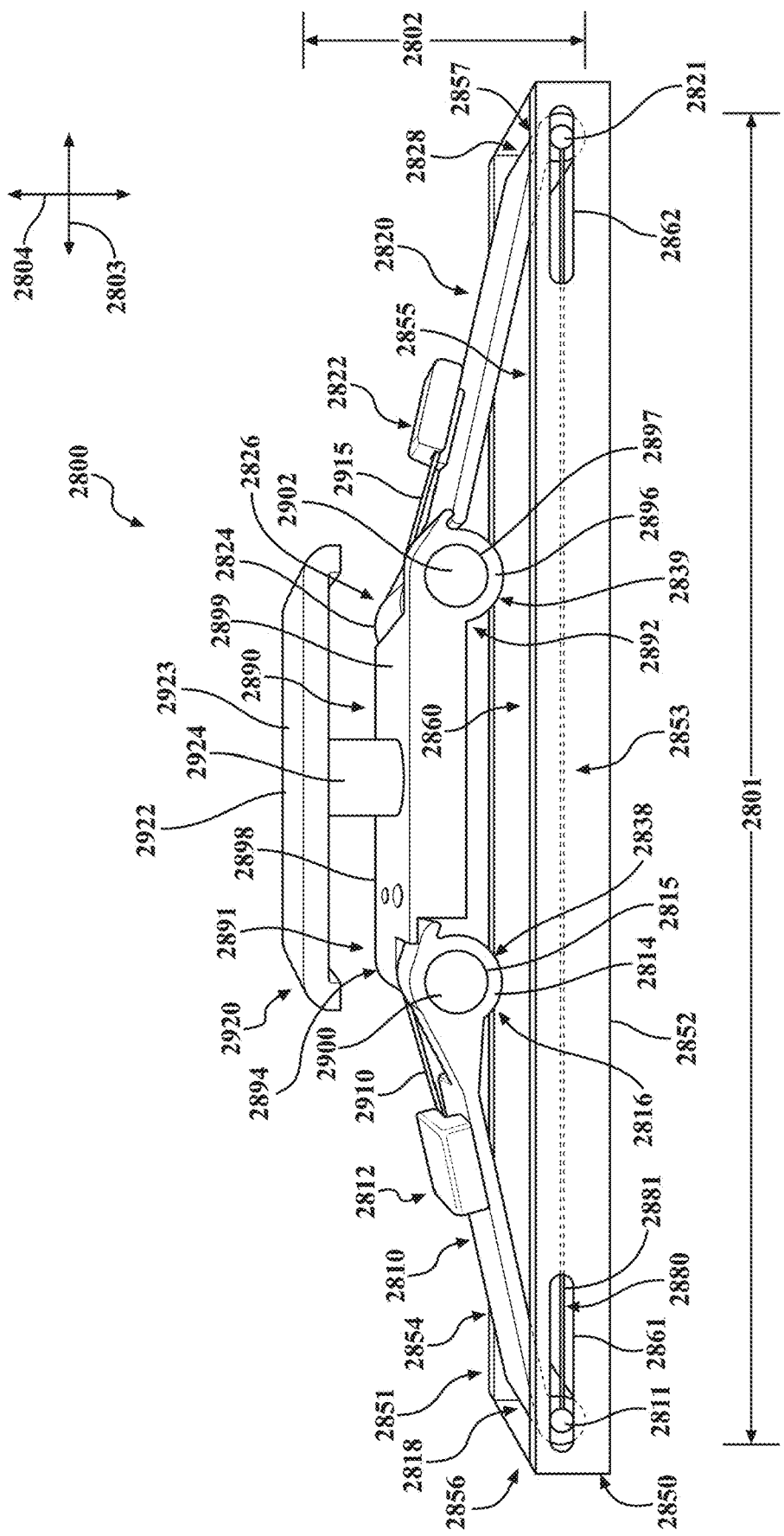
FIG. 28 is another example of an actuator, showing a non-activated configuration.
Figure 29:
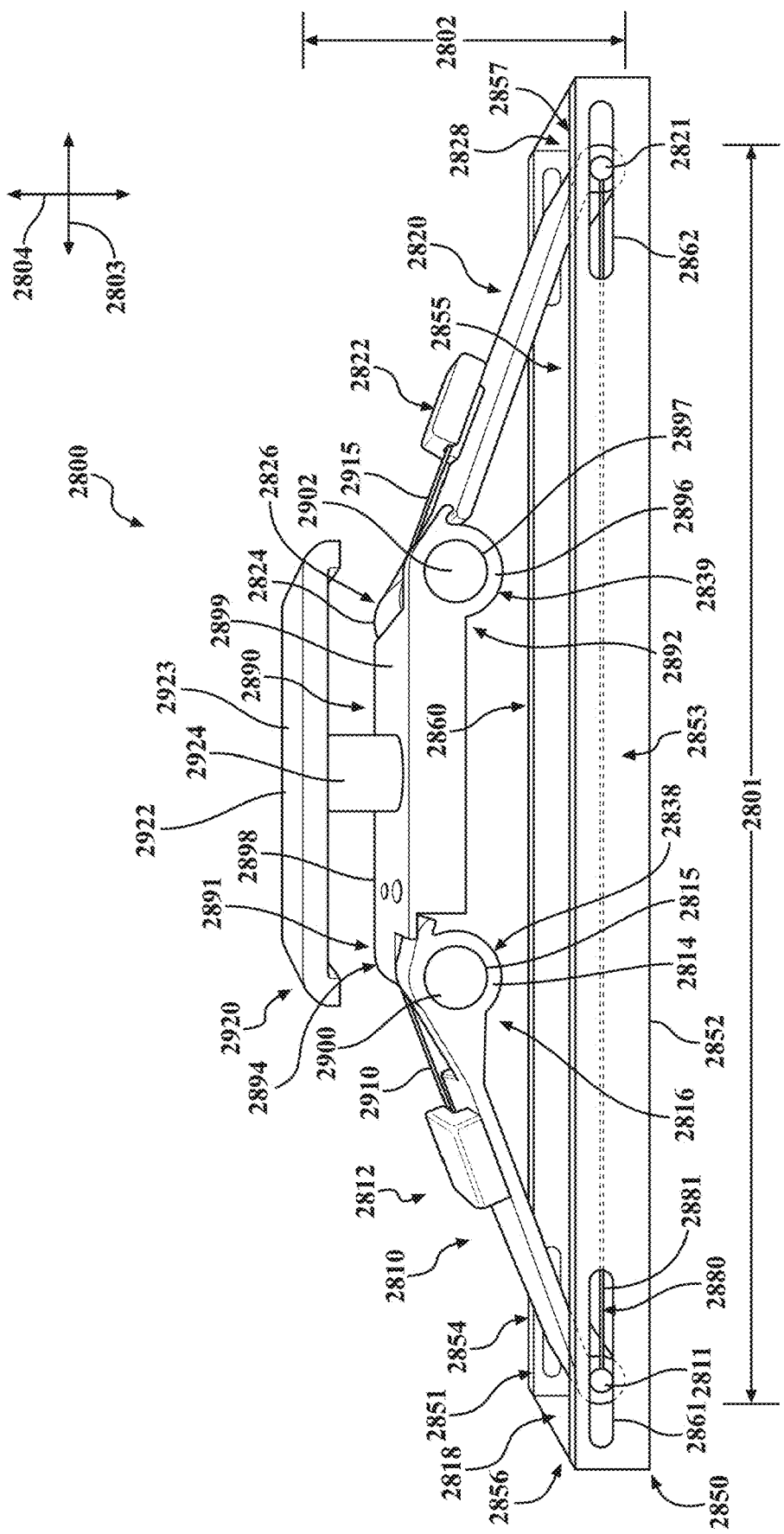
FIG. 29 is a view of the actuator of FIG. 25, showing an activated configuration.

Referring to FIGS. 28-29, another example of an actuator 2800 is shown. The actuator 2800 can have any suitable configuration. The actuator 2800 can include a first outer body member 2810, a second outer body member 2820, a cross body member 2890, and one or more contracting members 2880. The first outer body member 2810 and the second outer body member 2820 can be angled relative to the cross body member 2890. As a result, the actuator 2800 can generally form a trapezoidal shape.

The actuator 2800 can include a first dimension 2801 and the second dimension 2802. The first dimension 2801 can describe a width of the actuator 2800, and the second dimension 2802 can describe a height of the actuator 2800. The first dimension 2801 and the second dimension 2802 can be substantially perpendicular to each other.

The first outer body member 2810 and the second outer body member 2820 can have any suitable size, shape, and/or configuration. In some arrangements, the first outer body member 2810 and the second outer body member 2820 can be substantially identical to each other, but they can be in different orientations. In other arrangements, the first outer body member 2810 and the second outer body member 2820 can be different from each other in one or more respects. In some arrangements, the first outer body member 2810 and the second outer body member 2820 can be similar to the examples of the first portion 112 and the second portion 114 as shown in FIG. 6 or they can be similar to the examples of the first portion 132 and the second portion 134 as shown in connection with FIG. 9.

While the first outer body member 2810 and the second outer body member 2820 are shown as being generally rectangular in shape, it will be appreciated that arrangements herein are not limited to any particular shape. The first outer body member 2810 and the second outer body member 2820 can be made of any suitable material, such as plastic or metal.

The first outer body member 2810 and the second outer body member 2820 can be operatively connected to a cross body member 2890. In one or more arrangements, the first outer body member 2810 and the second outer body member 2820 can be movably connected to the cross body member 2890. More particularly, the first outer body member 2810 and the second outer body member 2820 can be pivotably connected to the cross body member 2890. In one or more arrangements, each of the first outer body member 2810 and the second outer body member 2820 be pivotably connected to the cross body member 2890. For example, the first outer body member 2810 can be pivotably connected to the cross body member 2890 by one or more hinges, and the second outer body member 2820 can be pivotably connected to the cross body member 2890 by one or more hinges. In one or more arrangements, the first outer body member 2810 can be pivotably connected to the cross body member 2890 by one or more barrel hinges 2838, and the second outer body member 2820 can be pivotably connected to the cross body member 2890 by one or more barrel hinges 2839. The first outer body member 2810 and the second outer body member 2820 can be located on opposite sides of the cross body member 2890.

In some arrangements, the one or more hinges can be separate structures operatively connected to the first outer body member 2810 and the cross body member 2890 and to the second outer body member 2820 and the cross body member 2890. Alternatively, in some arrangements, the one or more hinges can be formed at least in part by the first outer body member 2810, the second outer body member 2820, and/or the cross body member 2890.

The first outer body member 2810 can include a first interfacing end portion 2816 and a second interfacing end portion 2818. In some arrangements, the first interfacing end portion 2816 of the first outer body member 2810 can include one or more knuckles 2814 defining an opening 2815. The second outer body member 2820 can include a first interfacing end portion 2826 and a second interfacing end portion 2828. In some arrangements, the first interfacing end portion 2826 of the second outer body member 2820 can include one or more knuckles 2824 defining an opening (not visible in FIG. 28).

The cross body member 2890 can have any suitable size, shape, and/or configuration. The cross body member 2890 can include a main body portion 2898. In some arrangements, the main body portion 2898 can be substantially rectangular. The main body portion 2898 can define a surface 2899. In some arrangements, the surface 2899 can extend substantially parallel to the first dimension 2801 of the actuator 2800.

The cross body member 2890 can be made of any suitable material, such as metal or plastic. The cross body member 2890 can be made of the same material as the first outer body member 2810 and/or the second outer body member 2820, or the cross body member 2890 can be made of a different material.

In one or more arrangements, the cross body member 2890 can have a first interfacing end portion 2891 and a second interfacing end portion 2892. The first interfacing end portion 2891 of the cross body member 2890 can include one or more knuckles 2894 defining an opening (not visible in FIG. 28), and the second interfacing end portion 2892 of the cross body member 2890 can include one or more knuckles 2896 defining an opening 2897.

The cross body member 2890 can be configured to interface with the first outer body member 2810 and the second outer body member 2820. More particularly, the first interfacing end portion 2816 of the first outer body member 2810 and the first interfacing end portion 2826 of the second outer body member 2820 can be configured to interface with the cross body member 2890. The opening(s) 2815 of the knuckle(s) 2814 of the first interfacing end portion 2816 and the opening(s) of the knuckle(s) 2894 of the first interfacing end portion 2891 of the cross body member 2890 can be substantially aligned with each other. A pin 2900 can be received in the aligned opening(s) 2815 of the knuckle(s) 2814 and opening(s) of the knuckle(s) 2894. The opening(s) of the knuckle(s) 2824 of the second outer body member 2820 and the opening(s) 2897 of the knuckle(s) 2896 of the second interfacing end portion 2892 of the cross body member 2890 can be substantially aligned with each other. A pin 2902 can be received in the aligned opening(s) of the knuckle(s) 2824 and the opening(s) 2897 of the knuckle(s) 2896.

One or more biasing members 2910 can be associated with the first outer body member 2810 and the cross body member 2890. One or more biasing members 2915 can be associated with the second outer body member 2820 and the cross body member 2890. The biasing members 2910, 2915 can be operatively positioned to bias the first outer body member 2810 and the second outer body member 2820 into a non-activated configuration of the actuator 2800. More particularly, the biasing member(s) 2910 can exert a force on the first outer body member 2810 and the cross body member 2890 to bias at least the first outer body member 2810 into the non-activated configuration. Further, the biasing member(s) 2915 can exert a force on the second outer body member 2820 and the cross body member 2890 to bias at least the second outer body member 2820 into the non-activated configuration.

The biasing members 2910, 2915 can be any suitable element for imparting a biasing force on the first outer body member 2810 and the second outer body member 2820. In one or more arrangements, the biasing members 2910, 2915 can be springs. More particularly, the biasing members 2910, 2915 can be torsion springs.

In some arrangements, the biasing members 2910, 2915 can be substantially identical to each other. In some arrangements, one or more of the biasing members 2910, 2915 can be different from the other biasing members in one or more respects, such as in terms of size, shape, configuration, and/or biasing force, just to name a few possibilities.

In some arrangements, the first outer body member 2810 and the second outer body member 2820 can be configured to engage or retain a portion of the biasing member(s) 2910, 2915, respectively. For instance, the first outer body member 2810 can include a retaining member 2812, and the second outer body member 2820 can include a retaining member 2822. The retaining members 2812, 2822 can have any suitable size, shape, and/or configuration. In one or more arrangements, the retaining members 2812, 2822 can be substantially L-shaped, as shown in FIGS. 28-29, substantially U-shaped, substantially V-shaped, or substantially J-shaped, just to name a few possibilities. The retaining members 2812, 2822 can be formed as a unitary structure with the respective one of the first outer body member 2810 and/or the second outer body member 2820. In some arrangements, the retaining members 2812, 2822 can be formed separately from first outer body member 2810 and/or the second outer body member 2820 and subsequently connected thereto.

In some arrangements, the actuator 2800 can include a push structure 2920. One example of the push structure 2920 is shown in FIGS. 28-29. The push structure 2920 can be configured to engage other structures or objects. The push structure 2920 can focus the force of the actuator 2800 on an intended target object. The push structure 2920 can have any suitable size, shape, and/or configuration. In one or more arrangements, the push structure 2920 can be substantially T-shaped. In some arrangements, the push structure 2920 can include a platform 2922 and a stem 2924.

The platform 2922 can have an engaging surface 2923. The engaging surface 2923 can be configured to provide a desired actuation effect on an intended target. In some arrangements, the engaging surface 2923 can be substantially planar. In some arrangements, the engaging surface 2923 can include one or more contours, protrusions, steps, elements, or other raised or non-planar features. The engaging surface 2923 can be configured to create a focal point for the actuation force of the actuator 2800.

In some arrangements, the engaging surface 2923 can be substantially rectangular in conformation, as is shown. In other arrangements, the engaging surface 2923 can be substantially circular, substantially square, substantially triangular, substantially polygonal, substantially hexagonal, substantially octagonal, or substantially trapezoidal, just to name a few possibilities.

In some arrangements, the engaging surface 2923 can be substantially parallel to the contracting member(s) 2880, the surface 2899, and/or to a first dimension 2801 of the actuator 2800. In some arrangements, the engaging surface 2923 can be angled relative to the contracting member(s) 2880, the surface 2899, and/or to a first dimension 2801 of the actuator

2800. The engaging surface 2923 can have any suitable orientation to achieve a desired actuation force effect.

The push structure 2920 can be operatively connected to the cross body member 2890. For instance, the stem 2924 can be configured to be operatively connected to the surface 2899 of the cross body member 2890. Any suitable form(s) of operative connection can be provided, such one or more fasteners, one or more welds, one or more brazes, one or more forms of mechanical engagement, one or more adhesives, one or more other forms of operative connection, or any combination thereof. In some arrangements, the push structure 2920 can be substantially centrally located with respect to the cross body member 2890.

However, it will be appreciated that, in at least some arrangements, the actuator 2800 may not have a push structure 2920. Instead, the push force of the actuator 2800 can be delivered by the cross body member 2890.

The actuator 2800 can include a track 2850. The track 2850 can be made of any suitable material, such as plastic or metal. The track 2850 can have any suitable size, shape, and/or configuration. The track 2850 can include an upper side 2851, a lower side 2852, a first lateral side 2853, and a second lateral side 2854. It will be appreciated that the terms "upper," "lower," and "lateral" are used for convenience to facilitate the discussion with respect to the orientation of the actuator 2800 shown in FIGS. 28 and 29. Accordingly, it will be understood that these terms are not intended to be limiting.

The first outer body member 2810 and the second outer body member 2820 can be configured to interface with the track 2850. The first outer body member 2810 and the second outer body member 2820 can be configured to be slidable within the track 2850. The track 2850 can have any suitable configuration. For example, the track 2850 can include a channel 2855 into which a portion of the first outer body member 2810 and a portion of the second outer body member 2820 can be received. More particularly, the second interfacing end portion 2818 of the first outer body member 2810 and the second interfacing end portion 2828 of the second outer body member 2820 can be received in the channel 2855.

The channel 2855 can be open to the upper side 2851 of the track 2850. Thus, the channel 2855 can define an opening 2860 in the track 2850. The first outer body member 2810 and the second outer body member 2820 can extend through the opening 2860.

The channel 2855 can include a first lateral end 2856 and a second lateral end 2857. In some arrangements, the first lateral end 2856 and the second lateral end 2857 of the channel 2855 can be closed to prevent the portions of the first outer body member 2810 and the second outer body member 2820 from leaving coming out of the channel 2855 at an open end. To that end, the first lateral end 2856 and/or the second lateral end 2857 of the channel 2855 can include a closure element or blocking structure to physically block the lateral outward movement of the first outer body member 2810 and the second outer body member 2820. In some arrangements, the first lateral end 2856 and/or the second lateral end 2857 of the channel 2855 can be closed as a result of the construction of the track 2850. For instance, the track can be made of a machined block of material in which at least one of the first lateral end 2856 and the second lateral end 2857 is closed.

The track 2850, the channel 2855, the second interfacing end portion 2818 of the first outer body member 2810, and/or the second interfacing end portion 2828 of the second outer body member 2820 can be configured so that the second interfacing end portions 2818, 2828 are retainably received within the channel 2855. For instance, the second interfacing end portions 2818, 2828 can include a lip, protrusion, an enlarged portion, or other feature for mechanically engaging a portion of the channel 2855. In some arrangements, the second interfacing end portions 2818, 2828 and the channel 2855 can be configured for interlocking engagement. Thus, the first outer body member 2810 and the second outer body member 2820 cannot separate from the channel 2855 through the opening 2860 in the upper side 2851 of the track 2850.

The track 2850, the channel 2855, the first outer body member 2810, and/or the second outer body member 2820 can be configured to facilitate movement of the first outer body member 2810 and the second outer body member 2820 within the channel 2855. For instance, in some arrangements, the channel 2855, the first outer body member 2810, and/or the second outer body member 2820 can include one or more friction reducing coatings, lubricants, materials, substances, and/or treatments. Alternatively or additionally, the channel 2855, the first outer body member 2810, and/or the second outer body member 2820 can include one or more rollers, bearings, or low shear materials.

In some arrangements, the track 2850, the channel 2855, the first outer body member 2810, and/or the second outer body member 2820 can be configured to define the range of movement of the first outer body member 2810 and the second outer body member 2820 within the channel 2855. As an example, the track 2850 can include a first slot 2861 and a second slot 2862. The first slot 2861 and the second slot 2862 can be substantially identical to each other. Alternatively, the first slot 2861 and the second slot 2862 can be different from each other in one or more respects, including size, shape, length, width, and/or configuration. The first outer body member 2810 can include a protrusion 2811, and the second outer body member 2820 can include a protrusion 2821. The protrusion 2811 can be received within the first slot 2861, and the protrusion 2821 can be received within the second slot 2862. Thus, it will be appreciated that the range of movement of the first outer body member 2810, and/or the second outer body member 2820 can be defined by the range of movement of the protrusions 2811, 2821 within the slots 2861, 2862. However, in other arrangements, the range of movement of the first outer body member 2810 and/or the second outer body member 2820 can be defined by the channel 2855.

It should be noted that, in some arrangements, the slots 2861, 2862 and protrusions 2811, 2821 can be provided on only one side of track 2850 and the outer body members 2810, 2820. However, in other arrangements, the slots 2861, 2862 and protrusions 2811, 2821 can be provided on opposite sides of track 2850 and the outer body members 2810, 2820.

As noted above, the actuator 2800 can have one or more contracting members 2880. The contracting member(s) 2880 can be any member or material that, when an activation input is provided to the contracting member, the contracting member can contract.

The actuator 2800 can include one or more shape memory material members 2881. The shape memory material member(s) 2881 can be operatively connected to the first outer body member 2810 and the second outer body member 2820.

The above discussion of the contracting member(s) 2480 and the shape memory material member(s) 2481 (including their interaction with the first outer body member 2410, the second outer body member 2420, and the track 2450) in connection with FIGS. 24-25 applies equally here with respect to the contracting member(s) 2880 and the shape memory material member(s) 2881 (including their interaction with the first outer body member 2810, the second outer body member 2820, and the track 2850) here in connection with FIGS. 28-29. Further, the general discussion of the contracting members and the shape memory material member(s) 180 made in connection with FIGS. 1-3 applies equally here as well.

FIG. 28 shows an example of the actuator 2800 in a non-activated configuration. Here, the contracting member 2880 is not activated. FIG. 29 shows an example of the actuator 2800 in an activated configuration. When an activation input (e.g., electrical energy, heat, energy, etc.) is provided to the contracting member(s) 2880, the contracting member(s) 2880 can contract. This contraction causes the contracting member(s) 2880 to pull the first outer body member 2810 and the second outer body member 2820 toward each other in a direction 2803 that corresponds to the first dimension 2801. More particularly, the second interfacing end portion 2818 of the first outer body member 2820 and the second interfacing end portion 2828 of the second outer body member 2820 can be pulled toward each other in the direction 2803 that corresponds to the first dimension 2801.

As a result, the first outer body member 2810, the second outer body member 2820, and the cross body member 2890 can extend outward in a direction 2804 that corresponds to the second dimension 2802. More particularly, the first interfacing end portion 2816 of the first outer body member 2820, the first interfacing end portion 2826 of the second outer body member 2820, and the cross body member 2890 can extend outward and away from the track 2850 in the direction 2804 that corresponds to the second dimension 2802.

It will be appreciated that, in going from the non-activated condition to the activated condition, the first dimension 2801 (i.e., the width) of the actuator 2800 can decrease and/or the second dimension 2802 (i.e., the height) of the actuator 2800 can increase. Further, it will be appreciated that the actuator 2800 can deliver a force in a direction that is out of plane or otherwise different from the direction of contraction of the contracting member(s) 2880.

When the actuator 2800 goes from a non-activated configuration to the activated configuration, the location of the cross body member 2890 and the push structure 2920 can be change. In the orientation of FIGS. 28 and 29, the cross body member 2890 and the push structure 2920 can be located at a higher elevation when the actuator 2800 is activated. Also, when the actuator 2800 goes from a non-activated configuration to the activated configuration, the angle between the first outer body member 2810 and the second outer body member 2820 can decrease. Further, when the actuator 2800 goes from a non-activated configuration to the activated configuration, the angle between the first outer body member 2810 and the cross body member 2890 can decrease. Still further, when the actuator 2800 goes from a non-activated configuration to the activated configuration, the angle between the second outer body member 2820 and the cross body member 2890 can decrease.

It will be appreciated that the track 2850 can be configured to accommodate the movement of the first outer body member 2810 and the second outer body member 2820 while maintaining the operative connection to them.

It should be noted that, in some arrangements, the cross body member 2890 and/or the push structure 2920 can deliver an actuation force symmetrically, that is, substantially in line with a force direction of the actuator 2800 (e.g., in the direction 2804 that corresponds to the second dimension 2802). However, in other arrangements, the actuator 2800 can be configured to deliver an actuation force that is asymmetric, that is, not in line with the force direction of the actuator 2800.

It should be noted that, while FIGS. 28-29 show a single actuators 2800, there can be a plurality of the actuators 2800. The above discussion of the plurality of actuators 2400 in connection with FIGS. 26-27 can apply equally to a plurality of the actuators 2800.

Figure 4:
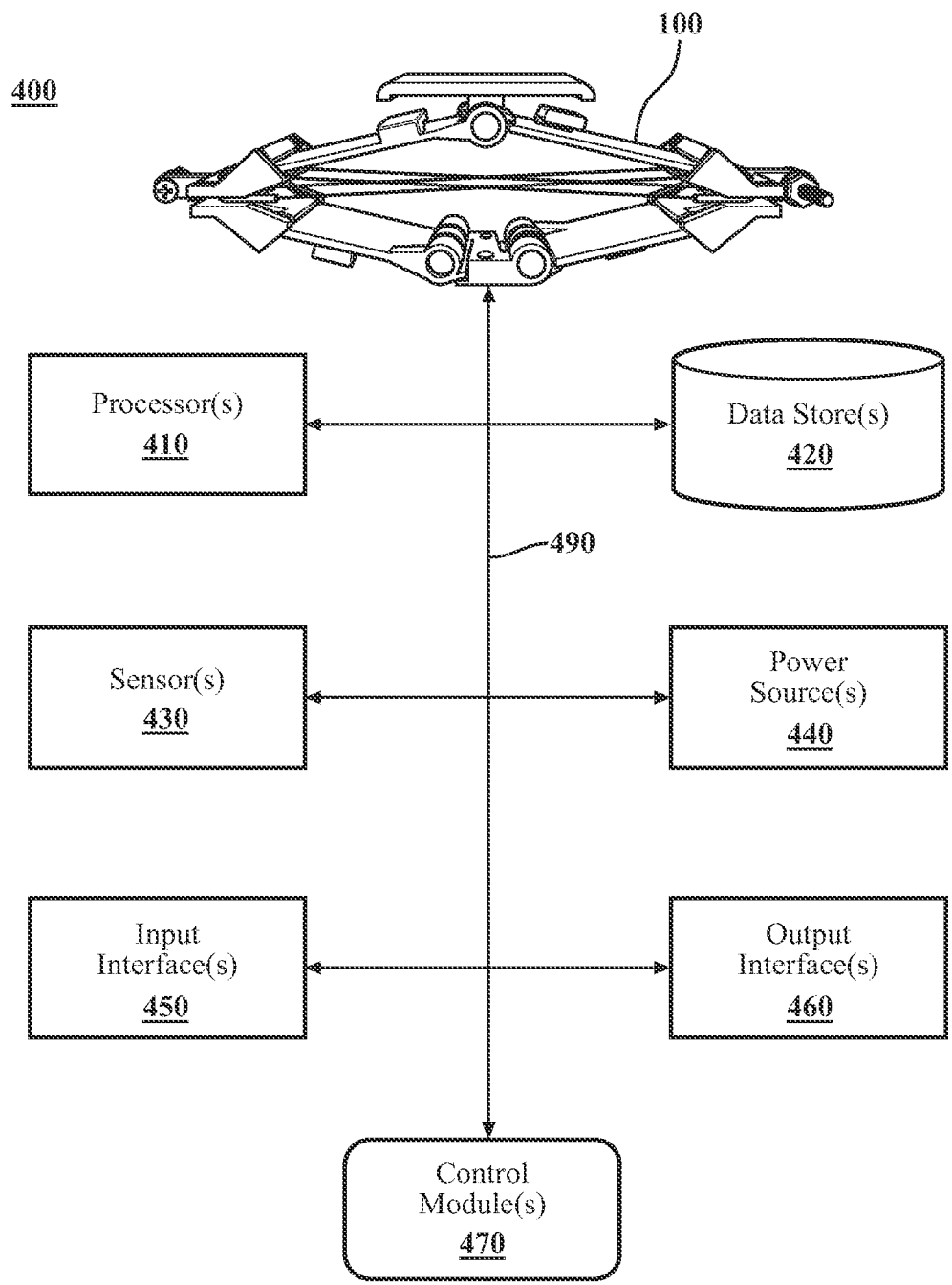
FIG. 4 is an example of a system including the actuator of FIG. 1.

FIG. 4 shows an example of a system 400. The system 400 can include various elements. Some of the possible elements of the system 400 are shown in FIG. 4 and will now be described. It will be understood that it is not necessary for the system 400 to have all of the elements shown in FIG. 4 or described herein. The system 400 can have any combination of the various elements shown in FIG. 4. Further, the system 400 can have additional elements to those shown in FIG. 4. In some arrangements, the system 400 may not include one or more of the elements shown in FIG. 4. Further, while the various elements may be located on or within a chair, it will be understood that one or more of these elements can be located external to the chair. Further, the elements shown may be physically separated by large distances.

The system 400 can include one or more of the actuators 100 as described above. The actuators 100 can be operatively connected to one or more of the elements of the system 400.

The system 400 can include one or more processors 410, one or more data stores 420, one or more sensors 430, one or more power sources 440, one or more input interfaces 450, one or more output interfaces 460, one or more of the actuators 100, and one or more control modules 470. Each of these elements will be described in turn below.

As noted above, the system 400 can include one or more processors 410. "Processor" means any component or group of components that are configured to execute any of the processes described herein or any form of instructions to carry out such processes or cause such processes to be performed. The processor(s) 410 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 410 can include at least one hardware circuit (e.g., an integrated circuit) configured to carry out instructions contained in program code. In arrangements in which there is a plurality of processors 410, such processors can work independently from each other, or one or more processors can work in combination with each other.

The system 400 can include one or more data stores 420 for storing one or more types of data. The data store(s) 420 can include volatile and/or non-volatile memory. Examples of suitable data stores 420 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 420 can be a component of the processor(s) 410, or the data store(s) 420 can be operatively connected to the processor(s) 410 for use thereby. The term "operatively connected," as used throughout this description, can include direct or indirect connections, including connections without direct physical contact.

The system 400 can include one or more sensors 430. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 400 includes a plurality of sensors 430, the sensors can work independently from each other. Alternatively, two or more of the sensors can work in combination with each other. In such case, the two or more sensors can form a sensor network. The sensor(s) 430 can be operatively connected to the processor(s) 410, the data store(s) 420, and/or other elements of the system 400 (including any of the elements shown in FIG. 1).

As noted above, the system 400 can include one or more power sources 440. The power source(s) 440 can be any power source capable of and/or configured to energize the shape memory material member(s) 180 of the actuator 100. For example, the power source(s) 440 can include one or more batteries, one or more fuel cells, one or more generators, one or more alternators, one or more solar cells, and combinations thereof.

The system 400 can include one or more input interfaces 450. An "input interface" includes any device, component, system, element or arrangement or groups thereof that enable information/data to be entered into a machine. The input interface(s) 450 can receive an input from a chair occupant. Any suitable input interface 450 can be used, including, for example, a keypad, display, touch screen, multi-touch screen, button, joystick, mouse, trackball, microphone and/or combinations thereof.

The system 400 can include one or more output interfaces 460. An "output interface" includes any device, component, system, element or arrangement or groups thereof that enable information/data to be presented to a chair occupant. The output interface(s) 460 can present information/data to a chair occupant. The output interface(s) 460 can include a display, an earphone, and/or speaker. Some components of the system 400 may serve as both a component of the input interface(s) 450 and a component of the output interface(s) 460.

The system 400 can include one or more modules, at least some of which will be described herein. The modules can be implemented as computer readable program code that, when executed by a processor, implement one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, one or more data stores 420 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 400 can include one or more control modules 470. The control module(s) 470 can be configured to receive signals, data, information, and/or other inputs from one or more elements of the system 400. The control module(s) 470 can be configured to analyze these signals, data, information, and/or other inputs. The control module(s) 470 can be configured to select one or more of the actuator(s) 100 to be activated or deactivated to achieve a desired effect. In some arrangements, the control module(s) 470 can be configured to select a predefined actuation profile from the data store(s) 420 to effectuate a desired actuation. Alternatively or additionally, the control module(s) 470 can be configured to detect user inputs (e.g., commands) provided on the input interface(s) 450. The control module(s) 470 can be configured to send control signals or commands over a communication network 490 to one or more elements of the system 400, including the actuator(s) 100, the shape memory material member(s) 180, and/or any portion thereof.

The control module(s) 470 can be configured to cause the selected one or more of the actuator(s) 100 to be activated or deactivated by activating or deactivating the respective shape memory material member(s) 180 associated with the selected actuator(s) 100. As used herein, "cause" or "causing" means to make, force, compel, direct, command, instruct, and/or enable an event or action to occur or at least be in a state where such event or action may occur, either in a direct or indirect manner. The control module(s) 470 can selectively provide an activation input to the actuator(s) 100 or, more particularly, to the shape memory material member(s) 180 associated with the selected actuator(s) 100. The control module(s) 470 can selectively permit or prevent the flow of electrical energy from the power source(s) 440.

The various elements of the system 400 can be communicatively linked to one another or one or more other elements through one or more communication networks 490. As used herein, the term "communicatively linked" can include direct or indirect connections through a communication channel, bus, pathway or another component or system. A "communication network" means one or more components designed to transmit and/or receive information from one source to another. The data store(s) 420 and/or one or more other elements of the system 400 can include and/or execute suitable communication software, which enables the various elements to communicate with each other through the communication network and perform the functions disclosed herein.

The one or more communication networks 490 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

While the system 400 is described above in connection with the actuator 100, it will be appreciated that the actuators 100', 1500, 2400, 2800 can be used in connection with the system 400 shown in FIG. 4. Thus, the above description of the system 400 applies equally to each of these actuators, a plurality of these actuators, or any combination of these actuators (including actuator 100).

The various actuators 100, 100', 1500, 2400, 2800 described herein can have one or more shape memory material members or contracting members. The contracting member(s) can be any member or material that, when an activation input is provided to the contracting member, the contracting member can contract. The activation input can be energy, heat, or electrical energy, just to name a few examples.

It should be noted that the various actuators 100, 100', 1500, 2400, 2800 described herein can remain in an activated configuration while an activation input (e.g., energy, electrical energy, heat, etc.) is provided to the contracting member(s). However, in some arrangements, the actuators can be configured to maintain the activated configuration without an activation input being provided to the contracting member(s). For instance, any of the actuators can include one or more locking elements that can engage when the actuators morph into the activated condition. These locking element(s) can engage and/or disengage automatically or in response to a user input. These locking element(s) can be mechanical, electrostatic (e.g., electrostatic clutch), magnetic, or electromagnetic in nature. It will be appreciated that, by providing the locking element(s), the activation input does not have to continue to be provided to the actuator to maintain the activated condition. As a result, energy consumption can be reduced.

It will be appreciated that arrangements described herein can provide numerous benefits, including one or more of the benefits mentioned herein. For example, arrangements described herein can provide an actuator that can provide sufficient actuation force for numerous applications. Arrangements described herein can use less shape memory material members than in other actuator designs. Arrangements described herein can a reduced actuator footprint compared to at least some other shape memory alloy-based actuator designs. Arrangements described herein can use less power to activate because the shape memory material members do not have to fight against thick and heavy actuator body members as in prior actuator designs. Arrangements described herein can result in a lower cost actuator. Arrangements described herein can decouple the strength of the first and second body members from the tension in these body members. Arrangements described herein can allow for focusing of the actuation force by providing push plates of different sizes, shapes, and/or configurations. Arrangements described herein avoid large amounts of shape memory material member(s) located external to the actuator, which could create an unsightly appearance and make integration into different components challenging.

Arrangements described herein can be used in various applications in which a force is imparted on another structure or person. In some arrangements, arrangements described herein can be used in connection with a vehicle (e.g., an automobile, a watercraft, an aircraft, a hovercraft, a spacecraft, any other form of transport (including motorized or powered transport). For instance, the actuators can be located within or operatively positioned relative to a vehicle seat. For instance, arrangements described herein can be used in connection with a vehicle seat to provide a haptic, massaging, and/or other effect to an occupant of the vehicle seat. As another example, arrangements described herein can be used to adjust the position of a vehicle component. Further, it will be appreciated that arrangements described herein can be used in connection with various non-vehicular applications, such as chairs, office chairs, massage chairs, beds, etc. Still further, arrangements described herein can be used in connection with massaging devices.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. An actuator, comprising:
an outer body, at least a portion of the outer body being configured to pivot, the outer body including a first portion and a second portion, the first portion being pivotably connected to the second portion;
a contracting member operatively connected to opposing end portions of the actuator; and
a track, the first portion and the second portion slidably engage the track,
when an activation input is provided to the contracting member, the contracting member contracts such that the opposing end portions of the actuator move toward each other, thereby causing the actuator to morph into an activated configuration in which a dimension of the actuator increases.

2. The actuator of claim 1, wherein the first portion and the second portion are retainably engaged by the track.

3. An actuator, comprising:
an outer body, at least a portion of the outer body being configured to pivot, the outer body including a first portion, a second portion, and a cross body member operatively connected to the first portion and the second portion;
a contracting member operatively connected to opposing end portions of the actuator; and
a track, the first portion and the second portion slidably engage the track,
when an activation input is provided to the contracting member, the contracting member contracts such that the opposing end portions of the actuator move toward each other, thereby causing the actuator to morph into an activated configuration in which a dimension of the actuator increases.

4. The actuator of claim 3, wherein the first portion is pivotably connected to the cross body member, and wherein the second portion is pivotably connected to the cross body member.

5. The actuator of claim 3, wherein the first portion and the second portion are slidably connected to the track.

6. An actuator, comprising:
an outer body including a first outer body member and a second outer body member arranged in a scissored configuration in which the first outer body member passes through the second outer body member, the first outer body member being configured to be pivotable, the second outer body member being configured to be pivotable, the first outer body member including a first portion and a second portion pivotably connected to each other; and
a contracting member,
when an activation input is provided to the contracting member, the contracting member contracts, thereby causing the actuator to morph into an activated configuration in which a height of the actuator increases.

7. The actuator of claim 6, wherein the contracting member is a shape memory material member.

8. The actuator of claim 7, wherein the shape memory material member is a shape memory alloy.

9. The actuator of claim 6, further including one or more biasing members operatively positioned to bias the first portion and the second portion into a non-activated configuration of the actuator.

10. An actuator, comprising:
an outer body including a first outer body member and a second outer body member arranged in a scissored configuration in which the first outer body member passes through the second outer body member, the second outer body member including a first portion and a second portion, and the first portion and the second portion being pivotably connected to a base located between the first portion and the second portion; and
a contracting member,
when an activation input is provided to the contracting member, the contracting member contracts, thereby causing the actuator to morph into an activated configuration in which a height of the actuator increases.

11. An actuator, comprising:
an outer body including a first portion and a second portion pivotably connected to each other;
a contracting member operatively connected to the first portion and the second portion; and
a track, the first portion and the second portion operatively engaging the track,
when an activation input is provided to the contracting member, the contracting member contracts, thereby causing the actuator to morph into an activated configuration in which a height of the actuator increases.

12. The actuator of claim 11, wherein the contracting member is a shape memory material member.

13. The actuator of claim 12, wherein the shape memory material member is a shape memory alloy.

14. The actuator of claim 11, wherein the first portion and the second portion are pivotably connected to each other by a hinge.

15. The actuator of claim 11, further including one or more biasing members operatively positioned to bias the first portion and the second portion into a non-activated configuration of the actuator.

16. The actuator of claim 11, wherein the first portion includes a first interfacing end and a second interfacing end, and wherein the second portion includes a first interfacing end and a second interfacing, and wherein the first interfacing end of the first portion is pivotably connected to the first interfacing end of the second portion.

17. The actuator of claim 16, wherein the second interfacing end of the first portion and the second interfacing end of the second portion engage the track.

18. The actuator of claim 17, wherein the second interfacing end of the first portion and the second interfacing end of the second portion are retainably received within the track.

19. The actuator of claim 11, wherein the first portion and the second portion slidably engage the track.

20. An actuator comprising:
an outer body including a first portion, a second portion, and a cross body member operatively connected to the first portion and the second portion;
a contracting member operatively connected to the first portion and the second portion; and
a track, the first portion and the second portion operatively engage the track,
when an activation input is provided to the contracting member, the contracting member contracts, thereby causing the actuator to morph into an activated configuration in which a height of the actuator increases.

21. The actuator of claim 20, wherein the first portion is pivotably connected to the cross body member, and wherein the second portion is pivotably connected to the cross body member.

22. The actuator of claim 21, wherein the first portion and the cross body member are pivotably connected to each other by a hinge.

23. The actuator of claim 20, wherein the first portion and the second portion slidably engage the track.

24. The actuator of claim 20, wherein the contracting member is a shape memory material member.

25. A system comprising:
an actuator including:
an outer body, at least a portion of the outer body being configured to pivot; and
a contracting member; and
a track, the outer body including a first portion and a second portion, the first portion being pivotably connected to the second portion, and the first portion and the second portion slidably engaging the track; and
one or more processors operatively connected to selectively activate the contracting member,
when an activation input is provided to the contracting member, the contracting member contracts, thereby causing the actuator to morph into an activated configuration in which a dimension of the actuator increases.

26. The system of claim 25, wherein the actuator is a plurality of actuators, and wherein the plurality of actuators share the same contracting member.

27. A system comprising:
an actuator including:
an outer body including a first portion, a second portion, and a cross body member operatively connected to the first portion and the second portion, at least a portion of the outer body being configured to pivot;
a track, the first portion and the second portion slidably engaging the track; and
a contracting member; and
one or more processors operatively connected to selectively activate the contracting member,
when an activation input is provided to the contracting member, the contracting member contracts, thereby causing the actuator to morph into an activated configuration in which a dimension of the actuator increases.

28. The system of claim 27, wherein the first portion is pivotably connected to the cross body member, and wherein the second portion is pivotably connected to the cross body member.

29. The actuator of claim 6, further including a biasing member operatively positioned between the first outer body member and a second outer body member.

30. The actuator of claim 29, wherein the biasing member is a compression spring.

31. The actuator of claim 6, wherein the contracting member is a wire.

32. The actuator of claim 6, wherein further including one or more locking elements configured to maintain the actuator in the activated configuration without an activation input being provided to the contracting member.

33. The actuator of claim 6, wherein the first portion and the second portion are pivotably connected to each other by a hinge.

34. The actuator of claim 6, further including one or more biasing members operatively positioned to bias the first portion and the second portion into a non-activated configuration of the actuator.

35. The actuator of claim 6, wherein the contracting member is operatively connected to opposing end portions of the actuator.

36. The actuator of claim 35, wherein the end portions are defined by a first endcap and a second endcap, wherein,—when an activation input is provided to the contracting member, the contracting members contracts and pulls the first endcap and the second endcap toward each other.

37. The actuator of claim 36, wherein the contracting member is routed outboard of the first endcap and the second endcap.

38. The actuator of claim 36, wherein the contracting member is routed inboard of the first endcap and the second endcap.

39. The actuator of claim 36, wherein the contracting member extends in a serpentine or non-linear manner between the first endcap and the second endcap.

40. The actuator of claim 36, wherein at least one of the first endcap and the second endcap includes one or more posts or one or more guides, whereby the contracting member is routed by the one or more posts or the one or more guides.

41. The actuator of claim 6, further including a push structure operatively connected to the outer body, and wherein, when the actuator morphs into the activated configuration, a position of the push structure changes.

42. The actuator of claim 6, wherein the second outer body member includes a first portion and a second portion, and wherein each of the first portion and the second portion of the second outer body member is pivotably connected to a base located between the first portion and the second portion of the second outer body member.

43. The actuator of claim 10, wherein the contracting member is a shape memory material member.

44. The actuator of claim 43, wherein the shape memory material member is a shape memory alloy.

45. The actuator of claim 10, wherein the contracting member is a wire.

46. The actuator of claim 10, wherein further including one or more locking elements configured to maintain the actuator in the activated configuration without an activation input being provided to the contracting member.

47. The actuator of claim 10, wherein the first portion and the second portion are pivotably connected to each other by a hinge.

48. The actuator of claim 10, further including one or more biasing members operatively positioned to bias the first portion and the second portion into a non-activated configuration of the actuator.

49. The actuator of claim 10, wherein the contracting member is operatively connected to opposing end portions of the actuator.

50. The actuator of claim 49, wherein the end portions are defined by a first endcap and a second endcap, wherein, when an activation input is provided to the contracting member, the contracting members contracts and pulls the first endcap and the second endcap toward each other.

51. The actuator of claim 50, wherein the contracting member is routed outboard of the first endcap and the second endcap.

52. The actuator of claim 50, wherein the contracting member is routed inboard of the first endcap and the second endcap.

53. The actuator of claim 50, wherein the contracting member extends in a serpentine or non-linear manner between the first endcap and the second endcap.

54. The actuator of claim 50, wherein at least one of the first endcap and the second endcap includes one or more posts or one or more guides, whereby the contracting member is routed by the one or more posts or the one or more guides.

55. The actuator of claim 10, further including a biasing member operatively positioned between the first outer body member and a second outer body member.

56. The actuator of claim 55, wherein the biasing member is a compression spring.

57. The actuator of claim 10, further including a push structure operatively connected to the outer body, and wherein, when the actuator morphs into the activated configuration, a position of the push structure changes.

58. The actuator of claim 10, wherein the first outer body member is configured to be pivotable, and wherein the second outer body member is configured to be pivotable.

59. The actuator of claim 58, wherein the first outer body member includes a first portion and a second portion pivotably connected to each other.

* * * * *

UNITED STATES PATENT AND TRADEMARK OFFICE
CERTIFICATE OF CORRECTION

PATENT NO. : 12,241,458 B2
APPLICATION NO. : 18/399026
DATED : March 4, 2025
INVENTOR(S) : Michael Paul Rowe et al.

Page 1 of 1

It is certified that error appears in the above-identified patent and that said Letters Patent is hereby corrected as shown below:

In the Specification

Column 27, Line 15: delete "FIGS. 1-3, 5, and 1013" and insert --FIGS. 1-3, 5, and 10-13--

Column 28, Line 17: delete "FIGS. 1-3, 5, and 10 13." and insert --FIGS. 1-3, 5, and 10-13.--

In the Claims

Column 52, Lines 43-44, Claim 36: delete "wherein,—when an activation input" and insert --wherein, when an activation input--

Signed and Sealed this
Fifteenth Day of April, 2025

Coke Morgan Stewart
*Acting Director of the United States Patent and Trademark Office*